United States Patent
Taguchi et al.

(10) Patent No.: US 7,083,666 B2
(45) Date of Patent: Aug. 1, 2006

(54) INKJET INK, PRODUCTION METHOD OF INKJET INK, INKJET INK SET AND INKJET RECORDING METHOD

(75) Inventors: Toshiki Taguchi, Shizuoka (JP); Manabu Ogawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/806,424

(22) Filed: Mar. 23, 2004

(65) Prior Publication Data

US 2004/0194660 A1  Oct. 7, 2004

(30) Foreign Application Priority Data

Mar. 24, 2003  (JP)  .................... P.2003-080829

(51) Int. Cl.
*C09D 11/02* (2006.01)
(52) U.S. Cl. ................ 106/31.43; 106/31.32; 106/31.47; 106/31.49
(58) Field of Classification Search ........... 106/31.43, 106/31.32, 31.47, 31.49
See application file for complete search history.

(56) References Cited

U.S. PATENT DOCUMENTS

| | | | | |
|---|---|---|---|---|
| 5,980,623 | A * | 11/1999 | Hiraoka et al. | 106/31.49 |
| 6,039,793 | A * | 3/2000 | Gundlach et al. | 106/31.28 |
| 2004/0011248 | A1 * | 1/2004 | Taguchi et al. | 106/31.28 |
| 2004/0055508 | A1 * | 3/2004 | Miyamoto et al. | 106/31.47 |
| 2004/0080595 | A1 * | 4/2004 | Taguchi et al. | 347/100 |
| 2004/0089197 | A1 * | 5/2004 | Taguchi | 106/31.01 |
| 2004/0189765 | A1 * | 9/2004 | Taguchi et al. | 347/100 |
| 2004/0200385 | A1 * | 10/2004 | Taguchi et al. | 106/31.43 |
| 2005/0001890 | A1 * | 1/2005 | Taguchi et al. | 347/100 |

FOREIGN PATENT DOCUMENTS

| EP | 001375608 A1 * | 1/2004 |
|---|---|---|
| EP | 001378550 A1 * | 1/2004 |
| EP | 001473336 A1 * | 11/2004 |

* cited by examiner

*Primary Examiner*—Helene Klemanski
(74) *Attorney, Agent, or Firm*—Sughrue Mion, PLLC

(57) ABSTRACT

An inkjet ink comprising a dye, water, a water-soluble organic solvent and a betaine compound, wherein the total weight of inorganic ions in the ink is 2 wt % or less based on the ink.

15 Claims, No Drawings

INKJET INK, PRODUCTION METHOD OF INKJET INK, INKJET INK SET AND INKJET RECORDING METHOD

FIELD OF THE INVENTION

The present invention relates to an inkjet ink, an ink set and an inkjet recording method, which ensure excellent durability of images under high-humidity conditions.

BACKGROUND OF THE INVENTION

With the recent popularization of computers, an inkjet printer is widely used for printing letters or an image on paper, film, cloth or the like not only at offices but also at homes.

The inkjet recording method includes a system of jetting out a liquid droplet by applying a pressure using a piezoelectric element, a system of ejecting a liquid droplet by generating a bubble in an ink under heat, a system of using an ultrasonic wave, and a system of ejecting a liquid droplet by drawing with an electrostatic force. The ink composition used for such inkjet recording includes an aqueous ink, an oily ink and a solid (fusion-type) ink. Among these inks, the aqueous ink becomes mainstream in view of production, handleability, odor, safety and the like.

The coloring agent used in such an ink for inkjet recording method is required to have high solubility in a solvent, enable high-density recording, provide good color hue, exhibit excellent fastness to light, heat, air, water and chemicals, ensure good fixing property and less bleeding on an image-receiving material, provide an ink having excellent storability, show no toxicity, have high purity, and be available at a low cost. However, it is very difficult to find out a coloring agent satisfying these requirements in a high level.

Various dyes and pigments for inkjet recording method have been already proposed and actually used, however, a coloring agent satisfying all requirements is not yet found out at present. Conventionally well-known dyes and pigments having a Colour Index (C.I.) number can hardly satisfy both color hue and fastness required of the ink for inkjet recording method. Heretofore, studies have been made on a dye having good color hue and fastness with an attempt to develop a dye excellent as the coloring agent for inkjet recording. However, in a compound called a water-soluble dye, a water-soluble group is necessarily substituted. When the number of water-soluble groups is increased so as to improve the stability of ink, this is turned out to cause a problem in that the formed image readily bleeds under high-humidity conditions.

The present inventors have found that a betaine compound is effective for solving the problem of bleeding. However, it is revealed that when concentration of inorganic salt contained in the ink is high, the bleeding-preventing effect of the betaine compound is inhibited.

SUMMARY OF THE INVENTION

An object of the present invention is to provide an inkjet ink, a production method of an inkjet ink, an ink set and an inkjet recording method, where the image formed less bleeds even under high-humidity conditions.

Other objects of the present invention will become apparent from the following description.

The objects of the present invention can be attained by the inkjet ink, the production method of an inkjet ink, the ink set and the inkjet recording method described in the following items 1 to 7.

1) An inkjet ink comprising a dye, water, a water-soluble organic solvent and a betaine compound, wherein the total weight of inorganic ions in the ink is 2 wt % or less based on the ink.

2) A method for producing an inkjet ink comprising desalting and purifying a betaine compound and then using the betaine compound for the preparation of the ink.

3) A method for producing an inkjet ink comprising desalting and purifying an ink stock solution containing a betaine compound and then using the ink stock solution for the preparation of the ink.

4) An inkjet ink produced by the method described in 2) or 3).

5) The inkjet ink as described in 1), which is produced by the method described in 2) or 3).

6) The inkjet ink as described in 1), wherein the betaine compound is a compound having both a cationic site and an anionic site in the molecule thereof.

7) The inkjet ink as described in 6), wherein the cationic site is at least one member selected from an aminic nitrogen atom, a nitrogen atom of a heteroaromatic ring, a boron atom having 4 bonds to carbon and a phosphoric atom and the anionic site is at least one member selected from a hydroxyl group, a thio group, a sulfonamido group, a sulfo group, a carboxyl group, an imido group, a phosphoric acid group and a phosphonic acid group.

8) The inkjet ink as described in 1), wherein the dye is a dye having an oxidation potential more positive then 1.0 V (vs SCE).

9) The inkjet ink as described in 1), wherein the dye is a dye having at least two heterocyclic groups.

10) The inkjet ink as described in 9), wherein at least one of the heterocyclic groups is a 5-membered or 6-membered heterocyclic group containing at least one hetero atom selected from a nitrogen atom, an oxygen atom and a sulfur atom.

11) The inkjet ink as described in 10), wherein the heterocyclic group contains at least one heterocyclic ring selected from pyridine, thiophene, thiazole, benzothiazole, benzoxazole and furan.

12) The inkjet ink as described in 1), wherein the dye is a phthalocyanine dye having at least one group selected from —SO—, —SO$_2$—, —CO—, —CO$_2$—.

13) An inkjet ink set comprising the inkjet ink as described in any one of 1) and 4) to 12).

14) An inkjet recording method comprising recording an image by an inkjet printer using the ink described in any one of 1) and 4) to 12) or the ink set described in 13).

DETAILED DESCRIPTION OF THE INVENTION

The present invention is described in detail below.

The inkjet ink of the present invention is characterized by containing a dye, water, a water-soluble organic solvent and a betaine compound. In particular, the betaine compound is preferably a betaine-type surfactant having an oil-soluble group. Among the betaine compounds, a betaine compound represented by the formula shown below is preferably used in the present invention.

The betaine compound preferably used in the present invention is a betaine-type surfactant having surface activity.

The term "betaine compound" as used herein means a compound having both a cationic site and an anionic site in the molecule thereof. Examples of the cationic site include an aminic nitrogen atom, a nitrogen atom of a heteroaromatic ring, a boron atom having 4 bonds to carbon, and a phosphoric atom. Among these, preferred are an aminic nitrogen atom and a nitrogen atom of a heteroaromatic ring, more preferred is a quaternary nitrogen atom. Examples of the anionic site include a hydroxyl group, a thio group, a sulfonamido group, a sulfo group, a carboxyl group, an imido group, a phosphoric acid group and a phosphonic acid group. Among these, preferred are a carboxyl group and a sulfo group. The electric charge of the molecule as a whole may be cationic, anionic or neutral but is preferably neutral.

The betaine compound is preferably a compound represented by the following formula (1):

$(R)_p$—N—$[L-(COOM)_q]_r$  (1)

wherein R represents a hydrogen atom, an alkyl group, an aryl group or a heterocyclic group; L represents a divalent linking group; M represents a hydrogen atom, an alkali metal atom, an ammonium group, a protonated organic amine or nitrogen-containing heterocyclic group or a quaternary ammonium ion group, provided that when the COOM forms a counter ion (COO⁻) to an ammonium ion formed by the N atom (protonated ammonium atom) in the formula, M is not present; q represents an integer of 1 or more; r represents an integer of 1 to 4; p represents an integer of 0 to 4, provided that p+r is 3 or 4; when p+r is 4, the N atom becomes a protonated ammonium atom; when q is 2 or more, COOMs may be the same or different; when r is 2 or more, L-(COOM)$_q$S may be the same or different; and when p is 2 or more, Rs may be the same or different.

Among the compounds represented by formula (1), the betaine compound for use in the present invention is more preferably a compound represented by the following formula (2) or (3).

In formula (2), $R_1$ to $R_3$ each represent an alkyl group (which may be substituted; preferably an alkyl group having from 1 to 20 carbon atoms, e.g., methyl, ethyl, propyl, butyl, hexyl, octyl, dodecyl, cetyl, stearyl, oleyl), an aryl group (which may be substituted; preferably an aryl group having from 6 to 20 carbon atoms, e.g., phenyl, tolyl, xylyl, naphthyl, cumyl, dodecylphenyl) or a heterocyclic group (which may be substituted; preferably a heterocyclic group having from 2 to 20 carbon atoms, e.g., pyridyl, quinolyl) or $R_1$ to $R_3$ may combine with each other to form a cyclic structure. $R_1$ to $R_3$ each preferably represent an alkyl group. L represents a divalent linking group. L is preferably a divalent linking group containing an alkylene group or an arylene group as a fundamental constituent unit. In the linking main chain part, a heteroatom such as oxygen atom, sulfur atom and nitrogen atom may be contained. $R_1$ to $R_3$ and L each may be substituted by various substituents. Examples of the substituent include an alkyl group (preferably having from 1 to 20 carbon atoms, more preferably from 1 to 12 carbon atoms, still more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, still more preferably from 2 to 8 carbon atoms, e.g., propargyl, 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl, naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino, dibenzylamino), an alkoxy group (preferably having from 1 to 20 carbon atoms, more preferably from 1 to 12 carbon atoms, still more preferably from 1 to 8 carbon atoms, e.g., methoxy, ethoxy, butoxy), an aryloxy group (preferably having from 6 to 20 carbon atoms, more preferably from 6 to 16 carbon atoms, still more preferably from 6 to 12 carbon atoms, e.g., phenyloxy, 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, still more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy, benzoyloxy), an acylamino group (preferably having from 2 to 20 carbon atoms, more preferably from 2 to 16 carbon atoms, still more preferably from 2 to 10 carbon atoms, e.g., acetylamino, benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms, more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, still more preferably from 1 to 12 carbon atoms, e.g., methylthio, ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl, tosyl), a sulfinyl group (preferably having from 1 to 20 carbon atoms, more preferably from 1 to 16 carbon atoms, still more preferably from 1 to 12 carbon atoms, e.g., methanesulfinyl, benzenesulfinyl), a ureido group (preferably having from 1 to 20 carbon atoms, more preferably from 1 to 16 carbon atoms, still more preferably from 1 to 12 carbon atoms, e.g., ureido, methylureido, phenylureido), a phosphoric acid amido group (preferably having from 1 to 20 carbon atoms, more preferably from 1 to 16 carbon atoms, still more preferably from 1 to 12 carbon atoms, e.g., diethylphosphoric acid amido, phenylphosphoric acid amido), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and containing a hetero atom, for example, a nitrogen atom, an oxygen atom or a sulfur atom, e.g., imidazolyl, pyridyl, quinolyl, furyl, thienyl, piperidyl, morpholino, benzoxazolyl, benzimidazolyl, benzothiazolyl, carbazolyl, azepinyl) and a silyl group (preferably having from 3 to 40 carbon atoms, more preferably from 3 to 30 carbon atoms, still more preferably from 3 to 24 carbon atoms, e.g., trimethylsilyl, triphenylsilyl). These substituents each may be further substituted. When two or more substituents are present, these may be the same or different and if possible, these substituents may combine with each other to form a ring. Also, a plurality of betaine structures may be contained through $R_1$, $R_2$, $R_3$ or L.

In the compound represented by formula (2) for use in the present invention, at least one of $R_1$ to $R_3$ and L preferably contains a group having 8 or more carbon, atoms. In particular, $R_1$, $R_2$ or $R_3$ preferably contains a long-chain alkyl group.

$(R)_p$—N—$[L$-$(COOM^1)_q]_r$ (3)

wherein R, L, q, r and p have the same meanings as in formula (1), $M^1$ is an alkali metal ion or a hydrogen atom, provided that p+r is 3, and when p is 2 or more, Rs may be the same or different.

Formulae (1) and (3) are described below.

In the formulae, R represents an alkyl group (which may be substituted; preferably an alkyl group having from 1 to 20 carbon atoms, e.g., methyl, ethyl, propyl, butyl, hexyl, octyl, dodecyl, cetyl, stearyl, oleyl), an aryl group (which may be substituted; preferably an aryl group having from 6 to 20 carbon atoms, e.g., phenyl, tolyl, xylyl, naphthyl, cumyl, dodecylphenyl) or a heterocyclic group (which may be substituted; preferably a heterocyclic group having from 2 to 20 carbon atoms, e.g., pyridyl, quinolyl) and Rs may combine with each other to form a cyclic structure. R is preferably an alkyl group.

L represents a divalent or greater valent linking group. L is preferably a divalent or greater valent linking group containing an alkylene group, an arylene group or the like as a fundamental constituent unit. In the linking main chain part, a heteroatom such as oxygen atom, sulfur atom and nitrogen atom may be contained.

R and L each may be substituted by various substituents. Examples of the substituent include an alkyl group (preferably having from 1 to 20 carbon atoms, more preferably from 1 to 12 carbon atoms, still more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, still more preferably from 2 to 8 carbon atoms, e.g., propargyl, 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl, naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino, dibenzylamino), an alkoxy group (preferably having from 1 to 20 carbon atoms, more preferably from 1 to 12 carbon atoms, still more preferably from 1 to 8 carbon atoms, e.g., methoxy, ethoxy, butoxy), an aryloxy group (preferably having from 6 to 20 carbon atoms, more preferably from 6 to 16 carbon atoms, still more preferably from 6 to 12 carbon atoms, e.g., phenyloxy, 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl, pivaloyl), an alkoxy-carbonyl group (preferably having from 2 to 20 carbon atoms, more preferably from 2 to 16 carbon atoms, still more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy, benzoyloxy), an acylamino group (preferably having from 2 to 20 carbon atoms, more preferably from 2 to 16 carbon atoms, still more preferably from 2 to 10 carbon atoms, e.g., acetylamino, benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms., more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, still more preferably from 1 to 12 carbon atoms, e.g., methylthio, ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl, tosyl), a sulfinyl group (preferably having from 1 to 20 carbon atoms, more preferably from 1 to 16 carbon atoms, still more preferably from 1 to 12 carbon atoms, e.g., methanesulfinyl, benzenesulfinyl), a ureido group (preferably having from 1 to 20 carbon atoms, more preferably from 1 to 16 carbon atoms, still more preferably from 1 to 12 carbon atoms, e.g., ureido, methylureido, phenylureido), a phosphoric acid amido group (preferably having from 1 to 20 carbon atoms, more preferably from 1 to 16 carbon atoms, still more preferably from 1 to 12 carbon atoms, e.g., diethylphosphoric acid amido, phenylphosphoric acid amido), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and containing a heteroatom, for example, a nitrogen atom, an oxygen atom or a sulfur atom, e.g., imidazolyl, pyridyl, quinolyl, furyl, thienyl, piperidyl, morpholino, benzoxazolyl, benzimidazolyl, benzothiazolyl, carbazolyl, azepinyl) and a silyl group (preferably having from 3 to 40 carbon atoms, more preferably from 3 to 30 carbon atoms, still more preferably from 3 to 24 carbon atoms, e.g., trimethylsilyl, triphenylsilyl). These substituents each may be further substituted. When two or more substituents are present, these may be the same or different and if possible, these substituents may combine with each other to form a ring. Also, a plurality of betaine structures may be contained through R or L.

M represents a hydrogen atom, an alkali metal cation (e.g., sodium ion, potassium ion, lithium ion, cesium ion), an ammonium ion or an aminic organic cation (in the case of a primary, secondary or tertiary amine, it is a protonated amine, for example, protonated methylamine, dimethylamine, ethylamine, diethylamine, triethylamine, diazabicycloundecene, diazabicyclooctane, piperidine, pyrrolidine, morpholine, N-methylpiperidine, N-methyl morpholine, pyridine, pyrazine, aniline or N,N-dimethyl-aniline; in the case of a quaternary ammonium salt, it is, for example, tetramethylammonium ion, tetraethylammonium ion, trimethylbenzylammonium ion, methylpyridinium ion or benzylpyridinium ion). M is preferably an alkali metal ion or a hydrogen atom.

q represents an integer of 1 or more (preferably 5 or less, more preferably 2 or less), r represents an integer of 1 to 4 (preferably 1 or 2), p represents an integer of 0 to 4 (preferably 1 or 2), and p+r is 3 or 4. When p+r is 4, the N atom forms a quaternary ammonium cation and one of Ms becomes an anion in the dissociated state. When q is 2 or more, COOMs may be the same or different. When r is 2 or more L-(COOM)$_q$S may be the same or different. When p is 2 or more, Rs may be the same or different.

Furthermore, R or L preferably contains a hydrocarbon group having 8 or more carbon atoms. A compound represented by formula (4) shown below is most preferred.

R—N-(L-COOM)$_2$  (4)

wherein R and L have the same meanings as above and two (L-COOM)s may be the same or different (two Ls or two Ms may be the same or different). R is preferably an alkyl group and L is preferably an alkylene group.

Preferred examples of the betaine compound are set forth below, however, the present invention is of course not limited thereto.

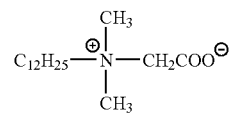 X1-1

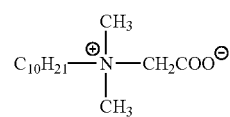 X1-2

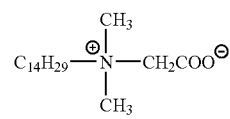 X1-3

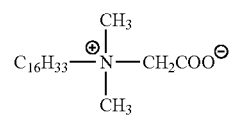 X1-4

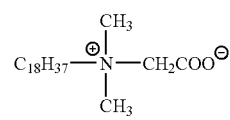 X1-5

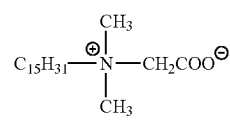 X1-6

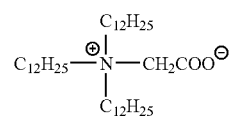 X1-7

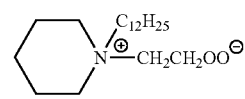 X1-8

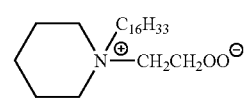 X1-9

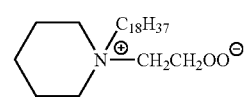 X1-10

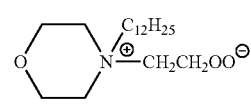 X1-11

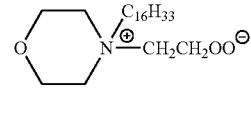 X1-12

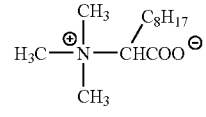 X1-13

-continued
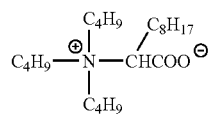 X1-14
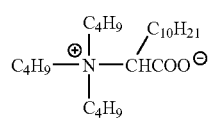 X1-15
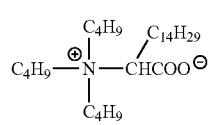 X1-16
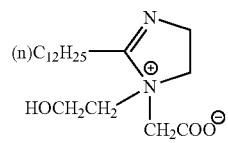 X1-17
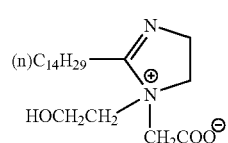 X1-18
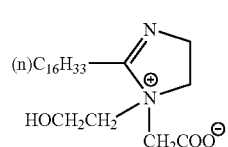 X1-19
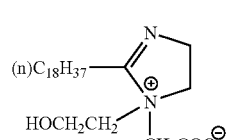 X1-20
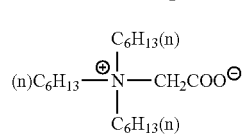 X1-21
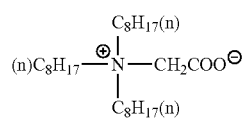 X1-22
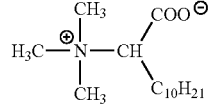 X1-23
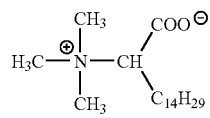 X1-24
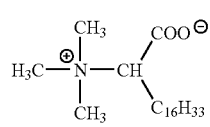 X1-25
-continued
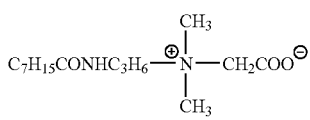 X1-26
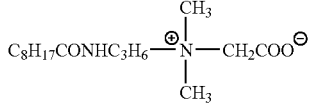 X1-27
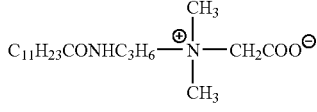 X1-28
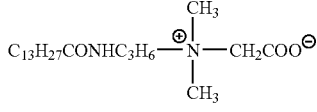 X1-29
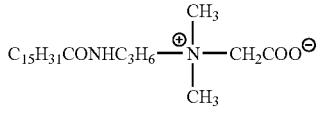 X1-30
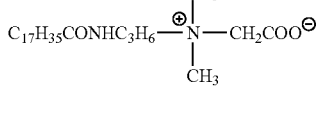 X1-31
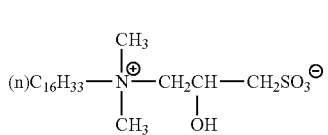 X1-32
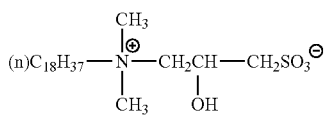 X1-33
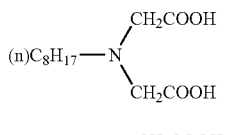 X1-34
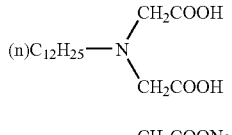 X2-1
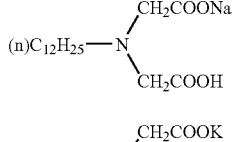 X2-2
X2-3
X2-4

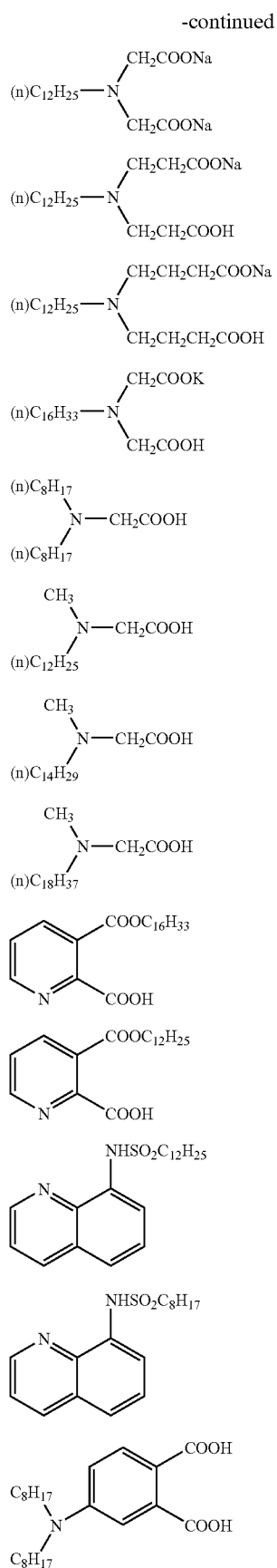
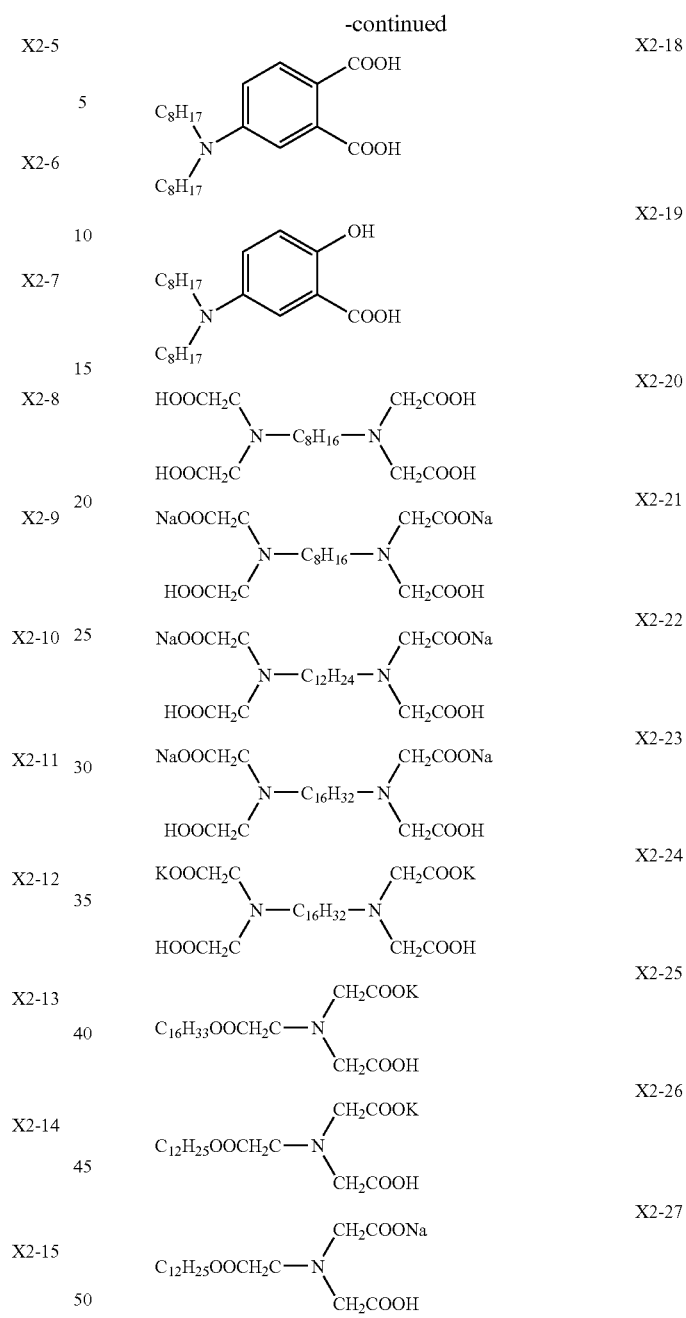

The betaine compound may be added in any amount as long as the effect of the present invention is provided, however, the amount of the betaine compound added is preferably from 0.001 to 50 wt %, more preferably from 0.01 to 20 wt %, in the ink composition. When two or more betaine compounds are used in combination, the compound used in a maximum amount is used at a weight ratio of 1 to 10,000 times to the compound used in a minimum amount.

The present invention is particularly characterized in that the total weight of inorganic ions mixed into the ink from the betaine compound (in particular, betaine surfactant) or the like is suppressed to 2 wt % or less based on the total weight of the ink. The term "inorganic ion" as used herein means the sum total of an inorganic ion as the counter ion of the dye, an inorganic ion originated in an inorganic salt as an impurity contained in the betaine surfactant, an inorganic ion working as a counter ion of ion component deviated from the ion equivalent of the betaine compound, an inorganic ion introduced from inorganic salt used for adjustment of pH, and an inorganic ion introduced from ink additives such as chelating agent and antiseptic. However, in the present invention, an ammonium ion is dealt with as a volatile compound and excluded from the inorganic ion.

The total amount of inorganic ions, as a requirement of the present invention, is 2 wt % or less of the ink, but the total amount is preferably 1 wt % or less, more preferably 0.5 wt % or less. The lower limit thereof is not particularly restricted and the less, the more preferable.

For reducing the inorganic ion content in the ink as much as possible, various methods may be used.

First, a method of removing inorganic ions contained in the raw materials (for example, betaine compound) for use in the ink, at the synthesis of the raw materials may be used. In the case of raw materials for a water-soluble ink, a large number of ion-dissociating groups are often introduced for the purpose of improving particularly the water solubility. In this case, the raw material may come to contain a large amount of an inorganic material at the synthesis or necessarily contain an inorganic ion as the counter ion. The former ion can be removed, for example, by a desalting and purification method according to electrolytic dialysis using an ion-selective permeable membrane, by a method using an ion exchange resin or by a desalting and purification method according to gel filtration.

Also, a method of actively exchanging the ion at the synthesis may be used. Examples thereof include a method of adding excess ammonia or organic amine to exchange the metal ion and, in the case of anion, a method of exchanging the anion by an organic carboxylic acid.

Furthermore, for the desalting at the synthesis, a method of aggressively precipitating a salt with an organic solvent and removing the salt by filtration may also be used.

Second, it is also preferred to perform the desalting and purification in the state of an ink stock material, that is, a thick aqueous solution (ink stock solution) obtained by dissolving various raw materials in a solvent such as water. Depending on the case, the desalting and purification can also be performed in the state of a finished ink.

The ink for use in the ink set of the present invention is an ink obtained by dissolving or dispersing a dye in water and a water-soluble organic solvent. In particular, an aqueous solution-type ink using a water-soluble dye is preferred. In the ink set, the ink containing the betaine compound may have any color or an ink having no color may be prepared for the betaine compound.

When the betaine compound according to the present invention is used, bubbles may be sometimes generated in the ink. Such bubbles give rise to the printing defect at the inkjet recording. Such a problem can be overcome by adding a compound having an action of eliminating bubbles (defoaming agent) to the ink.

Various defoaming agents such as pluronic defoaming agent (polyoxyethylene-polyoxypropylene type defoaming agent) and silicone-type defoaming agent can be used.

As the water-soluble dye, dyes such as magenta dyes described in JP-A-2002-371214 (the term "JP-A" as used herein means an "unexamined published Japanese patent application"), phthalocyanine dyes described in JP-A-2002-309118, and water-soluble phthalocyanine dyes described in JP-A-2003-12952 and JP-A-2003-12956 are preferably used. Furthermore, preferred cyanine dye, magenta dye, yellow dye and black dye are described in detail below.

The present inventors have made intensive investigations on the inkjet recording ink and: found that the properties required of the dye are 1) to give a good color hue and be free of change in the color hue (solvate), 2) to exhibit excellent fastness (to light, ozone, NOx, solvent, oil and water), 3) to be safe (not carcinogenic by Ames test, not irritating to skin and easily degradable), 4) to be inexpensive, 5) to have high $\epsilon$, 6) to be highly soluble, and 7) to have strong fixing property to media.

The properties required of the ink and conc. ink are 1) to be uniform irrespective of the temperature and aging, 2) to be less contaminated, 3) to exhibit good permeation to media, 4) to be uniform in the hitting size, 5) to be usable for all types of paper, 6) to be easily prepared, 7) to ensure no ejection error, less bubbling and easy defoaming, and 8) to be stably ejected.

The properties required of the image is 1) to be clear without bleeding, discoloration and beading, 2) to have scratch resistance, 3) to have high and uniform gloss, 4) to have good image preservability and excellent balance in color fading, 5) to be quickly dried, 6) to be printed at a high speed, and 7) to have no image density dependency in the color fading ratio.

The properties required of the inkjet recording ink is to be excellent in both light fastness and ozone resistance and small in the change of color hue and surface state (less generation of bronze and less deposition of dye). As for the light fastness (OD 1.0), the light fastness with a TAC filter on Epson PM Photographic Image-Receiving Paper by Xe of 1.1 W/m (intermittent conditions) is preferably 90% or more in terms of the residual color ratio for 3 days. Also, the dye residual ratio for 14 days is preferably 85% or more. As for the ozone resistance, the ozone resistance (OD 1.0) under the condition of 5 ppm or less of ozone is preferably 60% or more, more preferably 70% or more, still more preferably 80% or more, in terms of the dye residual ratio for one day. Also, the dye residual ratio for 5 days is preferably 25% or more, more preferably 40% or more, still more preferably 50% or more. Samples varied in the amount of the dye coated are prepared by GTC and the amount of Cu element contained in the dye is measured by a fluorescent X ray.

The Cu ion is present in the form of a phthalate as a result of decomposition of a phthalocyanine dye. The amount of the Cu salt present in an actual print is preferably 10 mg/m$^2$ or less in terms of Cu ion. The amount of Cu flowed out from the print is determined by forming an entire cyan solid image having a Cu salt amount of 20 mg/m$^2$ or less in terms of Cu ion, color-fading the image with ozone and analyzing the amount of ion flowed out into water. All Cu compounds are trapped by the image-receiving material before the color fading. The amount of ion flowed out into water is preferably 20% or less of all dyes.

It has been found by the present invention that a phthalocyanine dye having such properties can be obtained, for example, by 1) elevating the oxidation potential, 2) enhancing the association property, 3) introducing an association accelerating group, intensifying the hydrogen bond at the time of $\pi$-$\pi$ stacking, or 4) not incorporating a substituent at the $\alpha$-position, that is, facilitating the stacking.

Conventional phthalocyanine dyes used for inkjet ink are derived from an unsubstituted phthalocyanine through sulfonation and these are a mixture which cannot be specified in the number and positions of substituents. On the other hand, the dye preferably used in the inkjet recording ink of the present invention is a phthalocyanine dye which can be specified in the number and positions of substituents. The first structural feature is that the dye is a water-soluble phthalocyanine dye obtained by not passing through sulfonation of an unsubstituted phthalocyanine. The second structural feature is that the dye has an electron-withdrawing group at the β-position of a benzene ring of phthalocyanine, preferably at the β-positions of all benzene rings. Specific examples of useful dyes include those where a sulfonyl group is substituted (see,.JP-A-2002-249677 and JP-A-2003-119415), a sulfamoyl group in general is substituted (see, JP-A-2003-302623 and JP-A-2003-3109), a heterocyclic sulfamoyl group is substituted (see, JP-A-2002-294097 and JP-A-2003-3086), a heterocyclic sulfonyl group is substituted (see, JP-A-2002-275836 and JP-A-2003-3099), a specific sulfamoyl group is substituted (see, JP-A-2002-2561697), a carbonyl group is substituted (see, JP-A-2003-213153), or a specific substituent for enhancing the solubility or ink stability or preventing the bronze phenomenon, such as substituent having an asymmetric carbon (see, JP-A-2003-213168) or Li salt (see, JP-A-2003-213167) is substituted.

The first physical feature of the dye preferably used in the inkjet recording ink of the present invention is to have a high oxidation potential. The oxidation potential is preferably more positive than 1.00 V, more preferably more positive than 1.1 V, and most preferably more positive than 1.15 V. The second physical feature is to have a strong association property. Specific examples of the dye having such a property include those where the association of oil-soluble dyes is specified (see, JP-A-2001-342373) or the association of water-soluble dyes is specified (see, JP-A-2002-309118).

With respect to the relationship between the number of association accelerating groups and the performance (light absorbance of ink), when the association accelerating group is introduced, reduction of light absorbance or shifting of λmax to the shorter wave is liable to occur even in a dilute solution. With respect to the relationship between the number of association accelerating groups and the performance (reflection OD on Epson PM920 Image-Receiving Paper), as the number of association accelerating groups increases, the reflection OD at the same ion intensity more decreases. That is, the association is considered to proceed on the image-receiving paper. With respect to the relationship between the number of association accelerating groups and the performance (ozone resistance/light fastness), as the number of association accelerating groups increases, the ozone resistance is more enhanced. A dye having a large number of association accelerating groups is liable to be enhanced also in the light fastness. In order to impart the ozone resistance, it is ordinarily preferred to introduce an electron-withdrawing group as described above. The reflection OD and the fastness are in the trade-off relationship and therefore, it is necessary to enhance the light fastness without weakening the association.

Preferred embodiments of the ink of the present invention are:

1) a cyan ink where the light fastness with a TAC filter on Epson PM Photographic Image-Receiving Paper by Xe of 1.1 W/m (intermittent conditions) is 90% or more in terms of the residual color ratio for 3 days;

2) a cyan ink where after storage of a monochromatic portion printed by using a monochrome (cyan) ink to give a cyan reflection density of 0.9 to 1.1 through a Status A filter in an ozone environment of 5 ppm for 24 hours has a dye residual ratio (density after color fading/initial density×100) of 60% (preferably 80%) or more;

3) a cyan ink where after color fading with ozone under the same conditions as in 2, the amount of Cu ion flowed out into water is 20% or less of all dyes; and 4) a cyan ink having permeability such that the amount of ink permeated into a specific image-receiving paper is 30% or more of the upper portion of the image-receiving layer.

The dye contained in the cyan inkjet recording ink of the present invention is favorably a phthalocyanine dye, particularly, a phthalocyanine dye having at least one group selected from —SO—, —SO$_2$—, —CO—, —CO$_2$—. The dye is preferably a water-soluble dye having an oxidation potential more positive than 1.0, more preferably a dye having ozone gas fastness satisfying the above-described conditions, still more preferably a phthalocyanine dye represented by the following formula (CI):

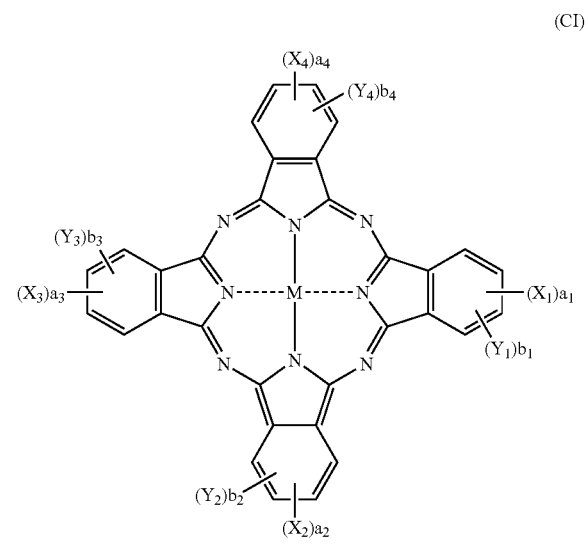

(CI)

In formula (CI), $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$. Among these substituents, preferred are —SO-Z, —SO$_2$-Z, —SO$_2$NR$_1$R$_2$ and —CONR$_1$R$_2$, more preferred are —SO$_2$-Z and —SO$_2$NR$_1$R$_2$, and most preferred is —SO$_2$-Z. In the case where $a_1$ to $a_4$ showing the number of substituents each represent a number of 2 or more, a plurality of substituents $X_1$, $X_2$, $X_3$ or $X_4$ may be the same or different and each independently represent any one of the above-described groups. $X_1$, $X_2$, $X_3$ and $X_4$ may be completely the same substituents, may be substituents of the same kind but partially different as in the case, for example, where. $X_1$, $X_2$, $X_3$ and $X_4$ all are —SO$_2$-Z and Zs are different from each other, or may include substituents different from each other, for example, —SO$_2$-Z and —SO$_2$NR$_1$R$_2$.

The phthalocyanine dye is a dye having good fastness but it is known to be inferior in the fastness to ozone gas when used as a dye for inkjet recording.

In the present invention, an electron-withdrawing group is preferably introduced into the phthalocyanine skeleton to render the oxidation potential more positive than 1.0 V (vs SCE) and thereby reduce the reactivity with ozone which is an electrophilic agent. A more positive oxidation potential is more preferred and the oxidation potential is more preferably more positive than 1.1 V (vs SCE) and most preferably more positive than 1.15 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho (Electrochemical Measuring Methods)*, Gihodo Shuppan Sha (1984).

More specifically, a test sample is dissolved at a concentration of $1 \times 10^{-2}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. The value sometimes deviates on the order of several tens of millivolts due to the effect of liquid junction potential, liquid resistance of sample solution, or the like, however, reproducibility of the potential can be guaranteed by using a standard sample (for example, hydroquinone).

In order to univocally specify the potential, in the present invention, a value (vs SCE) measured in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes more positive when an electron-withdrawing group is introduced, and becomes more negative when an electron-donating group is introduced. In the present invention, the oxidation potential is preferably rendered more positive by introducing an electron-withdrawing group into the phthalocyanine skeleton so as to reduce the reactivity with ozone that is an electrophilic agent. When the Hammett's substituent constant (p value as a measure for the electron-withdrawing property or electron-donating property of substituent is used, the oxidation potential can be rendered more positive by introducing a substituent having a large σp value, such as sulfinyl group, sulfonyl group or sulfamoyl group.

Also for the purpose of such potential control, the phthalocyanine dye represented by formula (CI) is preferably used.

The phthalocyanine dye having the above-described oxidation potential is apparently a cyan dye excellent in both the light fastness and the ozone resistance, because the dye satisfies those conditions for light fastness and ozone resistance.

The phthalocyanine dye (preferably the phthalocyanine dye represented by formula (CI)) for use in the present invention is described in detail below.

In formula (CI), $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$. Among these substituents, preferred are —SO-Z, —SO$_2$-Z, —SO$_2$NR$_1$R$_2$ and —CONR$_1$R$_2$, more preferred are —SO$_2$-Z and —SO$_2$NR$_1$R$_2$, and most preferred is —SO$_2$-Z. In the case where $a_1$ to $a_4$ showing the number of substituents each represent a number of 2 or more, a plurality of substituents $X_1$, $X_2$, $X_3$ or $X_4$ may be the same or different and each independently represent any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —SO$_2$-Z and Zs are different from each other, or may include substituents different from each other, for example, —SO$_2$-Z and —SO$_2$NR$_1$R$_2$.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that both $R_1$ and $R_2$ are hydrogen atoms.

The substituted or unsubstituted alkyl group represented by $R_1$, $R_2$ or Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, $R_1$, $R_2$, $Y_1$, $Y_2$, $Y_3$ and $Y_4$ further have a substituent. In particular, a hydroxyl group, an ether group, an ester group, a cyano group, an amido group and a sulfonamido group are preferred because the association property and fastness of dye are improved. Further, the alkyl group may be substituted by a halogen atom or an ionic hydrophilic group. The number of carbon atoms in the alkyl group does not contain carbon atoms of substituents and this applies to other groups also.

The substituted or unsubstituted cycloalkyl group represented by $R_1$, $R_2$ or Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, $R_1$, $R_2$, $Y_1$, $Y_2$, $Y_3$ and $Y_4$ further have a substituent. In particular, a hydroxyl group, an ether group, an ester group, a cyano group, an amido group and a sulfonamido group are preferred because the association property and fastness of dye are improved. Further, the cycloalkyl group may be substituted by a halogen atom or an ionic hydrophilic group.

The substituted or unsubstituted alkenyl group represented by $R_1$, $R_2$ or Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, $R_1$, $R_2$, $Y_1$, $Y_2$, $Y_3$ and $Y_4$ further have a substituent. In particular, a hydroxyl group, an ether group, an ester group, a cyano group, an amido group and a sulfonamido group are preferred because, the association property and fastness of dye are improved. Further, the alkenyl group may be substituted by a halogen atom or an ionic hydrophilic group.

The substituted or unsubstituted aralkyl group represented by $R_1$, $R_2$ or Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, $R_1$, $R_2$, $Y_1$, $Y_2$, $Y_3$ and $Y_4$ further have a substituent. In particular, a hydroxyl group, an ether group, an ester group, a cyano group, an amido group and a sulfonamido group are preferred because the association property and fastness of dye are improved. Further, the aralkyl group may be substituted by a halogen atom or an ionic hydrophilic group.

The substituted or unsubstituted aryl group represented by $R_1$, $R_2$ or Z is preferably an aryl group having from 6 to 30 carbon atoms. Examples of the substituent include those described later as the substituent when Z, $R_1$, $R_2$, $Y_1$, $Y_2$, $Y_3$ and $Y_4$ further have a substituent. In particular, an electron-withdrawing group is preferred because the dye can have a noble oxidation potential and can be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_1$, $R_2$ or Z is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and Z are shown below in the form of a heterocyclic ring by omitting the substitution site. The substitution site is not limited and, for example, in the case of pyridine, the 2-position, 3-position and 4-position can be substituted. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. The groups each may have a substituent and examples of the substituent include those described later as the substituent when Z, $R_1$, $R_2$, $Y_1$, $Y_2$, $Y_3$ and $Y_4$ further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy-group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. The groups each may further have a substituent.

$Y_1$, $Y_2$, $Y_3$ and $Y_4$ each preferably represent a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, $R_1$, $R_2$, $Y_1$, $Y_2$, $Y_3$ and $Y_4$ each represent a group which further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group, a cyclopentyl group, a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methane-sulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxy-carbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylamino-phenylazo, 2-hydroxy-4- propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxy-phosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (CI) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among the counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, per molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represent an integer of 0 to 4 but all are not 0 at the same time. $b_1$ to $b_4$ each independently represent an integer of 0 to 4. When $a_1$, $a_2$, $a_3$, $a_4$, $b_1$, $b_2$, $b_3$ or $b_4$ represents a number of 2 or more, a plurality of substituents $X_1$, $X_2$, $X_3$, $X_4$, $Y_1$, $Y_2$, $Y_3$ or $Y_4$ are present and these may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). In such a case, Ms may be the same or different.

The divalent linking group represented by L is preferably an oxy group —O—, a thio group —S—, a carbonyl group —CO—, a sulfonyl group —SO$_2$—, an imino group —NH—, a methylene group —CH$_2$— or a group formed by combining two or more of these groups.

As for the preferred combination of substituents in the compound represented by formula (CI), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (CI), a phthalocyanine dye having a structure represented by formula (CII) is more preferred.

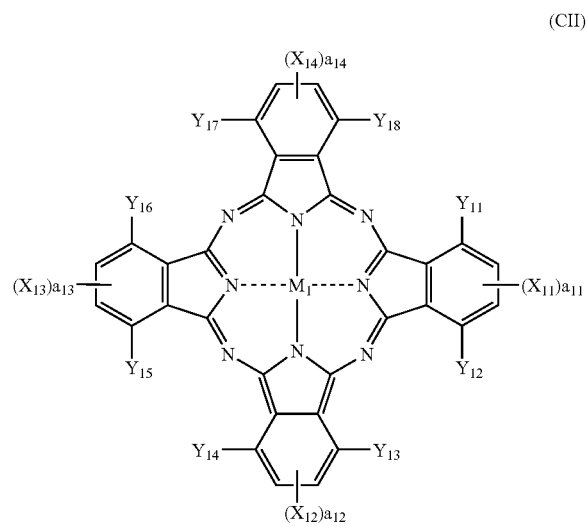

(CII)

The phthalocyanine dye represented by formula (CII) of the present invention is described in detail below.

In formula (CII), $X_{11}$ to $X_{14}$ and $Y_{11}$ to $Y_{18}$ have the same meanings as $X_1$ to $X_4$ and $Y_1$ to $Y_4$ in formula (CI), respectively, and preferred examples are also the same. $M_1$ has the same meaning as M in formula (CI) and preferred examples are also the same.

In formula (CII), $a_{11}$ to $a_{14}$ each independently represent an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —SO$_2$-Z and Zs are different from each other, or may include substituents different from each other, for example, —SO$_2$-Z and —SO$_2$NR$_1$R$_2$.

In the phthalocyanine dye represented by formula (CII), the following combinations of substituents are particularly preferred.

$X_{11}$ to $X_{14}$ each independently represents preferably —SO-Z, —SO$_2$-Z, —SO$_2$NR$_1$R$_2$ or —CONR$_1$R$_2$, more preferably —SO$_2$-Z or —SO$_2$NR$_1$R$_2$, and most preferably —SO$_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced.

Also, the case where a hydroxyl group, an ether group, an ester group, a cyano group, an amido group or a sulfonamido group is present in the substituent is preferred because the association property and fastness are improved.

$R_1$ and $R_2$ each independently represent preferably a hydrogen atom, a substituted or unsubstituted alkyl group, a substituted or unsubstituted aryl group or a substituted or unsubstituted heterocyclic group, and more preferably a hydrogen atom, a substituted alkyl group, a substituted aryl group or a substituted heterocyclic group. However, it is not preferred that both $R_1$ and $R_2$ are hydrogen atoms. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the association property and fastness are improved.

$Y_{11}$ to $Y_{18}$ each independently represent preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represent preferably 1 or 2 and it is more preferred that all are 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (CII) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among the counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, per molecule.

As for the preferred combination of substituents in the compound represented by formula (CII), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron-withdrawing group such as sulfinyl group, sulfonyl group, and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of ordinary publications and they are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979).

Inevitably in view of the synthesis method, the phthalocyanine derivative represented by formula (CI) is usually a mixture of analogues different in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine dye analogue mixtures represented by formulae (CI) and (CII) are defined by classifying these into the following three types based on the substitution site. The positions of $Y_{11}$, $Y_{12}$, $Y_{13}$, $Y_{14}$, $Y_{15}$, $Y_{16}$, $Y_{17}$ and $Y_{18}$ in formula (CII) are designated as 1, 4, 5, 8, 9, 12, 13 and 16, respectively.

(1) β-Position Substitution Type:

A phthalocyanine dye having specific substituents at the 2- and/or 3-position, the 6- and/or 7-position, the 10- and/or 11-position, and the 14- and/or 15-position.

(2) α-Position Substitution Type:

A phthalocyanine dye having specific substituents at the 1- and/or 4-position, the 5- and/or 8-position, the 9- and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives different in the structure (particularly in the substitution site) are described by using the β-position substitution type, α-position substitution type and α, β-position mixed substitution type.

The phthalocyanine derivative for use in the present invention can be synthesized by combining the methods described or cited, for example, in Shirai and Kobayashi, *Phthalocyanine-Kagaku to Kino-(Phthalocyanine-Chemistry and Function-)*, pp. 1–62, IPC, and C. C. Leznoff and A. B. P. Lever, *Phthalocyanines—Properties and Applications*, pp. 1–54, VCH, or methods analogous thereto.

The phthalocyanine compound represented by formula (CI) of the present invention can be synthesized, for example, through sulfonation, sulfonyl chloridation or amidation of an unsubstituted phthalocyanine compound as described in WO 00/17275, WO 00/08103, WO 00/08101 and WO 98/41853 and JP-A-10-36471. In such a case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those different in the number of substituents or in the substitution site inevitably results. If the compound of the present invention is synthesized starting from such a product, the compound of the present invention is obtained as an α,β-position mixed substitution type mixture containing several kinds of compounds different in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes more positive and the ozone resistance is increased. However, according to the above-described synthesis method, a phthalocyanine dye where the number of electron-withdrawing groups introduced is small, namely, the oxidation potential is more negative, is inevitably mingled. Therefore, in order to improve the ozone resistance, it is preferred to use a synthesis method where the production of a compound having a more negative oxidation potential is suppressed.

The phthalocyanine compound represented by formula (CII) of the present invention can be synthesized, for example, by reacting a phthalonitrile derivative (Compound P) shown below and/or a diiminoisoindoline derivative (Compound Q) shown below with a metal derivative represented by formula (CIII) or can be derived from a tetrasulfophthalocyanine compound obtained by reacting a 4-sulfophthalonitrile derivative (Compound R) shown below with a metal derivative represented by formula (CIII).

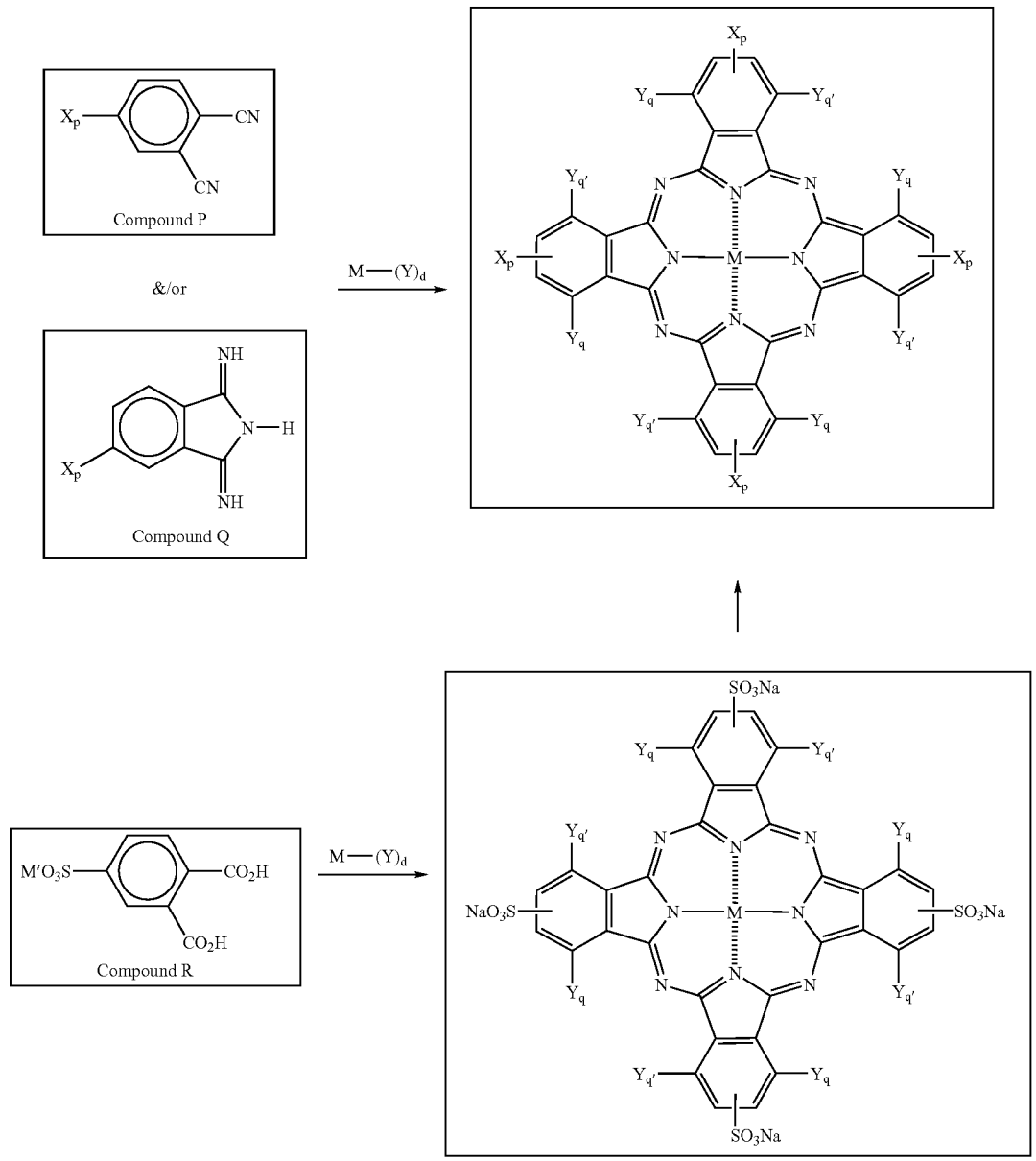

In the formulae above, $X_p$ corresponds to $X_{11}$, $X_{12}$, $X_{13}$ or $X_{14}$ in formula (CII) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (CII). In Compound R, M' represents a cation.

Examples of the cation represented by M' include an alkali metal ion such as Li, Na or K, and an organic cation such as triethylammonium ion or pyridinium ion.

$$M\text{-}(Y)_d \qquad \text{(CIII)}$$

wherein M has the same meaning as M in formulae (CI) and (CII), Y represents a monovalent or divalent ligand such as halogen atom, acetate anion, acetylacetonate and oxygen, and d represents an integer of 1 to 4.

That is, according to the above-described synthesis method, a specific number of desired substituents can be introduced. Particularly, in the case of introducing a large number of electron-withdrawing groups so as to render the oxidation potential more positive as in the present invention, the synthesis method is very excellent as compared with the above-described method for synthesizing the phthalocyanine compound of formula (CI).

The thus-obtained phthalocyanine compound represented by formulae (CII) is usually a mixture of compounds represented by the following formulae (a)–1 to (a)–4 which are isomers with respect to the substitution site of each $X_p$, namely, the β-position substitution type.

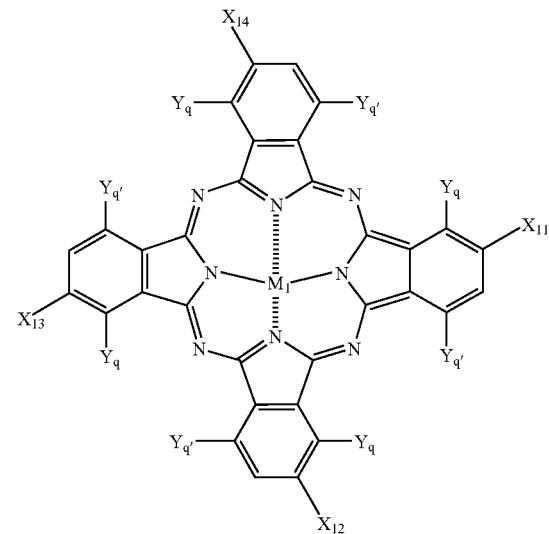
(a)-1

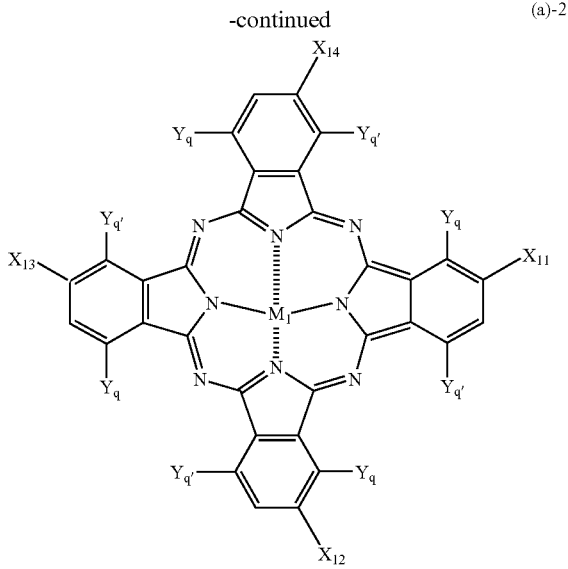
(a)-2

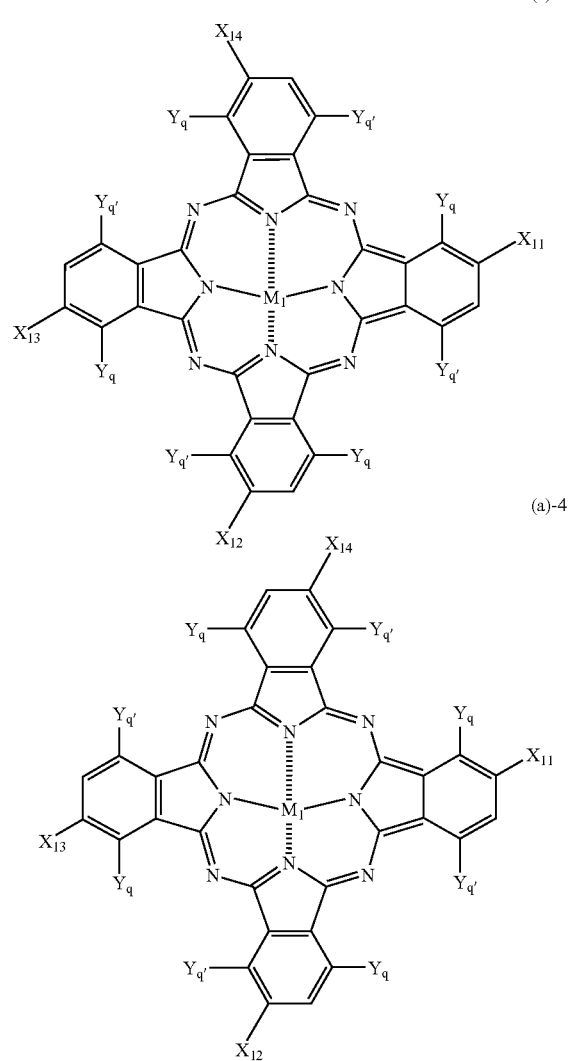
(a)-3

(a)-4

In the synthesis method above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (CII), the dyes having electron-withdrawing substituents different from each other are preferred because the solubility and association property of dye and the aging stability of ink can be controlled.

In the present invention, it has been found very important for the improvement of fastness that in any substitution type, the oxidation potential is more positive than 1.0 V (vs SCE). The great effect thereof cannot be expected at all from the above-described known techniques. Furthermore, although the reason is not entirely clear, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (CI) and (CII) are set forth below, however, the phthalocyanine dye for use in the present invention is not limited to the following examples.

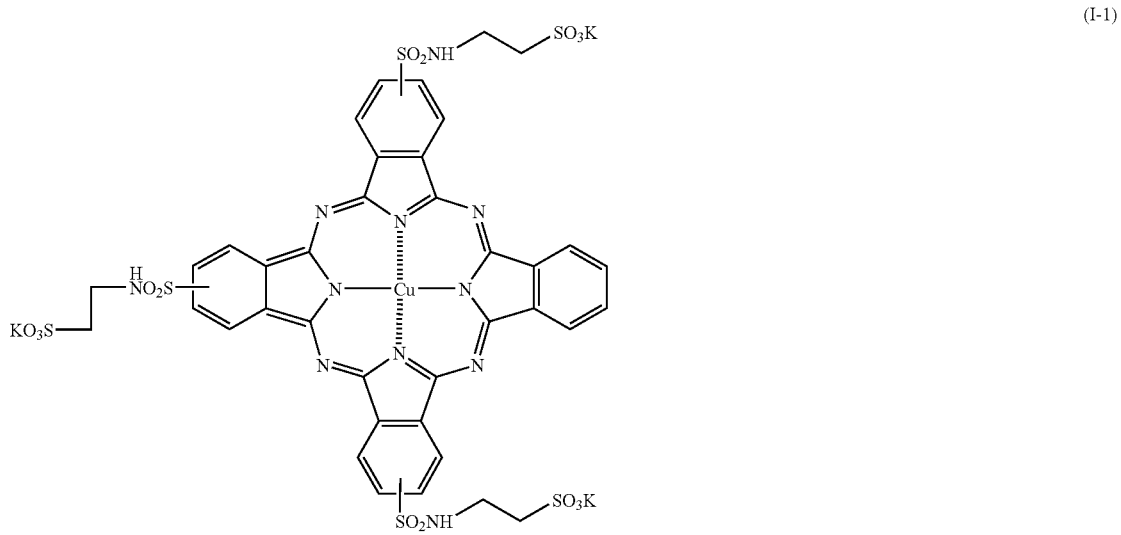

(I-1)

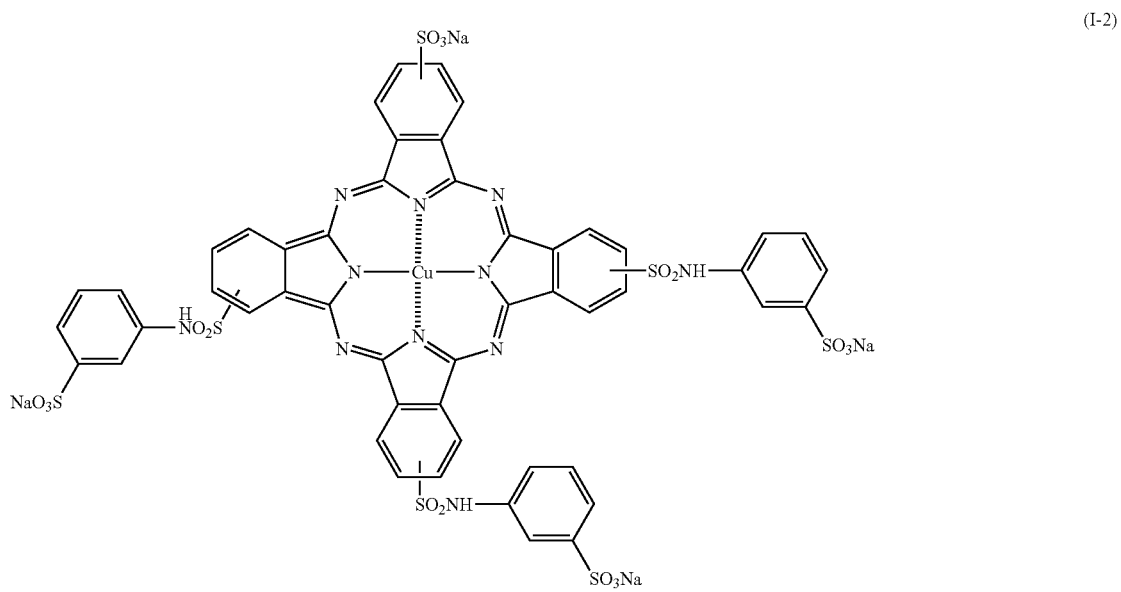

(I-2)

-continued
(I-3)
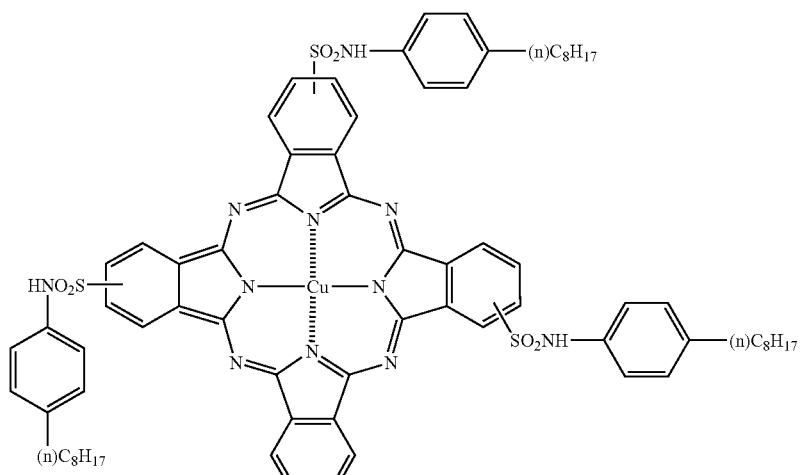
(I-4)
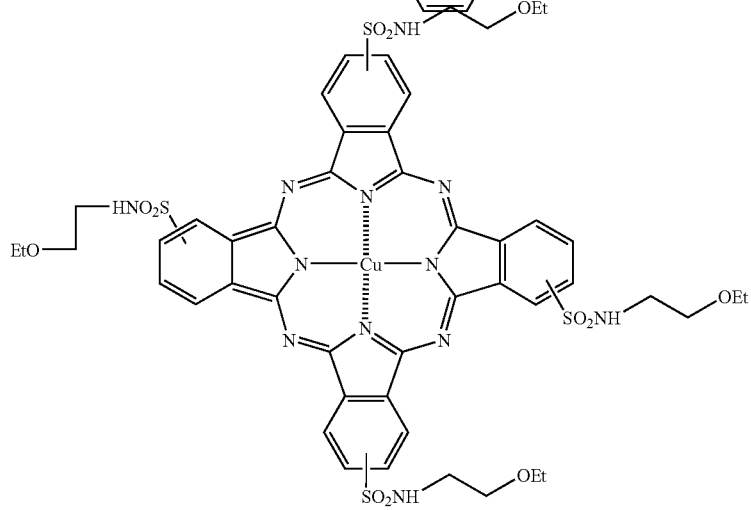
(I-5)
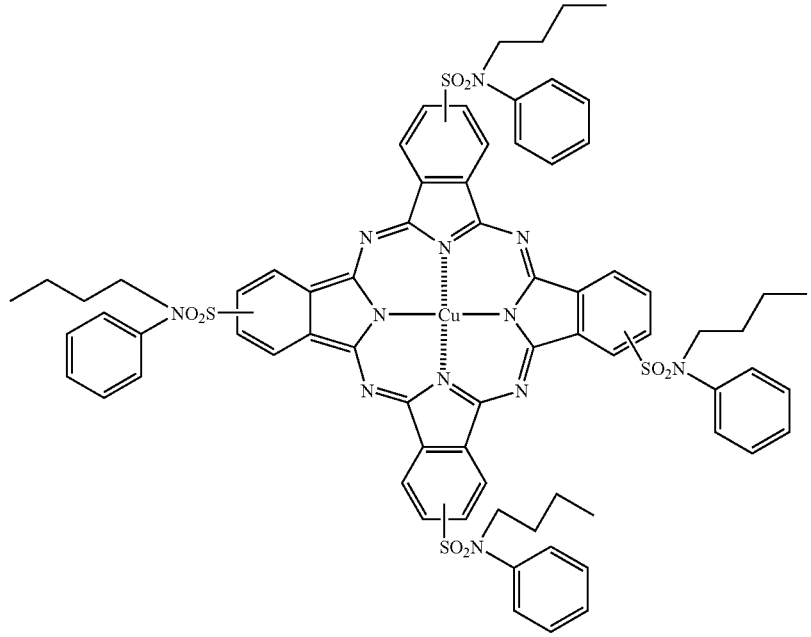

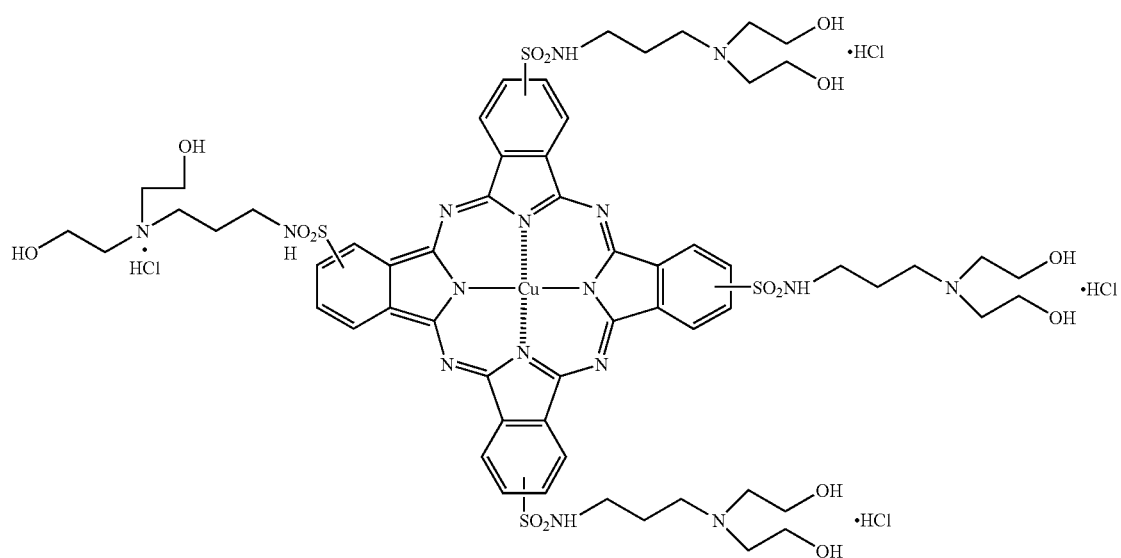
(I-6)
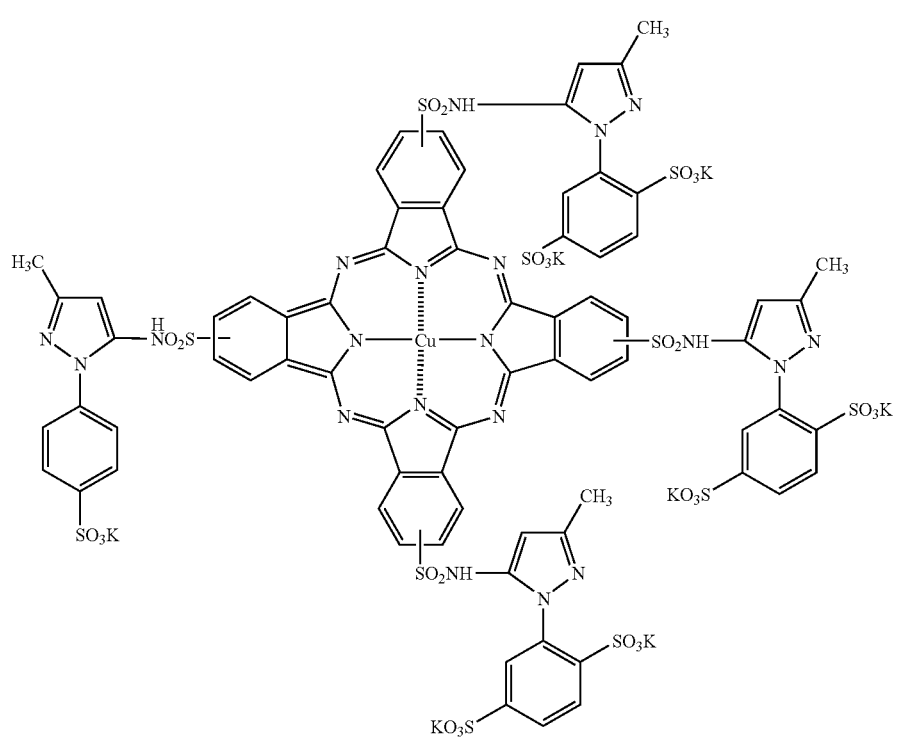
(I-7)

(I-8)
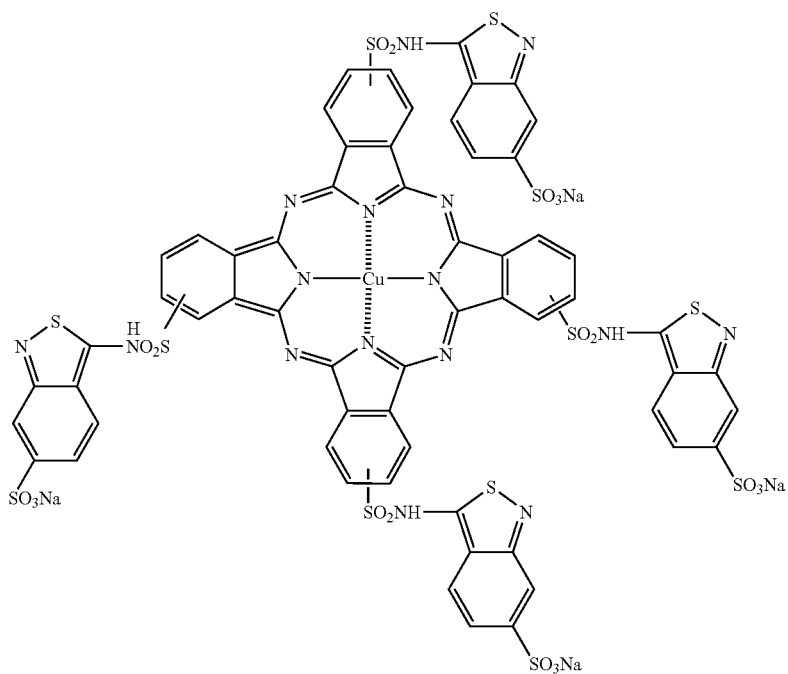
(I-9)
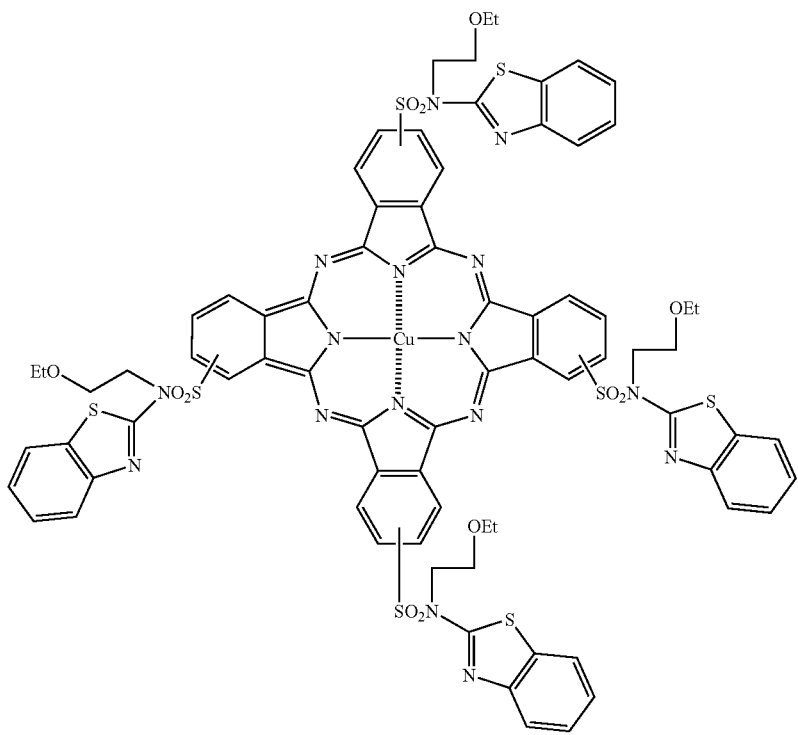

-continued
(I-10)
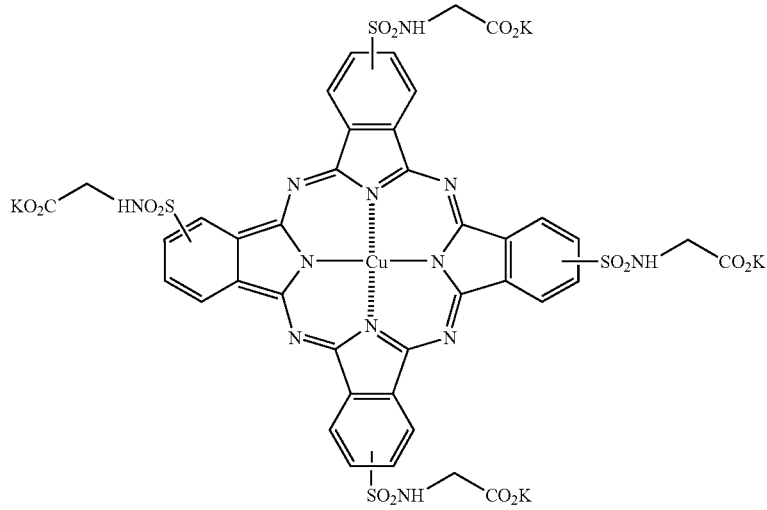
(I-11)
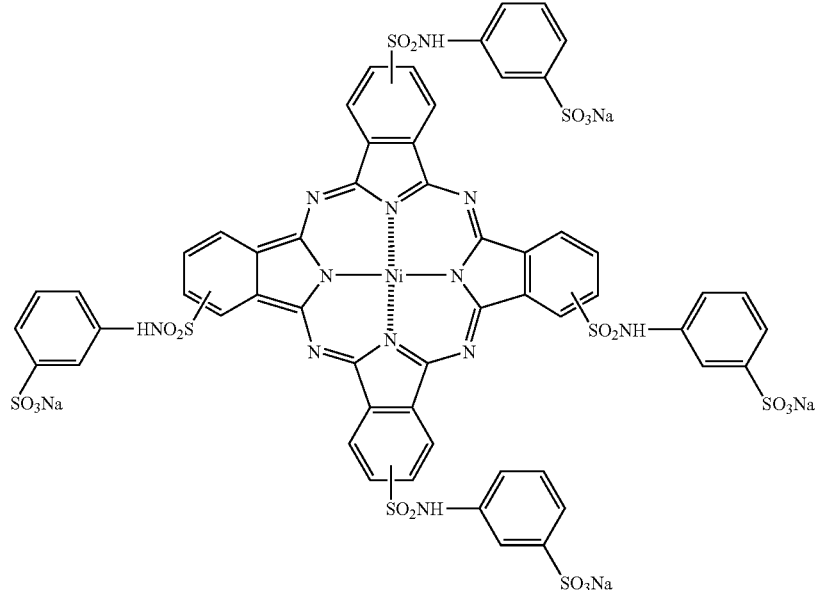
(I-12)
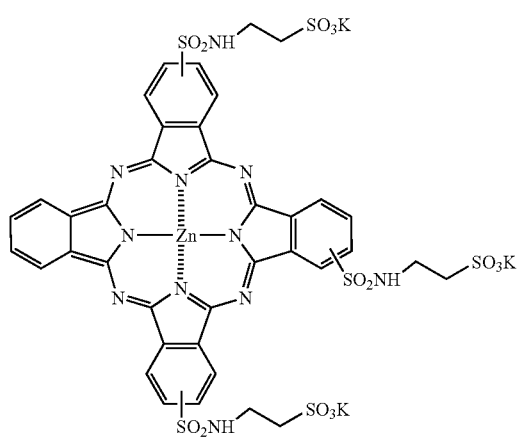
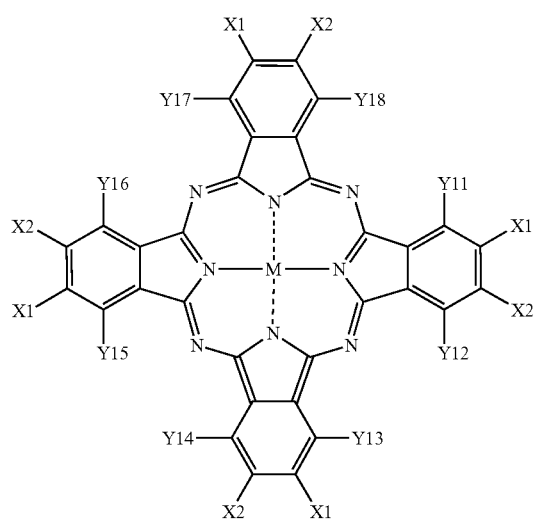

In the following tables, in the specific examples such as pairs (X1, X2), (Y11, Y12), (Y13, Y14), (Y15, Y16) and (Y17, Y18), the positions of each of members of the given pair are exchangeable with each other. For example, the position of X1 can be exchanged with the position of X2.

| No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |
| 111 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$NH(CH$_2$)$_3$—N$^+$(CH$_3$)(CH$_2$CH$_2$OH)$_2$·CH$_3$—C$_6$H$_4$—SO$_3^-$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 118 | Cu | —SO₂CH₂CH₂CH(CH₃)SO₃Li | —H | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)(CH₃) | —H | —H, —H | —H, —H | —H, —H | —H, —H |
| 128 | Zn | —SO₂—CH₂—CH(OCH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO₂—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(2-SO₃Li)(5-SO₃Li) | —H | —H, —H | —H, —H | —H, —H | —H, —H |
| 132 | Cu | —SO₂NH—C₆H₃(3-CO₂C₆H₁₃(n))(5-CO₂C₆H₁₃(n)) | —H | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 133 | Cu | —SO$_2$NH—C$_6$H$_3$(OCH$_2$CH$_2$OCH$_3$)(SO$_2$NHCH$_2$CH(C$_2$H$_5$)C$_4$H$_9$) | —H | —H, —H | —H, —H | —H, —H | —H, —H |
| 134 | Cu | —SO$_2$NH—C$_6$H$_4$—SO$_2$—NH—CH$_2$—CH(CH$_2$CH$_3$)—CH$_2$CH$_2$—CH$_2$—CH$_3$ | —H | —H, —H | —H, —H | —H, —H | —H, —H |
| 135 | Cu | —SO$_2$—C$_6$H$_4$—CO$_2$Na | —H | —H, —H | —H, —H | —H, —H | —H, —H |
| 136 | Cu | —SO$_2$N(C$_4$H$_9$(n))(C$_6$H$_5$) | —H | —H, —H | —H, —H | —H, —H | —H, —H |
| 137 | Cu | —SO$_2$-(benzothiazol-2-yl-6-SO$_3$Li) | —H | —H, —H | —H, —H | —H, —H | —H, —H |
| 138 | Cu | —SO$_2$NH-(3-methyl-1-(2,5-di(LiO$_3$S)phenyl)pyrazol-5-yl) | —H | —H, —H | —H, —H | —H, —H | —H, —H |
| 139 | Cu | —SO$_2$(CH$_2$)$_3$—NH—C(O)—C$_6$H$_3$(CO$_2$Li)(CO$_2$Li) | —Cl | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 140 | Cu | —CO₂—CH₂CH₂CH₂—NH— triazine with NH—CH₂—CH₂—CH(CH₃)—SO₃Li and NH—CH₂—CH₂—CH(CH₃)—SO₃Li | —H | —H, —H | —H, —H | —H, —H | —H, —H |
| 141 | Cu | —SO₂NH—CH(COONa)—CH₂—CO—N—(CH₂CH₂OH)₂ | —H | —H, —H | —H, —H | —H, —H | —H, —H |
| 142 | Cu | —SO₂NH—C₆H₄—NHCO—C₆H₄—SO₃Li | —H | —H, —H | —H, —H | —H, —H | —H, —H |
| 143 | Cu | —CO—NH—CH₂—CH(OH)—CO—NH—CH(COOK)—CH₂CH₂—SO₃K | —H | —H, —H | —H, —H | —H, —H | —H, —H |
| 144 | Cu | —SO₂—CH₂CH₂CH₂—NH—CO—C₆H₄—CO—NH—CH(COOLi)—CH₂—COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

M-Pc (X$_{p1}$)$_m$(X$_{p2}$)$_n$

In the following tables, the introduction positions of the substituents (X$_{p1}$) and (X$_{p2}$) in each compound are exchangeable with each other in the β-position substitution type phthalocyanine dye.

| No. | M | $X_{P_1}$ | m | $X_{P_2}$ | n |
|---|---|---|---|---|---|
| 146 | Cu | $-SO_2-NH-CH_2-CH(CH_3)-SO_3Li$ | 3 | $-SO_2-NH-CH_2-CH(OH)-CH_3$ | 1 |
| 147 | Cu | $-SO_2-NH-CH_2-CH_2SO_3Li$ | 3 | $-SO_2-NH-CH_2-CH_2-SO_2-NH-CH_2-CH(OH)-CH_3$ | 1 |
| 148 | Cu | $-SO_2-NH-CH_2-CH(CH_3)-SO_3Li$ | 3 | $-SO_2NH-CH_2-CH_2-SO_2-NH-CH_2-CH_2-O-CH_2-CH_2-OH$ | 1 |
| 149 | Cu | $-SO_2-NH-CH_2-CH(CH_3)-SO_3Li$ | 2 | $-SO_2-NH-CH_2-CH_2-CO-N+(CH_2-CH_2-OH)_2$ | 2 |
| 150 | Cu | $-SO_2-NH-CH_2-CH_2-SO_2-NH-CH_2CH_2-COONa$ | 3 | $-SO_2NH-CH(CH_3)-CH_2OH$ | 1 |
| 151 | Cu | $-SO_2-NH-C_6H_4-SO_2NH-CH_2-CH(OH)-SO_3Li$ | 3 | $-SO_2NH-CH_2-CH_2-O-CH_2-CH_2-OH$ | 1 |
| 152 | Cu | $-SO_2-CH_2-CH_2-CH(CH_3)-SO_3Li$ | 2.5 | $-SO_2-CH_2-CH_2-O-CH_2-CH_2-OH$ | 1.5 |
| 153 | Cu | $-SO_2-CH_2-CH_2-CH(CH_3)-SO_3Na$ | 2 | $-SO_2-CH_2-CH_2-CO-N+(CH_2-CH_2-OH)_2$ | 2 |
| 154 | Cu | $-SO_2-CH_2-CH_2-CH_2-SO_3Li$ | 3 | $-SO_2-CH_2-CH_2-SO_2-NH-CH_2-CH(OH)-CH_3$ | 1 |
| 155 | Cu | $-SO_2-CH_2-CH_2-CH_2-COOK$ | 2 | $-SO_2-CH_2-CH_2-SO_2-NH-CH_2-CH(OH)-CH_2-COOK$ | 2 |
| 156 | Cu | $-SO_2-CH_2-CH_2-CH_2-SO_3Li$ | 3 | $-SO_2-CH_2-CH(OH)-CH_2-SO_3Li$ | 1 |

-continued

| No. | M | $X_{P_1}$ | m | $X_{P_2}$ | n |
|---|---|---|---|---|---|
| 157 | Cu | —SO$_2$—CH$_2$—CH$_2$—O—CH$_2$—CH$_2$—SO$_3$Li | 2 | —SO$_2$—CH$_2$—CH$_2$—CH$_2$—CO$_2$—CH$_2$—CH(OH)—CH$_2$—COOK | 2 |
| 158 | Cu | —SO$_2$—CH$_2$—CH(OH)—CH$_2$—CH$_2$SO$_3$Li | 3 | —SO$_2$NH—CH$_2$—CH(OH)—CH$_2$—OH (via p-phenylene —SO$_2$CH$_2$—) | 1 |
| 159 | Cu | —SO$_2$NHCH$_2$CH$_2$—SO$_3$Li | 3 | —SO$_2$—CH$_2$—CH$_2$—SO$_2$—NH—CH$_2$—CH(OH)—CH$_3$ | 1 |
| 160 | Cu | —SO$_2$—CH$_2$—CH$_2$—O—CH$_2$—CH$_2$—O—CH$_2$—CH$_2$—SO$_3$Na | 3 | —SO$_2$—CH$_2$—CH$_2$—CO—NH—CH(CH$_2$COONa)—CH$_2$—COONa | 1 |
| 161 | Cu | —SO$_2$CH$_2$CH$_2$SO$_3$Li | 3 | —SO$_2$CH$_2$CH$_2$SO$_2$NHCH$_2$—CH(OH)—CH$_2$SO$_3$Li | 1 |
| 162 | Cu | —SO$_2$CH$_2$CH$_2$SO$_3$Li | 2 | —SO$_2$CH$_2$CH$_2$OCH$_2$CH$_2$OCH$_2$CH$_2$OH | 2 |
| 163 | Cu | —SO$_2$CH$_2$CH$_2$SO$_3$K | 3 | —SO$_2$CH$_2$CH$_2$SO$_2$NH—CH(CH$_3$)—CH$_2$—OH | 1 |
| 164 | Cu | —SO$_2$CH$_2$CH$_2$SO$_3$Li | 2 | —SO$_2$CH$_2$CH$_2$SO$_2$N(CH$_2$CH$_2$OH)$_2$ | 2 |
| 165 | Cu | —CO—NH—CH$_2$—CH$_2$—SO$_3$K | 3 | —CO—NH—CH$_2$—O—CH$_2$—CH$_2$—OH | 1 |
| 166 | Cu | —CO—NH—CH$_2$—CH$_2$—SO$_2$—NH—CH$_2$—CH$_2$—COONa | 3 | —CO—NH—CH$_2$—CH(OH)—CH$_3$ | 1 |
| 167 | Cu | —SO$_2$(CH$_2$)$_3$SO$_2$NHCH$_2$—CH(OH)—CH$_2$CO$_2$Li | 2.5 | —CO—NH—CH$_2$—CH$_2$—CO—N—(CH$_2$—CH$_2$—OH)$_2$ | 1.5 |
| 168 | Cu | —CO$_2$—CH$_2$—CH(CH$_3$)—CH—SO$_3$Na | 2 | —CO—CH$_2$—CH$_2$—CO—N—(CH$_2$—CH$_2$—OH)$_2$ | 2 |
| 169 | Cu | —CO$_2$—CH$_2$—CH$_2$—CH$_2$—SO$_3$Li | 3 | —CO$_2$—CH$_2$—CH$_2$—CH$_2$—SO$_2$—NH—CH$_2$—CH(OH)—CH$_3$ | 1 |

-continued

| No. | M | Xp1 | m | Xp2 | n |
|---|---|---|---|---|---|
| 170 | Cu | —CO₂—CH₂—CH₂—CH₂COOK | 2 | —CO₂—CH₂—CH₂—SO₂—NH—CH₂—CH(OH)—CH₂—COOK | 2 |
| 171 | Cu | —CO₂—CH₂—CH₂—O—CH₂—CH₂—O—CH₂—CH₂—SO₃Na | 3 | —SO₂—CH₂—C₆H₄—SO₂NH—CH₂—CH(OH)—CH₂—OH | 1 |
| 172 | Cu | —SO₂CH₂CH₂OCH₂CH₂O—CH₂CH₂SO₃K | 2 | —CO₂—CH₂—CH₂—CO₂—CH₂—CH₂—CH(OH)—CH₂—COOK | 2 |
| 173 | Cu | —SO₂(CH₂)₃SO₂NHCH₂CHCH₂OH(OH) | 2 | —CO₂—CH₂—CH(OH)—CH₂—SO₃Li | 2 |
| 174 | Cu | —SO₂(CH₂)₃SO₂NHCH₂—CH(OH)—CH₂SO₃K | 3 | —CO₂—CH₂—CH₂—SO₂—NH—CH₂—CH(OH)—CH₃ | 1 |
| 175 | Cu | —SO₂(CH₂)₃SO₂NH(CH₂)₃N(CH₂CH₂OH)₂ | 2 | —CO₂—CH₂—CH₂—CO—NH—CH₂—COOLi (CH₂—CH₂—COOLi) | 2 |
| 176 | Cu | —SO₂—CH₂—CH₂—CH₂—SO₂—NH—CH₂—CH(OH)—CH₃ | 3 | —SO₂—CH₂—CH₂—CO₂—CH₂—CH₂—CH₂—CH₂—CH₂—CH₃ (CH₂CH₃) | 1 |
| 177 | Cu | —SO₂—CH₂—CH₂—O—CH₂—CH₂—O—CH₂ | 2 | —SO₂—CH₂—CH₂—SO₂—NH—CH₂—CH(OH)—CH₃ | 1 |
| 178 | Cu | —SO₂—CH₂—CH₂—O—CH₂—CH₂—O—CH₂—CH₂—OH | 3 | —SO₂—CH₂—CH₂—CO₂—CH₂—CH₂—CH₂—CH₂—CH₂—CH₃ (CH₂CH₃) | 1 |
| 179 | Cu | —SO₂—CH₂—CH(CH₂CH₃)—CH₂—CH₂—CH₃ | 2 | —SO₂—CH₂—CH₂—SO₂—NH—CH₂—CH(O—CH₃)—CH₃ | 2 |
| 180 | Cu | —SO₂—CH₂—CH₂—CH₂—SO₂—NH—CH₂—CH(O—CH₃)—CH₃ | 3 | —SO₂NH—CH₂—SO₂NH—CH₂—CH₂—O—CH₂—CH₂—OH | 1 |

-continued

| No. | M | $X_{P_1}$ | m | $X_{P_2}$ | n |
|---|---|---|---|---|---|
| 181 | Cu | —SO$_2$—CH$_2$—CH$_2$—CO$_2$—NH—CH(CH$_3$)—CH$_2$—CH$_3$ | 3 | —SO$_2$—CH$_2$—CH$_2$—SO$_2$—NH—CH(CH$_3$)$_2$ | 1 |
| 182 | Cu | —SO$_2$—CH$_2$—CH$_2$—SO$_2$NH—CH$_2$—CH(OH)—CH$_3$ | 2.5 | —SO$_2$—CH$_2$—CH$_2$—CO$_2$—NH—CH(CH$_3$)—CH$_2$—CH$_3$ | 1.5 |
| 183 | Cu | —SO$_2$—CH$_2$—CH$_2$—CO$_2$—NH—CH(CH$_3$)—CH$_2$—CH$_3$ | 2 | —SO$_2$—CH$_2$—CH$_2$—SO$_2$—NH—(CH$_2$)$_3$—CH$_2$—O—CH$_2$CH$_2$—OH | 2 |
| 184 | Cu | —SO$_2$—CH$_2$—CH$_2$—SO$_2$—NH—CH$_2$—CH(OH)—CH$_3$ | 3 | —SO$_2$—CH$_2$—CH$_2$—O—CH$_3$ | 1 |
| 185 | Cu | —SO$_2$—CH$_2$—CH$_2$—SO$_2$—NH—CH$_2$—CH(OH)—CH$_3$ | 3 | —SO$_2$—CH$_2$—CH$_2$—O—CH$_2$—CH$_2$—O—CH$_3$ | 1 |
| 186 | Cu | —SO$_2$—CH$_2$—CH$_2$—CO$_2$—NH—CH(CH$_3$)—CH$_2$—CH$_3$ | 3 | —SO$_2$—CH$_2$—CH$_2$—O—CH$_2$—CH$_2$—OH | 1 |
| 187 | Cu | —SO$_2$—CH$_2$—CH$_2$—SO$_2$—NH—CH(CH$_3$)$_2$ | 3 | —CO$_2$—CH$_2$—CH(CH$_2$CH$_3$)—CH$_2$—CH$_2$—CH$_3$ | 1 |
| 188 | Cu | —CO$_2$—CH$_2$—CH$_2$—CO$_2$—NH—CH(CH$_3$)—CH$_2$—CH$_3$ | 3 | —CO$_2$—CH$_2$—CH$_2$—O—CH$_2$—CH$_2$—O—CH$_3$ | 1 |
| 189 | Cu | —CO—NH—CH$_2$—CH$_2$—SO$_2$—NH—CH(CH$_3$)$_2$ | 3 | —SO$_2$—NH—CH$_2$—CH(CH$_2$CH$_3$)—CH$_2$—CH$_2$—CH$_3$ | 1 |
| 190 | Cu | —CO—NH—CH$_2$—CH(CH$_2$CH$_3$)—CH$_2$—CH$_2$—CH$_2$CH$_3$ | 3 | —CO—NH—CH$_2$—CH$_2$—O—CH$_2$—CH$_2$—O—CH$_3$ | 1 |

The structure of the phthalocyanine compound represented by M-Pc($X_{p1}$)$_m$($X_{p2}$)$_n$ regarding Compounds 146 to 190 is shown below:

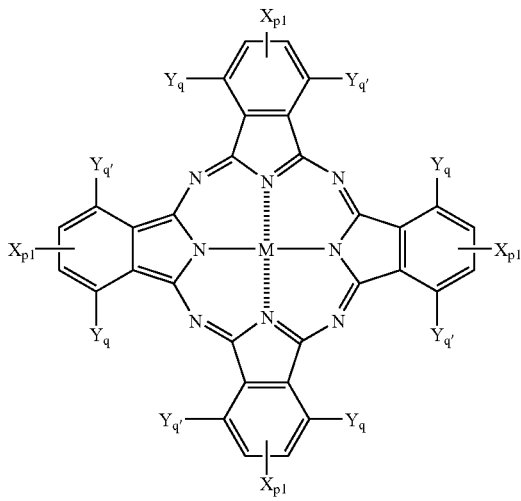

(wherein each $X_{p1}$ represents independently $X_{p1}$ or $X_{p2}$ shown in the tables)

The phthalocyanine dye represented by formula (CI) can be synthesized according to the patent publications described above. Furthermore, the phthalocyanine dye represented by formula (CII) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in the patent publications.

The inkjet recording ink of the present invention contains the phthalocyanine dye in an amount of preferably from 0.2 to 20 wt %, more preferably from 0.5 to 15 wt %.

The inkjet recording cyan ink of the present invention can be prepared by dissolving and/or dispersing a cyan dye, preferably the phthalocyanine dye described above in an aqueous medium. The aqueous medium means a mixture of water and a small amount of water-soluble organic solvent. The aqueous medium may contain an additive, for example, a wetting agent (preferably a surfactant as a dissolution or dispersion aid), a stabilizer or an antiseptic, if desired.

In the magenta ink used for the inkjet recording ink of the present invention, a magenta dye selected from azo dyes is dissolved or dispersed in an aqueous medium and the dye is fundamentally characterized in that the absorption maximum in the aqueous medium is present in the spectral region of 500 to 580 nm and the oxidation potential is more positive than 1.0 V (vs SCE).

The first preferred structural feature of the azo dye is that the dye has a chromophore represented by the formula: (heterocyclic ring A)-N=N-(heterocyclic ring B). In such a case, the heterocyclic rings A and B may have the same structure. Specifically, the heterocyclic rings A and B each represent a 5- or 6-membered heterocyclic ring selected from pyrazole, imidazole, triazole, oxazole, thiazole, selenazole, pyridone, pyrazine, pyrimidine and pyridine. These are specifically described, for example, in JP-A-2001-279145, JP-A-2002-309116, JP-A-2002-309116 and JP-A-2003-12650.

The second preferred structural feature of the azo dye is that an aromatic nitrogen-containing 6-membered heterocyclic ring is bonded as the coupling component directly to at least one side of the azo group. Specific examples thereof are described in JP-A-2002-371214.

The third preferred structural feature is that the auxochrome has an aromatic ring amino group or heterocyclic amino group structure, specifically, an anilino group or a heterylamino group.

The fourth preferred structural feature is that the dye has a steric structure. The dye is specifically described in JP-A-2002-371214.

Among the preferred structural features of the azo dye, the dye most preferred for attaining the objects of the present invention is a dye represented by the following formula (MI):

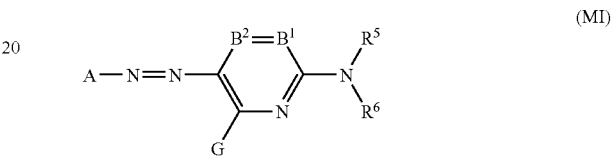

(MI)

wherein A represents a 5-membered heterocyclic group;

$B^1$ and $B^2$ each represent =CR$^1$— or —CR=, or either one of $B^1$ and $B^2$ represents a nitrogen atom and the other represents =CR$^1$— or —CR$^2$=;

$R^5$ and $R^6$ each independently represent a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represent a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

The dye of formula (MI) is described in more detail.

In formula (MI), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or other heterocyclic ring. Preferred examples of the heterocyclic ring include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among those rings, more preferred are a pyrazole ring, an imidazole ring, an isothiazole ring, a thiadiazole ring and a benzothiazole ring represented by the following formulae (a) to (f):

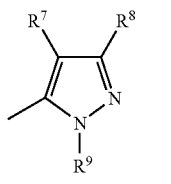

(a)

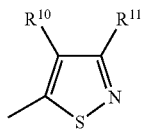

(b)

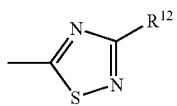

(c)

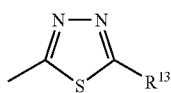

(d)

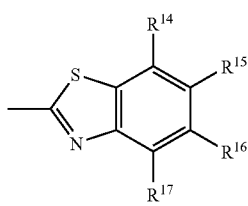

(e)

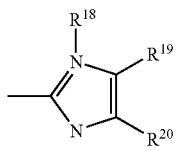

(f)

wherein $R^7$ to $R^{20}$ each represent a substituent same as the substituent for G, $R^1$ or $R2$ in formula (MI).

Among formulae (a) to (f), preferred are a pyrazole ring and an isothiazole ring represented by formulae (a) and (b), and most preferred is a pyrazole ring represented by formula (a).

In formula (MI), $B^1$ and $B^2$ each represent $=CR^1-$ or $-CR^2=$, or either one of $B^1$ and $B^2$ represents a nitrogen atom and the other represents $=CR^1-$ or $-CR^2=$. $B^1$ and $B^2$ each preferably represent $=CR^1-$ or $-CR^2=$.

$R^5$ and $R^6$ each independently represent a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each preferably represent a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but $R^5$ and $R^6$ are not hydrogen atoms at the same time.

G, $R^1$ and $R^2$ each independently represent a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

$R^1$ and $R^2$ each preferably represent a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

$R^1$ and $R^5$, or $R^5$ and $R^6$ may combine to form a 5- or 6-membered ring.

When A has a substituent or when the substituent $R^1$, $R^2$, $R^5$, $R^6$ or G further has a substituent, examples of the substituent include the substituents described above for G, $R^1$ and $R^2$.

In the case where the dye of formula (MI) of the present invention is a water-soluble dye, the dye preferably has further an ionic hydrophilic group as a substituent on any position of A, $R^1$, $R^2$, $R^5$, $R^6$ and G. Examples of the ionic hydrophilic group as a substituent include a sulfo group, a carboxyl group, a phosphono group and a quaternary ammonium group. Among the ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The term "substituent" as used in the present invention is described below. The term is common among different symbols in formula (MI) and also in formula (MIa) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. A "substituted" used for the "substituted alkyl group" and the like in the present invention means that the hydrogen atom present in an "alkyl group" or the like is substituted, for example, by the substituent described above for G, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or other heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20. carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms.

Examples of the substituent include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent include an alkyl group, a halogen atom and an ionic hydrophilic group.

The acylamino group includes a substituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonyl-amino group include a phenoxycarbonylamino group.

The alkylsulfonylamino group and the arylsulfonyl-amino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 7 to 20 carbon atoms, respectively. Examples of the substituent include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenylsulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably those having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group and a di(2-hydroxyethyl)sulfamoyl group.

In the present invention, particularly preferred is a dye represented by the following formula (MIa):

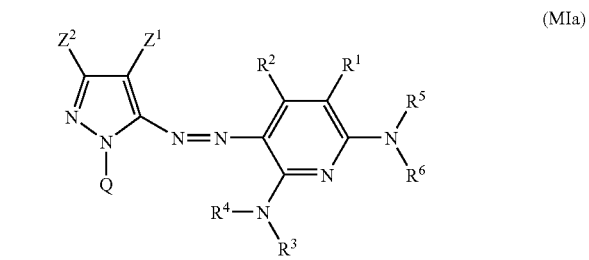

(MIa)

In formula (MIa), $R^1$, $R^2$, $R^5$ and $R^6$ have the same meanings as defined in formula (MI), respectively.

$R^3$ and $R^4$ each independently represent a hydrogen atom or a substituent and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each preferably represent a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (MIa) may be substituted. Examples of the substituent include the substituents described in regard to formula (MI), the groups described as examples for G, $R^1$ and $R^2$, and ionic hydrophilic groups.

The Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a up value and a σm value and these values can be found in a large number of conventional publications and these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described by using the Hammett's substituent constant up but it does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention include those which are not a benzene derivative, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (MI) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not hydrogen atoms at the same time. G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each represent =CR$^1$— or —CR$^2$=, and $R^1$ and $R^2$ each preferably represent a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (MI), a compound where at least one of various substituents is the above-described preferred group is preferred, a compound where a larger number of various substituents are the above-described preferred groups is more preferred, and a compound where all substituents are the above-described preferred groups is most preferred.

Specific examples of the compound (azo dye) represented by formula (MI) are set forth below, however, the azo dye for use in the present invention is not limited to those set forth below.

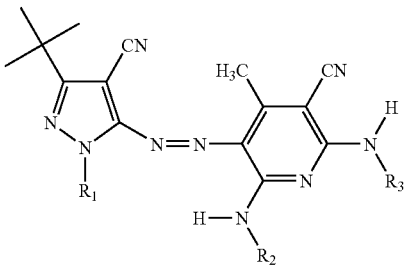

-continued
| | | | |
|---|---|---|---|
| a-8 | 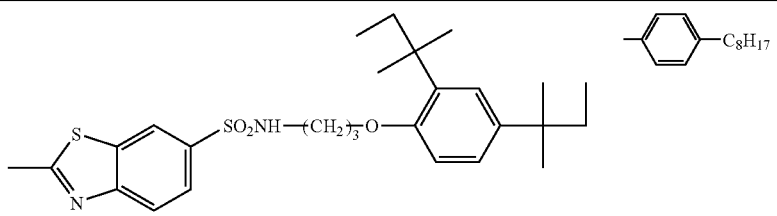 | 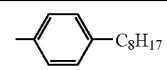 C₈H₁₇ | 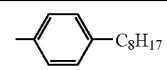 C₈H₁₇ |
| a-9 | 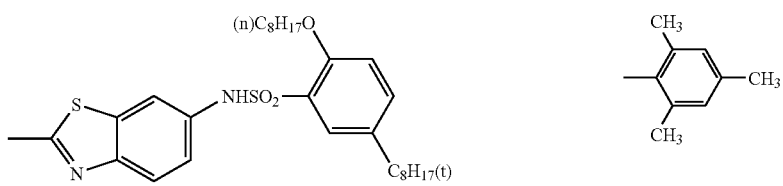 |  | C₈H₁₇(t) |
| a-10 |  | 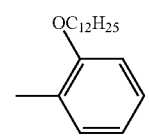 OC₁₂H₂₅ | 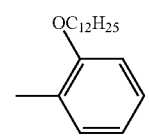 OC₁₂H₂₅ |
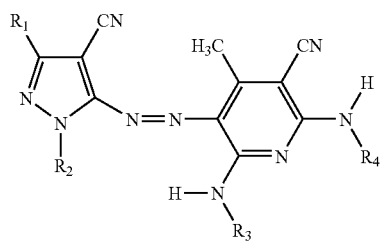
| Dye | R₁ | R₂ | R₃ | R₄ |
|---|---|---|---|---|
| a-11 | 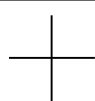 | 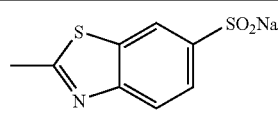 | 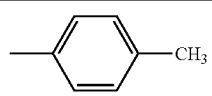 | 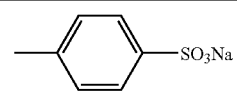 |
| a-12 | 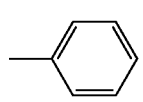 | 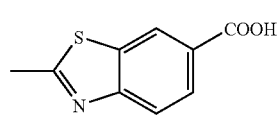 | 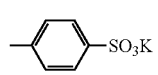 | 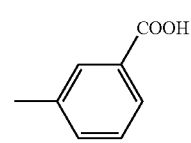 |
| a-13 | 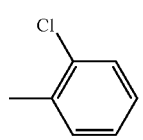 | 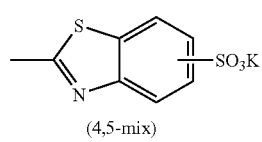 (4,5-mix) | 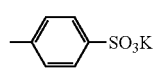 | 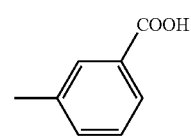 |
| a-14 | 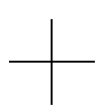 | 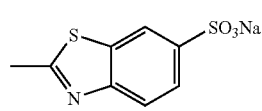 | 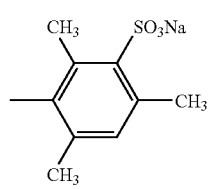 | 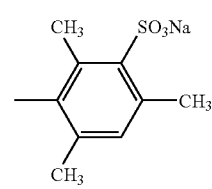 |
| a-15 | 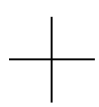 | 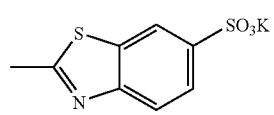 | 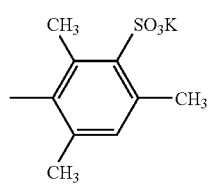 | 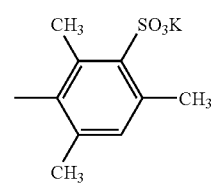 |

-continued
| | | | |
|---|---|---|---|
| a-16 |  | 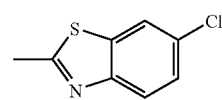 | 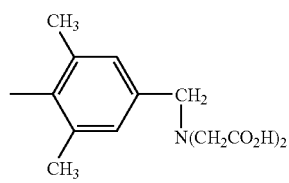 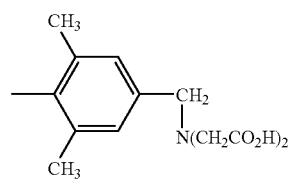 |
| a-17 |  | 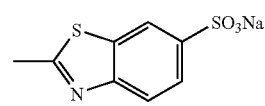 | 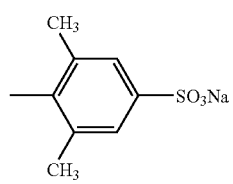 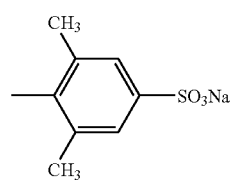 |
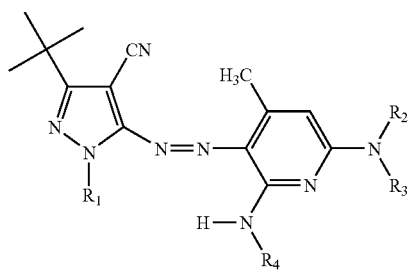
| Dye | $R_1$ | $R_2$ | $R_3$ | $R_4$ |
|---|---|---|---|---|
| a-18 | 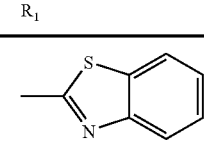 | 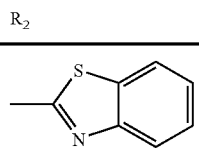 | 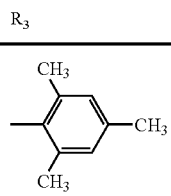 | 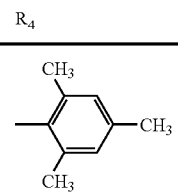 |
| a-19 | 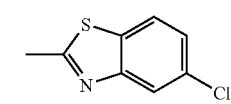 | —SO$_2$CH$_3$ | 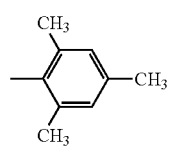 | 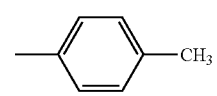 |
| a-20 | 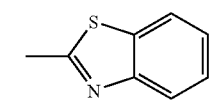 | —COCH$_3$ | C$_8$H$_{17}$(t) | C$_8$H$_{17}$(t) |
| a-21 | 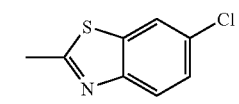 | —SO$_2$CH$_3$ | 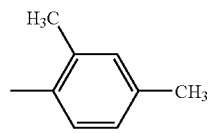 | C$_8$H$_{17}$(t) |
| a-22 | 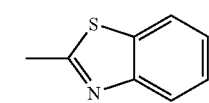 | H | 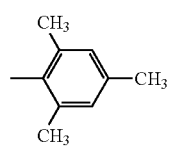 | 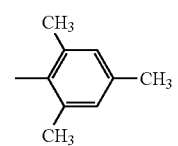 |
| a-23 | 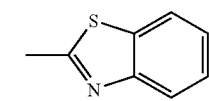 | H | 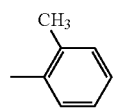 | 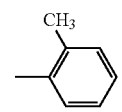 |

-continued
| Dye | | | | |
|---|---|---|---|---|
| a-24 | 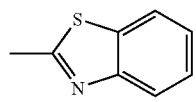 | H | 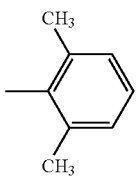 | 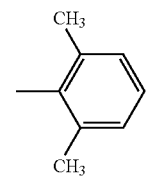 |
| a-25 | 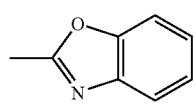 | 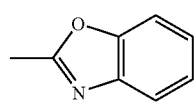 | 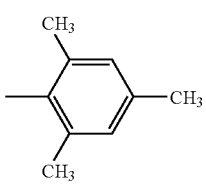 | 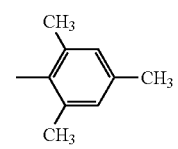 |
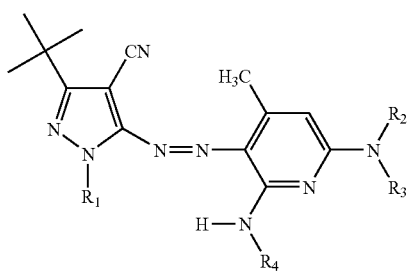
| Dye | $R_1$ |
|---|---|
| a-26 | 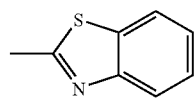 |
| a-27 | 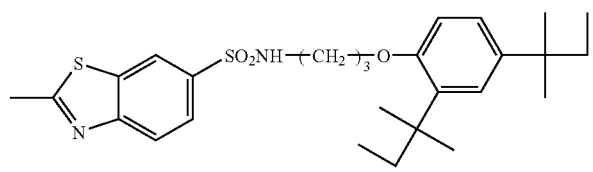 |
| a-28 | 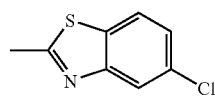 |
| a-29 | 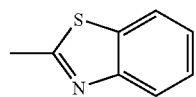 |
| a-30 | 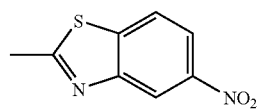 |
| a-31 | 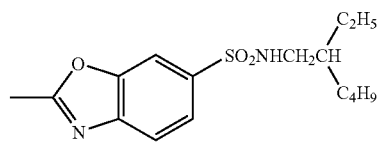 |

-continued

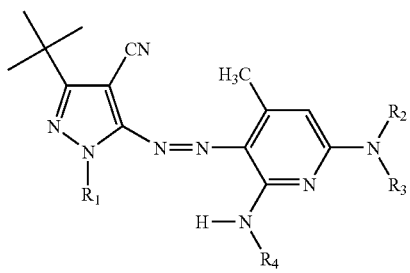

| Dye | R₂ | R₃ | R₄ |
|---|---|---|---|
| a-26 | 2-methylbenzothiazol-6-yl-SO₂NH—(CH₂)₃—O—(2,4-di-tert-pentylphenyl) | 2,3,5-trimethylphenyl | 2,3,5-trimethylphenyl |
| a-27 | 2-methylbenzothiazol-6-yl-SO₂NH—(CH₂)₃—O—(2-tert-butyl-4-tert-pentylphenyl) | 2,3,5-trimethylphenyl | 2,3,5-trimethylphenyl |
| a-28 | 2-methylbenzothiazol-6-yl-NHC(O)CH(Et)—O—(2-tert-butyl-4-tert-pentylphenyl) | 2,4-dimethylphenyl | 2,4-dimethylphenyl |
| a-29 | 2-methylbenzothiazol-6-yl | 2-methyl-6-dodecyloxyphenyl | 2-methyl-6-dodecyloxyphenyl |
| a-30 | 2-methylbenzothiazol-6-yl-NHSO₂—(2-(n)octyloxy-5-(t)octyloxyphenyl) | 4-octylphenyl | C₈H₁₇(t) |
| a-31 | 2-methylbenzoxazol-6-yl-SO₂NHCH(C₂H₅)(C₄H₉) | 2-methylphenyl | 2-methylphenyl |

-continued

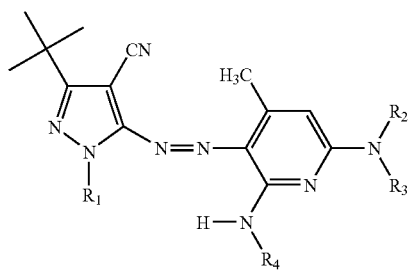

| Dye | R₁ | R₂ | R₃ | R₄ |
|---|---|---|---|---|
| a-32 | 2-methylbenzothiazole-6-SO₃K | 2-methylbenzothiazole-6-SO₃K | mesityl (2,4,6-tri-CH₃-phenyl) | mesityl (2,4,6-tri-CH₃-phenyl) |
| a-33 | 2-methylbenzothiazole-6-SO₂NH-(3,5-dicarboxyphenyl) (COOH) | 2-methylbenzothiazole-6-SO₂NH-(3,5-dicarboxyphenyl) (COOH) | mesityl (2,4,6-tri-CH₃-phenyl) | mesityl (2,4,6-tri-CH₃-phenyl) |
| a-34 | 2-methylbenzothiazole-SO₂NH-(3,5-di-COOK-phenyl) (5,6-mix) | 2-methylbenzothiazole-SO₂NH-(3,5-di-COOK-phenyl) (5,6-mix) | mesityl (2,4,6-tri-CH₃-phenyl) | mesityl (2,4,6-tri-CH₃-phenyl) |
| a-35 | 2-methylbenzothiazole-SO₃Na (5,6-mix) | 2-methylbenzothiazole-SO₂NH-(3,5-di-COOH-phenyl) (5,6-mix) | 4-methylphenyl | 2,3-dimethylphenyl |

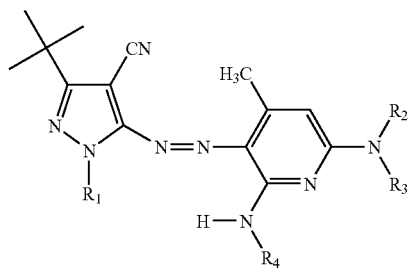

| Dye | R₁ | R₂ | R₃ | R₄ |
|---|---|---|---|---|
| a-36 | 2-methylbenzothiazole-6-SO₃Na | 2-methylbenzothiazole-6-SO₃Na | 2,4,6-tri-CH₃-3-SO₃Na-phenyl | 2,4,6-tri-CH₃-3-SO₃Na-phenyl |

-continued
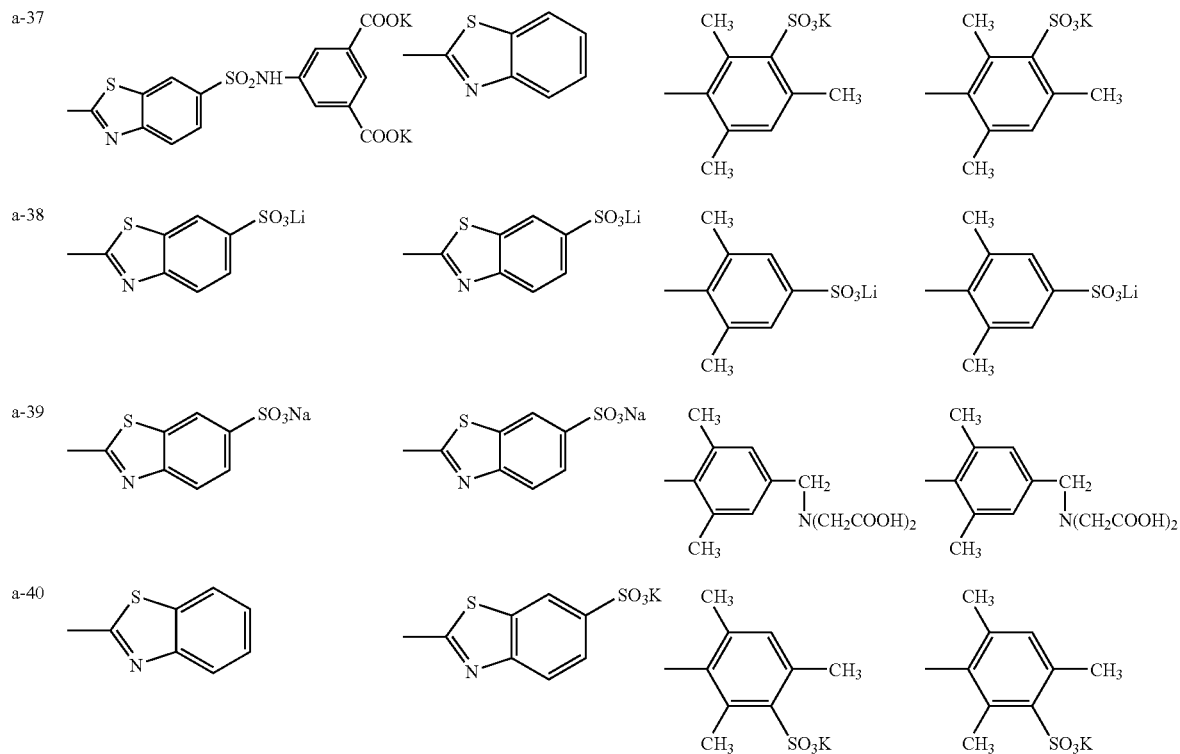
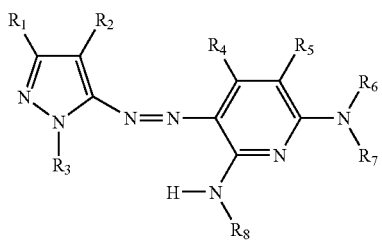
| Dye | $R_1$ | $R_2$ | $R_3$ | $R_4$ | $R_5$ | $R_6$ | $R_7$ | $R_8$ |
|---|---|---|---|---|---|---|---|---|
| a-41 | 2,3-dimethylphenyl | CN | 2-pyridyl | H | $CONH_2$ | $SO_2CH_3$ | 2-($OC_8H_{17}$)phenyl | 2-methylphenyl |
| a-42 | t-Bu | Br | 2-pyrimidyl | COOEt | H | 2-methylbenzothiazolyl | $C_8H_{17}(t)$ | $COCH_3$ |
| a-43 | 2-pyridyl | $SO_2CH_3$ | 4,6-bis(NHCH$_3$)-triazinyl | $CONH_2$ | H | 6-Cl-2-methylbenzothiazolyl | 4-(CH$_2$O-t-Bu)phenyl | |
| a-44 | t-Bu | CN | 2,4,5-tricyanophenyl | H | H | 5-Cl-2-methylbenzothiazolyl | 2-methylphenyl | $SO_2CH_3$ |

-continued

| | | | | | | | |
|---|---|---|---|---|---|---|---|
| a-45 | *t*-Bu | Br | 2,6-dichloro-3-methyl-5-nitrophenyl (Cl, CH₃, Cl, NO₂ substituted phenyl) | H | CONH₂ | COCH₃ | 2,4,6-trimethylphenyl (mesityl) | 4-C₈H₁₇-phenyl |
| a-46 | *t*-Bu | CN | 2-methylbenzothiazol-... (benzothiazole-CH₃) | H | 2-methylbenzothiazole | | 2,4,6-triethylphenyl | 2,4,6-triethylphenyl |

Note: row a-45 columns: R-group (t-Bu), Br, aryl (2,6-Cl₂-3-NO₂-4-CH₃-phenyl via structure shown), H, CONH₂, COCH₃, 2,4,6-trimethylphenyl, 4-octylphenyl.

Row a-46: t-Bu, CN, 2-methylbenzothiazolyl, H, 2-methylbenzothiazolyl, 2,4,6-triethylphenyl, 2,4,6-triethylphenyl.

Structure (general for b-series):

R₁-substituted isothiazole with CN group, connected via N=N to a pyridine bearing R₂, R₃, NR₄R₅, and NH-R₆ groups.

| Dye | R₁ | R₂ | R₃ | R₄ | R₅ | R₆ |
|---|---|---|---|---|---|---|
| b-1 | CH₃ | CH₃ | CN | H | 4-C₈H₁₇-phenyl | 4-C₈H₁₇-phenyl |
| b-2 | CH₃ | CH₃ | CN | H | 2,4,6-trimethylphenyl | 2,4,6-trimethylphenyl |
| b-3 | CH₃ | CH₃ | CONH₂ | H | 4-C₈H₁₇-phenyl | 2,4,6-trimethylphenyl |
| b-4 | CH₃ | CH₃ | H | H | 2,4,6-(CH₃)₃-3-SO₃Li-phenyl | 2,4,6-(CH₃)₃-3-SO₃Li-phenyl |
| b-5 | CH₃ | H | CN | H | 4-SO₃Na-phenyl | 4-SO₃Na-phenyl |
| b-6 | CH₃ | CH₃ | H | 2-methylbenzothiazolyl | 2,4,6-(CH₃)₃-3-CH₂N(CH₂CO₂K)₂-phenyl | 2,4,6-(CH₃)₃-3-CH₂N(CH₂CO₂K)₂-phenyl |
| b-7 | CH₃ | CH₃ | H | 2-methylbenzothiazolyl | 2,4,6-trimethylphenyl | 4-C₈H₁₇-phenyl |

-continued
| | | | | | | |
|---|---|---|---|---|---|---|
| b-8 | CH$_3$ | H | H | SO$_2$CH$_3$ | 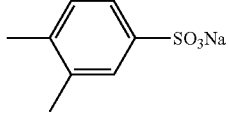 | 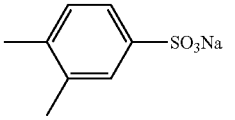 |
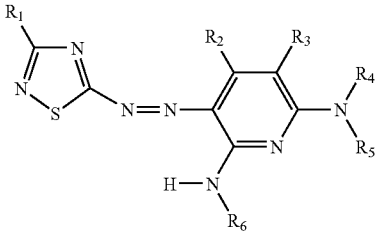
| Dye | R$_1$ | R$_2$ | R$_3$ | R$_4$ | R$_5$ | R$_6$ |
|---|---|---|---|---|---|---|
| c-1 | —SCH$_3$ | CH$_3$ | CN | H | C$_8$H$_{17}$(t) | 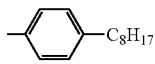 |
| c-2 | 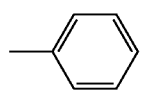 | H | CONH$_2$ | H | 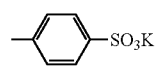 | 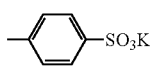 |
| c-3 | 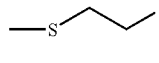 | CH$_3$ | H | 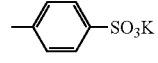 | 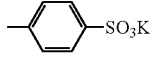 | 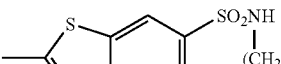 |
| c-4 | —CH$_3$ | CH$_3$ | H | 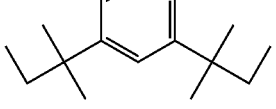 | 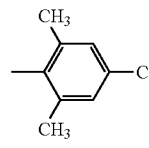 | 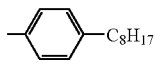 |
| c-5 | 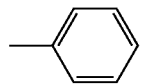 | H | H | 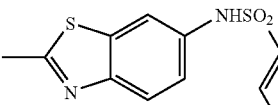 | 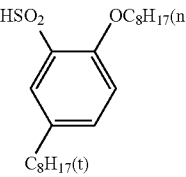 | C$_8$H$_{17}$(t) |
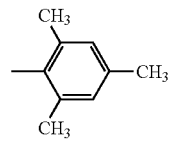
| Dye | R$^1$ | R$^2$ | R$^3$ | R$^4$ | R$^5$ | R$^6$ |
|---|---|---|---|---|---|---|
| d-1 | Me | CH$_3$ | CN | H | 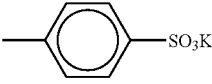 | 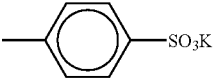 |

| Dye | | | | | | |
|---|---|---|---|---|---|---|
| d-2 | Me | CH₃ | CN | H | 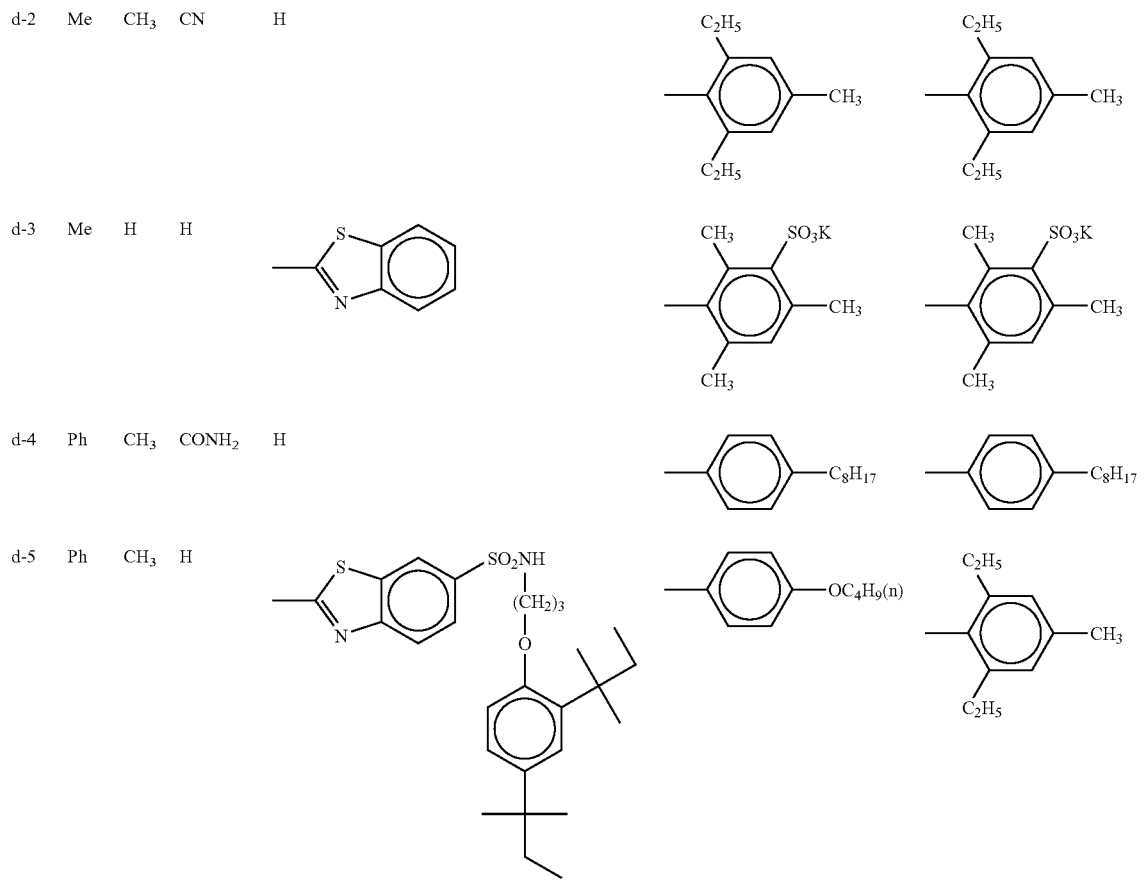 | |
| d-3 | Me | H | H | | | |
| d-4 | Ph | CH₃ | CONH₂ | H | | |
| d-5 | Ph | CH₃ | H | | | |
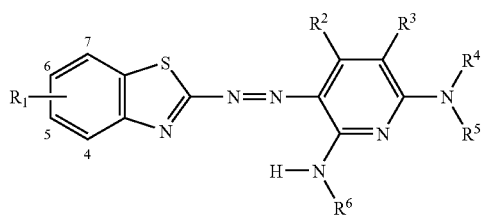
| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | | | |
| e-3 | 5,6-diCl | CH₃ | H | | | COCH₃ |
| e-4 | 5-CH₃ | H | CN | H | | |

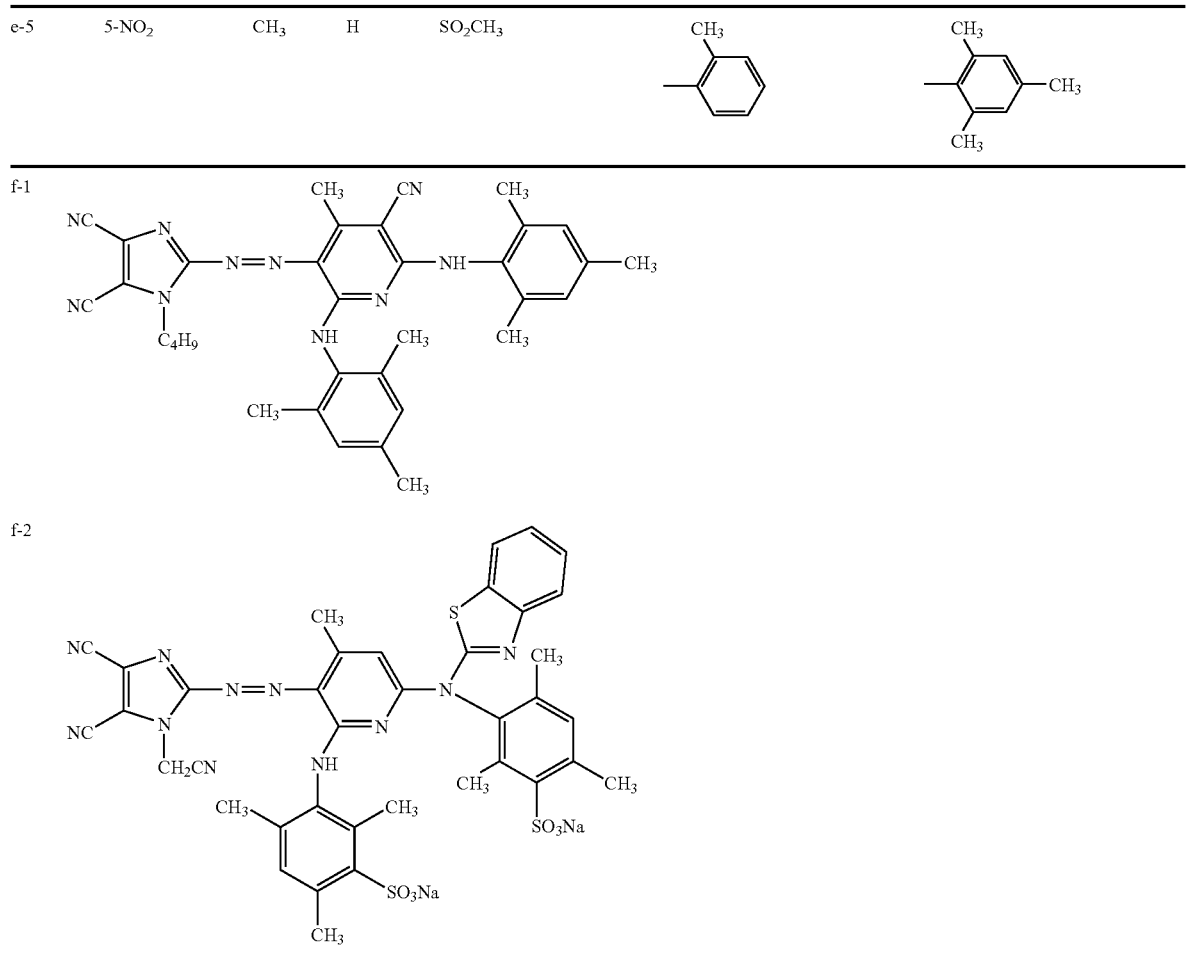

The yellow dye useful for the present invention is described in detail below.

A reflection density after printing an ink on a reflective medium is measured through a Status A filter (for example, X-rite 310TR Densitometer) and one point having a reflection density ($D_B$) of 0.90 to 1.10 in the yellow region is defined as the initial density of the ink. Then, the printed matter is enforcedly discolored by using an ozone discoloration tester capable of always generating 5 ppm of ozone and the accelerated fading rate constant (k) is determined according to ($0.8=e^{-kt}$) from the time period (t) until the reflection density decreases to 80% of the initial density. The yellow dye used in one ink (composition) for use in the inkjet recording method of the present invention is controlled to have the accelerated fading rate constant of $5.0\times10^{-2}$ [hour$^{-1}$] or less, preferably $3.0\times10^{-2}$ [hour$^{-1}$] or less, more preferably $1.0\times10^{-2}$ [hour$^{-1}$] or less, in view of fastness and ozone gas resistance.

Also, the yellow dye is preferably a dye having an oxidation potential more positive than 1.0 V (vs SCE), more preferably more positive than 1.1 V (vs SCE), and most preferably more positive than 1.15 V (vs SCE). As for the type of the dye, an azo dye satisfying the above-described requirements is particularly preferred.

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Methods*), Gihodo Shuppan Co., Ltd. (1984).

More specifically, a test sample is dissolved at a concentration of $1\times10^{-2}$ to $1\times10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. The value sometimes deviates on the order of several tens of millivolts due to the effect of liquid junction potential, liquid resistance of sample solution, or the like, but reproducibility of the potential can be guaranteed by calibration using a standard sample (for example, hydroquinone).

In order to univocally specify the potential, in the present invention, a value (vs SCE) measured in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes more positive when an electron-withdrawing group is introduced, and becomes more negative when an electron-donating group is introduced. In the present invention, the oxidation potential is preferably rendered more positive by introducing an electron-withdrawing group into the yellow dye skeleton so as to reduce the reactivity with ozone that is an electrophilic agent.

The dye for use in the present invention preferably has good color hue as well as good fastness, more preferably has a sharp absorption spectrum on the long wavelength side. For this purpose, the yellow dye preferably has λmax in the region from 390 to 470 nm and a ratio I(λmax+70 nm)/I(λmax) of the absorbance at λmax+70 nm (I(λmax+70 nm)) to the absorbance at λmax (I(λmax)) is preferably 0.2 or less, more preferably 0.1 or less. The lower limit of the ratio is about 0.01. These λmax and the like are values measured in an aqueous solution of the dye.

The dye satisfying these oxidation potential and absorption properties is preferably a dye represented by the following formula (Y1). However, the compound represented by formula (Y1) is sufficient if the λmax is in the range from 390 to 470 nm, and the above-described oxidation potential and ratio I(λmax+70 nm)/I(λmax) need not be always satisfied.

A—N=N—B     (Y1)

wherein A and B each independently represents a heterocyclic group which may be substituted.

A heterocyclic ring for the heterocyclic group is preferably a heterocyclic ring constituted by a 5- or 6-membered ring and the heterocyclic ring may have a monocyclic structure or a polycyclic structure resulting from condensation of two or more rings and may be an aromatic heterocyclic ring or a non-aromatic heterocyclic ring. A hetero atom constituting the heterocyclic ring is preferably N, O or S atom.

The heterocyclic ring represented by A in formula (Y1) is preferably 5-pyrazolone, pyrazole, triazole, oxazolone, isoxazolone, barbituric acid, pyridone, pyridine, rhodanine, pyrazolidinedione, pyrazolopyridone, merdramic acid or a condensed heterocyclic ring resulting from condensation of such a heterocyclic ring with a hydrocarbon aromatic ring or a heterocyclic ring, more preferably 5-pyrazolone, 5-aminopyrazole, pyridone, 2,6-diaminopyridine or a pyrazoloazole, still more preferably 5-aminopyrazole, 2-hydroxy-6-pyridone or pyrazolotriazole.

Examples of the heterocyclic ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine and thiazoline. Among these, preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole, more preferred are quinoline, thiophene, pyrazole, thiazole, benzoxazole, benzisoxazole, isothiazole, imidazole, benzothiazole and thiadiazole, and still more preferred are pyrazole, benzothiazole, benzoxazole, imidazole, 1,2,4-thiadiazole and 1,3,4-thiadiazole.

Examples of the substituent substituted on A or B include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and an ionic hydrophilic group.

In the case where the dye represented by formula (Y1) is used as a water-soluble dye, the dye preferably contains at least one ionic hydrophilic group in the molecule thereof. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among the counter ions, alkali metal salts are preferred.

Among the dyes represented by formula (Y1), preferred are dyes represented by formulae (Y2), (Y3) and (Y4):

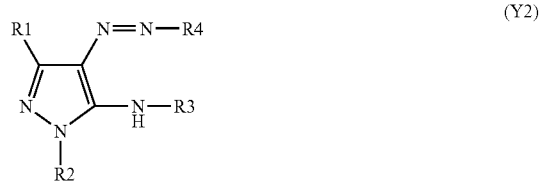

(Y2)

wherein R1 and R3 each represent a hydrogen atom, a cyano group, an alkyl group, a cycloalkyl group, an aralkyl group, an alkoxy group, an alkylthio group, an arylthio group, an aryl group or an ionic hydrophilic group, R2 represents a hydrogen atom, an alkyl group, a cycloalkyl group, an aralkyl group, a carbamoyl group, an acyl group, an aryl group or a heterocyclic group, and R4 represents a heterocyclic group;

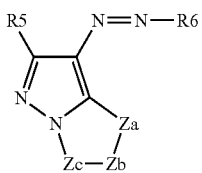

(Y3)

wherein R5 represents a hydrogen atom, a cyano group, an alkyl group, a cycloalkyl group, an aralkyl group, an alkoxy group, an -alkylthio group, an arylthio group, an aryl group or an ionic hydrophilic group, Za represents —N=, —NH— or —C(R11)=, Zb and Zc each independently represent —N=or —C(R11)=, R11 represents a hydrogen atom or a nonmetallic substituent, and R6 represents a heterocyclic group;

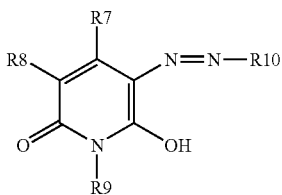

(Y4)

wherein R7 and R9 each independently represent a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group, R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, an alkylsulfonyl group, an arylsulfonyl group, an acyl group, an amino group, a hydroxy group or an ionic hydrophilic group, and R10 represents a heterocyclic group.

The alkyl group represented by R1, R2, R3, R5, R7, R8 or R9 in formulae (Y2), (Y3) and (Y4) includes an alkyl group having a substituent and an unsubstituted alkyl group. The alkyl group is preferably an alkyl group having from 1 to 20 carbon atoms. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by R1, R2, R3, R5, R7, R8 or R9 includes a cycloalkyl group having a substituent and an unsubstituted cycloalkyl group. The cycloalkyl group is preferably a cycloalkyl group having from 5 to 12 carbon atoms. Examples of the substituent include an ionic hydrophilic group. Examples of the cycloalkyl group include a cyclohexyl group.

The aralkyl group represented by R1, R2, R3, R5, R7, R8 or R9 includes an aralkyl group having a substituent and an unsubstituted aralkyl group. The aralkyl group is preferably an aralkyl group having from 7 to 20 carbon atoms. Examples of the substituent include an ionic hydrophilic group. Examples of the aralkyl group include a benzyl group and a 2-phenethyl group.

The aryl group represented by R1, R2, R3, R5, R7, R8 or R9 includes an aryl group having a substituent and an unsubstituted aryl group. The aryl group is preferably an aryl group having from 6 to 20 carbon atoms. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)phenyl group.

The alkylthio group represented by R1, R2, R3, R5, R7, R8 or R9 includes an alkylthio group having a substituent and an unsubstituted alkylthio group. The alkylthio group is preferably an alkylthio group having from 1 to 20 carbon atoms. Examples of the substituent include an ionic hydrophilic group. Examples of the alkylthio group include a methylthio group and an ethylthio group.

The arylthio group represented by R1, R2, R3, R5, R7, R8 or R9 includes an arylthio group having a substituent and an unsubstituted arylthio group. The arylthio group is preferably an arylthio group having from 6 to 20 carbon atoms. Examples of the substituent include an alkyl group and an ionic hydrophilic group. Examples of the arylthio group include a phenylthio group and a p-tolylthio group.

The heterocyclic group represented by R2 or $R^{22}$ which is described later is preferably a 5- or 6-membered heterocyclic ring and the heterocyclic ring may be further condensed. The heteroatom constituting the heterocyclic ring is preferably N, S or O. The ring may be an aromatic heterocyclic ring or a non-aromatic heterocyclic ring. The heterocyclic ring may be substituted and examples of the substituent are the same as those of the substituent of the aryl group which is described later. The heterocyclic ring is preferably a 6-membered nitrogen-containing aromatic heterocyclic ring and preferred examples thereof include triazine, pyrimidine and phthalazine.

The halogen atom represented by R8 includes a fluorine atom, a chlorine atom and a bromine atom.

The alkoxy group represented by R1, R3, R5 or R8 includes an alkoxy group having a substituent and an unsubstituted alkoxy group. The alkoxy group is preferably an alkoxy group having from 1 to 20 carbon atoms. Examples of the substituent include a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group represented by R8 includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxy-phenoxy group. The acylamino group represented by R8 includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetamide group, a propionamide group, a benzamide group and a 3,5-disulfobenzamide group.

The sulfonylamino group represented by R8 includes a sulfonylamino group having a substituent and an unsubstituted sulfonylamino group. The sulfonylamino group is preferably a sulfonylamino group having from 1 to 20 carbon atoms. Examples of the sulfonylamino group include a methylsulfonylamino group and an ethylsulfonylamino group.

The alkoxycarbonylamino group represented by R8 includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The ureido group represented by R8 includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The alkoxycarbonyl group represented by R7, R8 or R9 includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The carbamoyl group represented by R2, R7, R8 and R9 includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by R8 includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Examples of the alkylsulfonyl group and arylsulfonyl group represented by R8 include a methylsulfonyl group and a phenylsulfonyl group.

The acyl group represented by R2 or R8 includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The amino group represented by R8 includes an amino group having a substituent and an unsubstituted amino group. Examples of the substituent include an alkyl group, an aryl group and a heterocyclic group. Examples of the amino group include a methylamino group, a diethylamino group, an anilino group and a 2-chloroanilino group.

The heterocyclic group represented by R4, R6 and R10 is the same as the heterocyclic group represented by B in formula (Y1), which may be substituted, and preferred examples, more preferred examples and still more preferred examples are the same as those described above. Examples of the substituent include an ionic hydrophilic group, an alkyl group having from 1 to 12 carbon atoms, an aryl group, an alkylthio group, an arylthio group, a halogen atom, a cyano group, a sulfamoyl group, a sulfonamino group, a carbamoyl group and an acylamino group. The alkyl group, the aryl group and the like each may further have a substituent.

In formula (Y3), Za represents —N=, —NH— or —C(R11)=, Zb and Zc each independently represent —N= or —C(R11)=, and R11 represents a hydrogen atom or a nonmetallic substituent. The nonmetallic substituent represented by R11 is preferably a cyano group, a cycloalkyl group, an aralkyl group, an aryl group, an alkylthio group, an arylthio group or an ionic hydrophilic group. These substituents have the same meanings as the substituents represented by R1, respectively, and preferred examples are also the same. Examples of the skeleton of the heterocyclic ring comprising two 5-membered rings, contained in formula (Y3), are shown below.

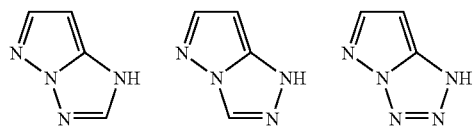

When the above-described substituents each may further have a substituent, examples of the substituent include the substituents which may be substituted on the heterocyclic rings of A and B in formula (Y1).

In the case where the dyes represented by formulae (Y2) to (Y4) are used as a water-soluble dye, the dye preferably contains at least one ionic hydrophilic group in the molecule. In such a case, the dye includes dyes where at least one of R1, R2, R3, R5, R7, R8 and R9 in formulae (Y2) to (Y4) is an ionic hydrophilic group, and dyes where R1 to R11 in formulae (Y2) to (Y4) each further has an ionic hydrophilic group as a substituent.

Among the dyes represented by formulae (Y2), (Y3) and (Y4), preferred are the dyes represented by formula (Y2), and more preferred are the dyes represented by the following formula (Y2-1):

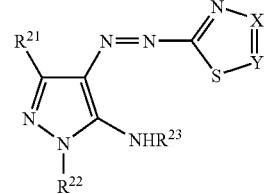

(Y2-1)

wherein $R^{21}$ and $R^{23}$ each represent a hydrogen atom, an alkyl group, a cycloalkyl group, an aralkyl group, an alkoxy group or an aryl group, $R^{22}$ represents an aryl group or a heterocyclic group, one of X and Y represents a nitrogen atom and the other represents —$CR^{24}$ (wherein $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group). The substituents each may be further substituted.

Of the dyes in formula (Y2-1), a dye having an ionic hydrophilic group is preferred.

Specific examples of preferred dyes for use in the present invention are set forth below, however, the dye for use in the present invention is not limited to the following specific examples. The compounds can be synthesized by referring to JP-A-2-24191 and JP-A-2001-279145.

YI-1
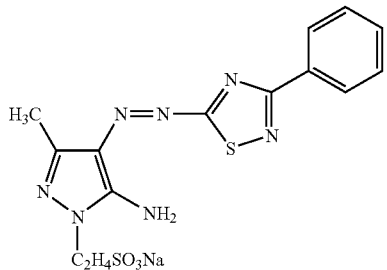
YI-2
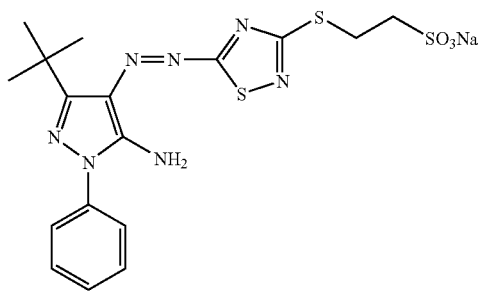
YI-3
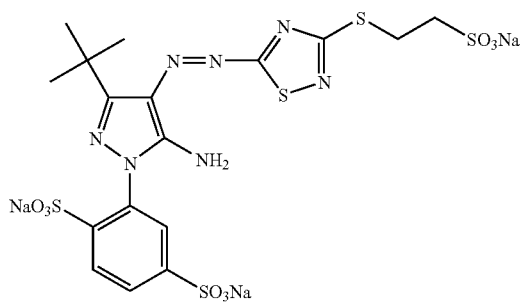
YI-4
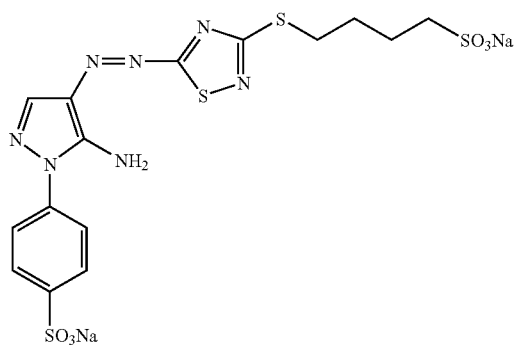
YI-5
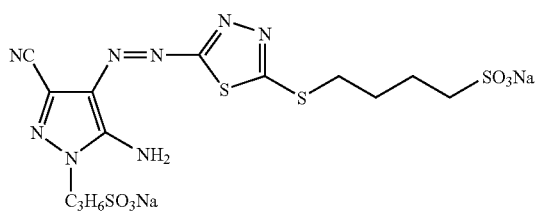

-continued
YI-6
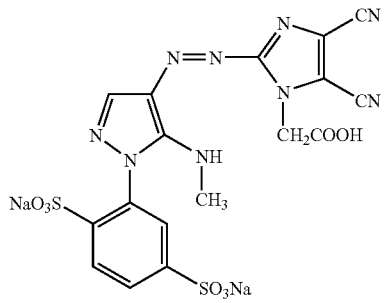
YI-7
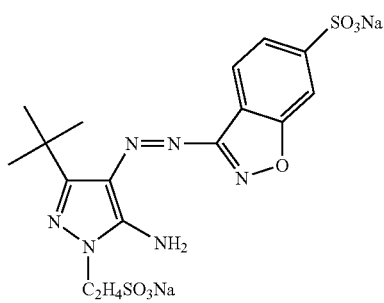
YI-8
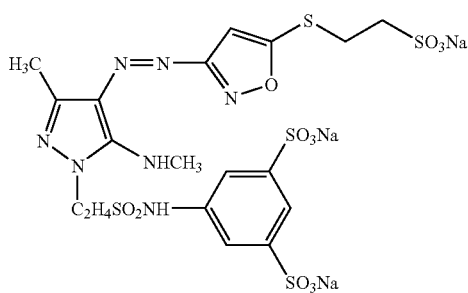
YI-9
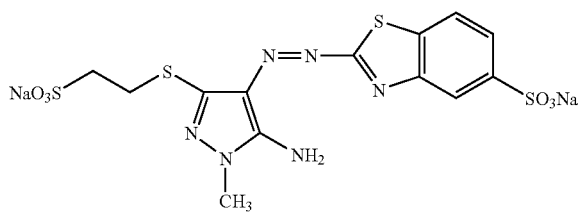
YI-10
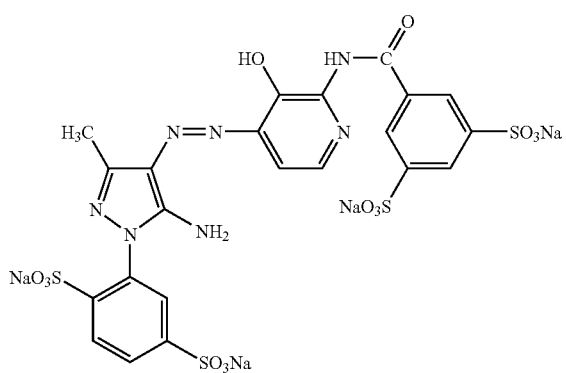

-continued
YI-11 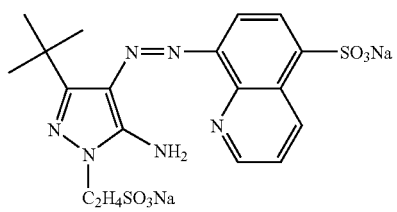
YI-12 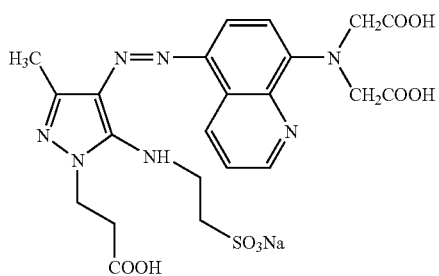
YI-13 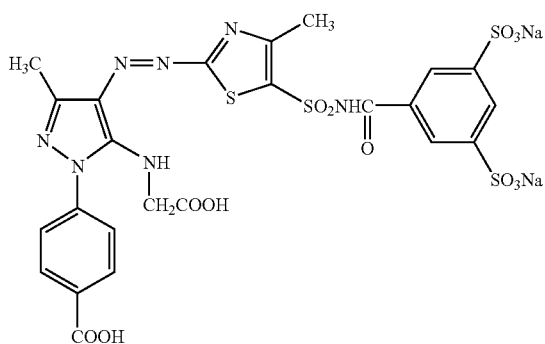
YI-14 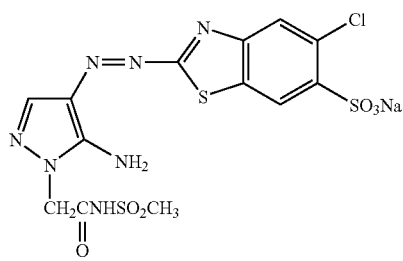
YI-15 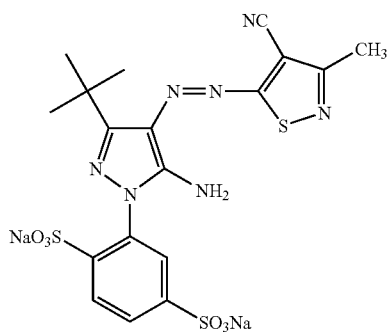

-continued
YI-16 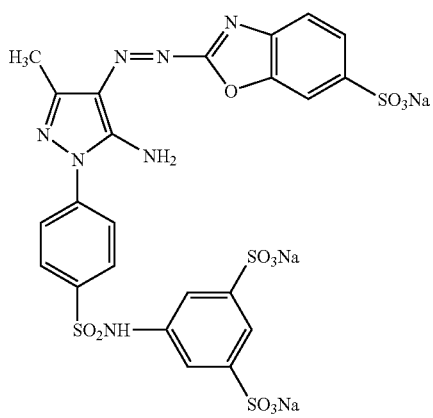
YI-17 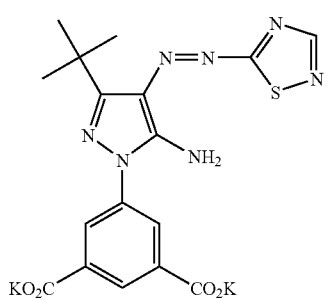
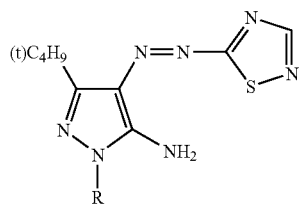
| Dye | R |
| --- | --- |
| YI-18 | $CH_3$ |
| YI-19 | $C_3H_6SO_3Na$ |
| YI-20 | H |
| YI-21 | $C_2H_4CN$ |
| YI-22 | 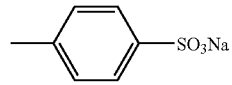 |
| YI-23 | 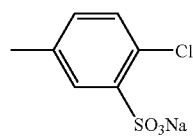 |
| YI-24 | 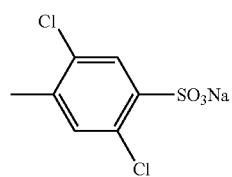 |
| YI-25 | 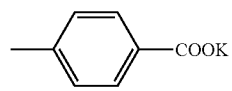 |

-continued
| | |
|---|---|
| YI-26 | 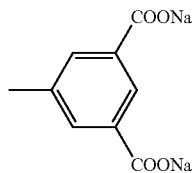 |
| YI-27 | 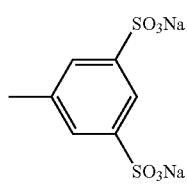 |
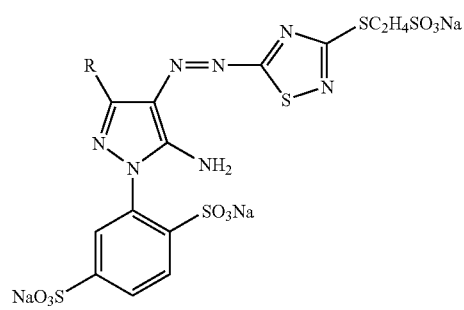
| Dye | R |
|---|---|
| YI-28 | CH$_3$ |
| YI-29 | 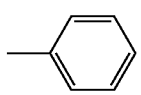 |
| YI-30 | OC$_2$H$_5$ |
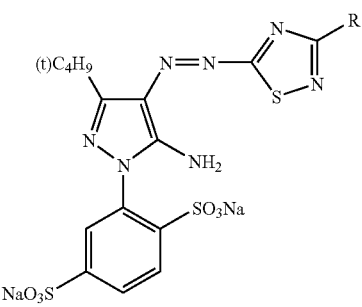
| Dye | R |
|---|---|
| YI-31 | 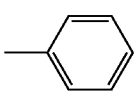 |
| YI-32 | CH$_3$ |
| YI-33 | SC$_2$H$_4$SO$_3$Na |
| YI-34 | SO$_2$C$_2$H$_4$SO$_3$Na |

-continued
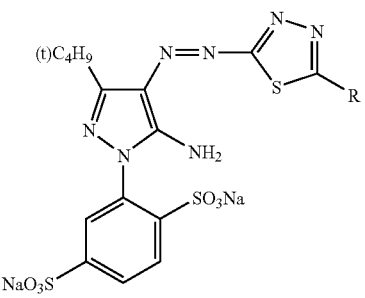
| Dye | R |
|---|---|
| YI-35 | H |
| YI-36 | CH₃ |
| YI-37 |  |
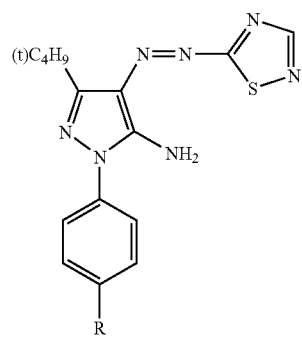
| Dye | R |
|---|---|
| YI-38 | COOC$_4$H$_9$ |
| YI-39 | CON(C$_4$H$_9$)$_2$ |
| YI-40 | SO$_2$NHC$_{12}$H$_{25}$ |
| YI-41 | OC$_8$H$_{17}$ |
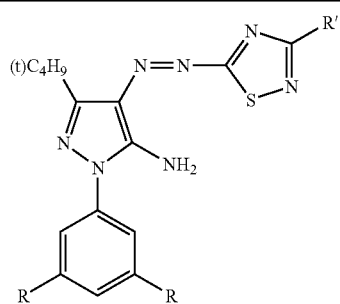
| Dye | R | R' |
|---|---|---|
| YI-42 | CON(C$_4$H$_9$)$_2$ | H |
| YI-43 | COOC$_8$H$_{17}$ | H |
| YI-44 | CON(C$_4$H$_9$)$_2$ | (phenyl) |
| YI-45 | CON(C$_4$H$_9$)$_2$ | CH$_3$ |
| YI-46 | H | (phenyl) |

-continued
| | | |
|---|---|---|
| YI-47 | H | SC$_8$H$_{17}$ |
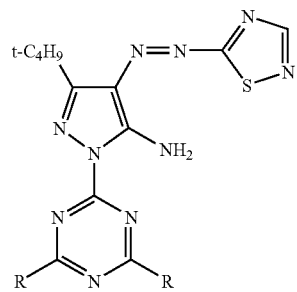
| Dye | R |
|---|---|
| YI-48 | —NHC$_2$H$_4$COOK |
| YI-49 | —NHC$_2$H$_4$SO$_3$Na |
| YI-50 | 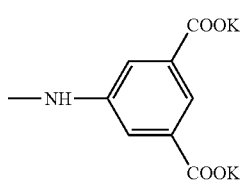 |
| YI-51 | 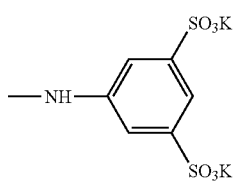 |
| YI-52 | 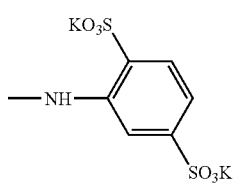 |
| YI-53 | —N—(CH$_2$COONa)$_2$ |
| YI-54 | 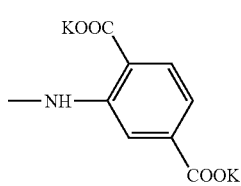 |
| YI-55 | 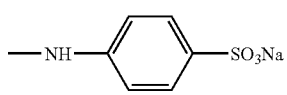 |
| YI-56 | —NHC$_6$H$_{13}$ |
| YI-57 | —N(C$_4$H$_9$)$_2$ |

-continued
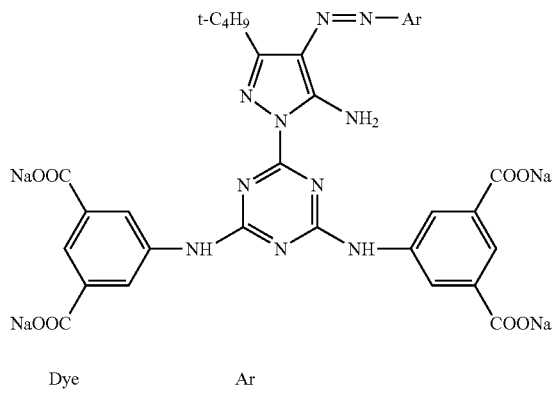
| Dye | Ar |
|---|---|
| YI-58 | 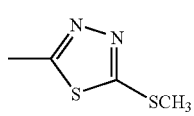 |
| YI-59 | 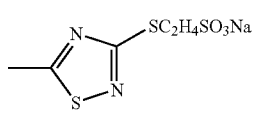 |
| YI-60 | 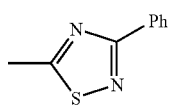 |
| YI-61 | 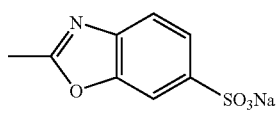 |
| YI-62 | 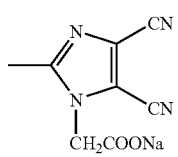 |
| YI-63 | 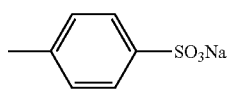 |
| YI-64 | 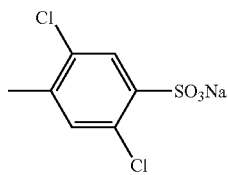 |
| YI-65 | 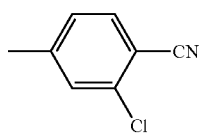 |

-continued
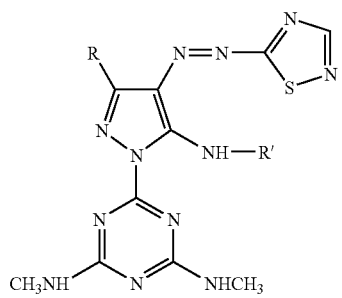
| Dye | R | R' |
|---|---|---|
| YI-66 | Ph | H |
| YI-67 | OC$_2$H$_5$ | C$_2$H$_5$ |
| YI-68 | CH$_3$ | H |
| YI-69 | t-C$_4$H$_9$ | H |
| YI-70 | t-C$_4$H$_9$ | —C$_2$H$_4$COOH |
Dye YI-71
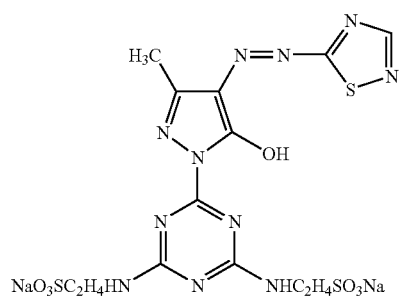
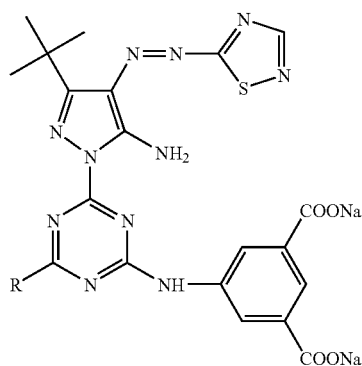
| Dye | R |
|---|---|
| YI-72 | H |
| YI-73 | OCH$_3$ |
| YI-74 | OH |
| YI-75 | SO$_3$Na |
| YI-76 | F |
YI-77 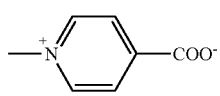

-continued
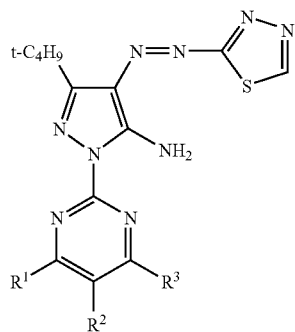
| Dye | R¹ | R² | R³ |
|---|---|---|---|
| YI-78 | Cl | Cl | Cl |
| YI-79 | Cl | Cl | F |
| YI-80 | Cl | —CONHPh | Cl |
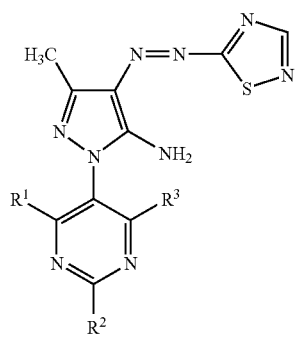
| Dye | R¹ | R² | R³ |
|---|---|---|---|
| YI-81 | F | H | H |
| YI-82 | Cl | H | F |
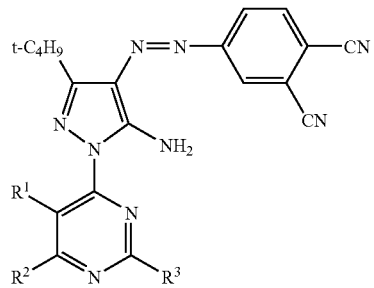
| Dye | R¹ | R² | R³ |
|---|---|---|---|
| YI-83 | H | F | F |
| YI-84 | F | F | H |

-continued
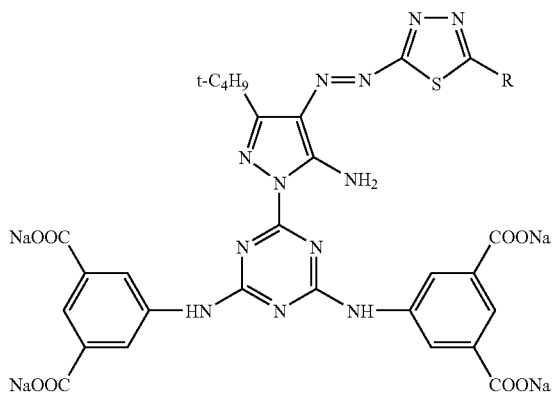
| Dye | R |
|---|---|
| YI-85 | H |
| YI-86 | $CH_3$ |
| YI-87 | Ph |
| YI-88 | $SCH_2COONa$ |
| YI-89 | $SC_2H_5$ |
| YI-90 | $SC_4H_9$-n |
| YI-91 | $SCH_2CHMe_2$ |
| YI-92 | SCHMeEt |
| YI-93 | $SC_4H_9$-t |
| YI-94 | $SC_7H_{15}$-n |
| YI-95 | $SC_2H_4OC_2H_5$ |
| YI-96 | $SC_2H_4OC_4H_9$-n |
| YI-97 | $SCH_2CF_3$ |
| Dye | R |
|---|---|
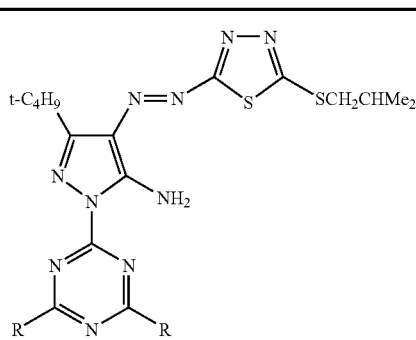
| | |
|---|---|
| YI-98 | —$NHC_2H_4COOK$ |
| YI-99 | —$NHC_2H_4SO_3Na$ |
| YI-100 | 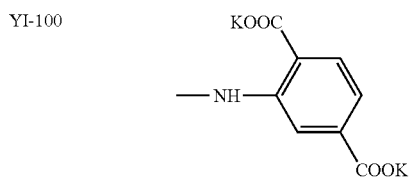 |
| YI-101 | 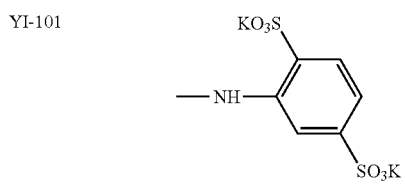 |

-continued

YI-102 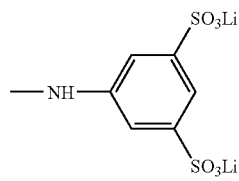

YI-103 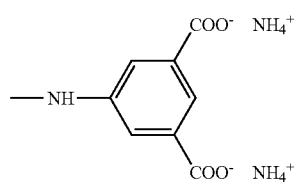

YI-104  —NHC$_6$H$_{13}$-n
YI-105  —N(C$_4$H$_9$-n)$_2$

YI-106  

YI-107 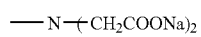

YI-108 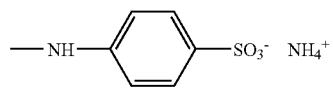

The inkjet recording yellow ink of the present invention preferably contains the yellow dye in an amount of 0.2 to 20 wt %, more preferably from 0.5 to 15 wt %.

The black dye for use in the present invention is described in detail below.

In the black ink for inkjet recording method of the present invention, a dye (L) having λmax in the region from 500 to 700 nm and having a half-value width (Wλ$_{1/2}$) of 100 nm or more (preferably from 120 to 500 nm, more preferably from 120 to 350 nm) in the absorption spectrum of a dilute solution standardized to an absorbance of 1.0 is used.

In the case where the dye (L) by itself can realize black of high image quality "pure black" (that is, black which is not dependent on the light source at the observation and less susceptible to stress of any one color tone of B, G and R), the dye may be used alone as the dye for black ink. However, in general, a dye for covering the region where the dye (L) has low absorption is usually used in combination. A dye (S) having a main absorption in a yellow region is preferably used in combination. The black ink may also be produced by using other dyes in combination.

In the present invention, the above-described dye alone or in combination with other dyes is dissolved or dispersed in an aqueous medium to prepare a black ink and in order to satisfy the performances preferred as the black ink for inkjet recording method, namely, 1) the weather resistance is excellent and/or 2) the balance of black is not disrupted even after color fading, an ink satisfying the following conditions is produced.

A black square symbol of JIS code 2223 is printed in a 48-point size by using the black ink and the reflection density ($D_{vis}$) measured by a Status A filter (visual filter) is defined as the initial density. Examples of the reflection densitometer having mounted thereon a Status A filter include X-Rite Densitometer. In the case of measuring the density of "black", the measured value of $D_{vis}$ is used as the standard observed reflection density. The printed matter is enforcedly discolored by using an ozone discoloration tester capable of always generating 5 ppm of ozone and an accelerated fading rate constant ($k_{vis}$) is determined according the relational formula of $0.8=\exp(-k_{vis} \cdot t)$ from the time period (t) until the reflection density ($D_{vis}$) decreases to 80% of the initial reflection density value.

In the present invention, an ink of giving the accelerated fading rate constant ($k_{vis}$) of $5.0 \times 10^{-2}$ [hour$^{-1}$] or less, preferably $3.0 \times 10^{-2}$ [hour$^{-1}$] or less, more preferably $1.0 \times 10^{-2}$ [hour$^{-1}$] or less, is produced (condition 1).

Also, a black square symbol of JIS code 2223 is printed in a 48-point size by using the black ink and the reflection densities ($D_R$, $D_G$, $D_B$) of three colors of C (cyan), M (magenta) and Y (yellow), which are density values measured by a Status A filter, are defined as the initial densities. The $D_R$, $D_G$ and $D_B$ indicate C reflection density by red filter, M reflection density by green filter and Y reflection density by blue filter, respectively. The printed matter is enforcedly discolored by using an ozone discoloration tester capable of always generating 5 ppm of ozone according to the above-described method and the accelerated fading rate constants ($k_R$, $k_G$, $k_B$) are determined similarly from the time period until the reflection densities ($D_R$, $D_G$, $D_B$) decrease to 80% of respective initial density values. When the ratio (R) of the maximum value to the minimum value in the three accelerated fading rate constants is determined (for example, in the case where $k_R$ is a maximum value and $k_G$ is a minimum value, $R=k_R/k_G$), an ink of giving a ratio (R) of 1.2 or less, preferably 1.1 or less, more preferably 1.05 or less, is produced (condition 2).

The "printed matter obtained by printing a black square symbol of JIS code 2223 in a 48-point size" used above is an image printed in a size large enough to cover an aperture of the densitometer and thereby give a sufficiently large size for the measurement of density.

At least one of the dyes used in the black ink has an oxidation potential more positive than 1.0 V (vs SCE), preferably more positive than 1.1 V (vs SCE), more preferably more positive than 1.15 V (vs SCE), and at least one of the dyes preferably has λmax of 500 nm or longer (condition 3).

The oxidation potential used in the present invention is a value measured in N,N-dimethylformamide (concentration of compound: $1\times10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode. In the case of a water-soluble dye, the dye is sometimes hardly dissolved directly in N,N-dimethyl-formamide. In such a case, the oxidation potential is measured after dissolving the dye by using water in a small amount as much as possible and then diluting it with N,N-dimethylformamide to have a water content of 2% or less.

The oxidation potential value sometimes deviates on the order of several tens of millivolts due to the effect of liquid junction potential, liquid resistance of sample solution, or the like, but the reproducibility of the potential value measured can be guaranteed by calibration using a standard sample (for example, hydroquinone).

The black ink for use in the present invention preferably contains an azo dye represented by formula (BK1) shown below. The azo dye represented by formula (BK1) includes those falling under the dye (L) having λmax in the region from 500 to 700 nm and having a half-value width of 100 nm or more in the absorption spectrum of a dilute solution standardized to an absorbance of 1.0. Furhter, a dye (S) having λmax in the region from 350 to 500 nm is also included in the dye represented by formula (BK1). An ink where at least one dye (L) is the dye of formula (BK1) is preferred, an ink where at least one dye (L) and at least one dye (S) are the dyes of formula (BK1) is more preferred, and an ink where 90 wt % of all dyes in the ink is occupied by the dye of formula (BK1) is still more preferred (condition 4).

The black ink for use in the present invention is a black ink satisfying at least one of these conditions 1 to 4.

Of the dyes represented by formula (BK1), the dye falling under the dye (L) is described in detail below.

In formula (BK1), A, B and C each independently represent an aromatic group which may be substituted or a heterocyclic group which may be substituted (each A and C is a monovalent group and B is a divalent group), m represents 1 or 2, and n represents an integer of 0 or more.

A compound where m and n each is 1 or 2 is preferred and in such a case, at least two of A, B and C are preferably an unsaturated heterocyclic group which may be substituted. In particular, a compound where m and n are 1 and at least B and C are each an unsaturated heterocyclic group is more preferred.

The azo dye represented by formula (BK1) is preferably a dye represented by the following formula (BK2):

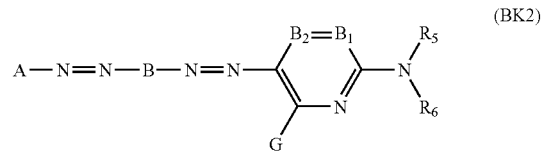

wherein A and B have the same meanings as in formula (BK1), respectively; $B_1$ and $B_2$ each represent =CR$_1$— or —CR$_2$= or either one of $B_1$ and $B_2$ represents a nitrogen atom and the other represents =CR$_1$— or —CR$_2$=; G, $R_1$ and $R_2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted; $R_5$ and $R_6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not hydrogen atoms at the same time; or $R_1$ and $R_5$, or $R_5$ and $R_6$ may combine to form a 5- or 6-membered ring.

The azo dye represented by formula (BK2) is more preferably a dye represented by the following formula (BK3)

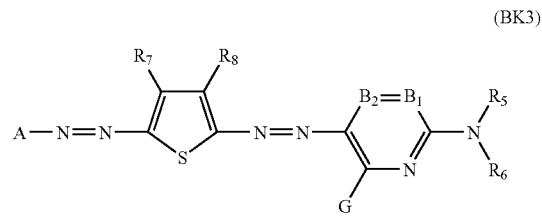

wherein $R_7$ and $R_8$ each have the same meanings as $R_1$ in formula (BK2).

The halogen atom includes a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of the monovalent aromatic groups and examples thereof include a phenylene group, a p-tolylene group, a p-methoxyphenylene group, an o-chlorophenylene group, an m-,(3-sulfopropylamino)phenylene group and a naphthylene group.

The heterocyclic group includes a heterocyclic group having a substituent and an unsubstituted heterocyclic group. The heterocyclic ring may be condensed with an aliphatic ring, an aromatic ring or other heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic ring used in the monovalent or divalent heterocyclic group include a pyridine ring, a thiophene ring, a thiazole ring, a benzothiazole ring, a benzoxazole ring and a furan ring.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent and an unsubstituted arylamino group. The arylamino group is preferably an arylamino group having from 6 to 20 carbon atoms. Examples of the substituent include a halogen atom and an ionic hydrophilic group. Examples of the arylamino group include an anilino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group includes an alkylsulfonylamino group having a substituent and an unsubstituted alkylsulfonylamino group, and the arylsulfonylamino group includes an arylsulfonylamino group having a substituent and an unsubstituted arylsulfonylamino group. The sulfonylamino group is preferably a sulfonylamino group having from 1 to 20 carbon atoms. Examples of the substituent include an ionic hydrophilic group. Examples of the sulfonylamino groups include a methylsufonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkylthio group includes include an alkylthio group having a substituent and an unsubstituted alkylthio group, the arylthio group includes an arylthio group having a substituent and an unsubstituted arylthio group, and the heterocyclic thio group includes a heterocyclic thio group having a substituent and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group includes an alkylsulfonyl group having a substituent and an unsubstituted alkylsulfonyl group, and the arylsulfonyl group includes an arylsulfonyl group having a substituent and an unsubstituted arylsulfonyl group. Examples of the alkylsulfonyl group and arylsulfonyl group include a methylsulfonyl group and a phenylsulfonyl group.

The alkylsulfinyl group includes an alkylsulfinyl group having a substituent and an unsubstituted alkylsulfinyl group, and the arylsulfinyl group includes an arylsulfinyl group having a substituent and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae (BK1), (BK2) and (BK3) are described in detail below.

In the following, those described above for each group or substituent are also applied.

In formula (BK1), A, B and C each independently represent an aromatic group (A and C each is a monovalent aromatic group such as aryl group, and B is a divalent aromatic group such as arylene group) which may be substituted, or a heterocyclic group (A and C each is a monovalent heterocyclic group and B is a divalent heterocyclic group) which may be substituted. Examples of the aromatic ring include a benzene ring and a naphthalene ring.

Examples of the heteroatom in the heterocyclic ring include N, O and S. The heterocyclic ring may be condensed with an aliphatic ring, an aromatic ring or other heterocyclic ring.

The substituent may be an arylazo group or a heterocyclic azo group.

At least two of A, B and C are preferably heterocyclic groups.

The heterocyclic group represented by C is preferably an aromatic nitrogen-containing 6-membered heterocyclic group represented by the following formula (BK4). When C is the aromatic nitrogen-containing 6-membered heterocyclic group represented by formula (BK4), formula (BK1) corresponds to formula (BK2).

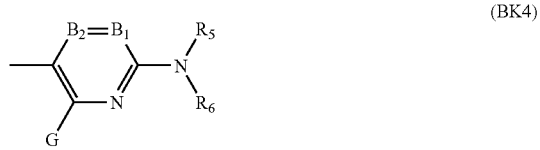
(BK4)

In formula (BK4), $B_1$ and $B_2$ each represent =$CR_1$— or —$CR_2$= or either one of $B_1$ and $B_2$ represents a nitrogen atom and the other represents =$CR_1$— or —$CR_2$=. $B_1$ and $B_2$ each is preferably =$CR_1$— or —$CR_2$=.

$R_5$ and $R_6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and each group may further have a substituent. However, $R_5$ and $R_6$ are not hydrogen atoms at the same time.

G, $R_1$ and $R_2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an alkylamino group, an arylamino group and a heterocyclic amino group) or an acylamino group, and most preferably a hydrogen atom, an anilino group or an acylamino group, and each group may further have a substituent.

The substituents represented by $R_1$ and $R_2$ each is preferably a hydrogen atom, an alkyl group, a halogen atom, an alkoxycarbonyl group, a carboxyl group, a carbamoyl group, a hydroxy group, an alkoxy group or a cyano group, and each group may further have a substituent.

$R_1$ and $R_5$, or $R_5$ and $R_6$ may combine to form a 5- or 6-membered ring.

When the substituents represented by A, $R_1$, $R_2$, $R_5$, $R_6$ and G each further has a substituent, examples of the substituent include the substituents described above for G, $R_1$ and $R_2$. Also, an ionic hydrophilic group is preferably further present as a substituent on any one of A, $R_1$, $R_2$, $R_5$, $R_6$ and G.

Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

When B has a ring structure, preferred examples of the heterocyclic ring include a thiophene ring, a thiazole ring, an imidazole ring, a benzothiazole ring and a thienothiazole ring. Each heterocyclic group may further have a substituent. Among the heterocyclic rings, a thiophene ring, a thiazole ring, an imidazole ring, a benzothiazole ring and a thienothiazole ring represented by the following formulae (a) to (e) respectively are preferred. When m=n=1, B is a thiophene ring represented by formula (a), and C is a structure represented by formula (4), formula (BK1) corresponds to formula (BK3).

(a)

(b)

-continued

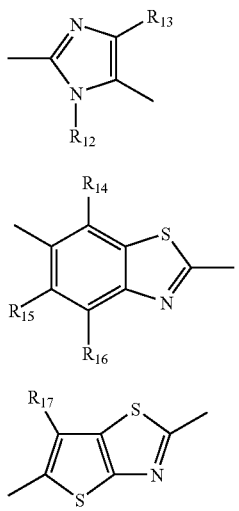

wherein $R_9$ to $R_{17}$ each represent a substituent having the same meaning as G, $R_1$ and $R_2$ in formula (BK2)

In the present invention, particularly preferred is a dye represented by the following formula (BK5):

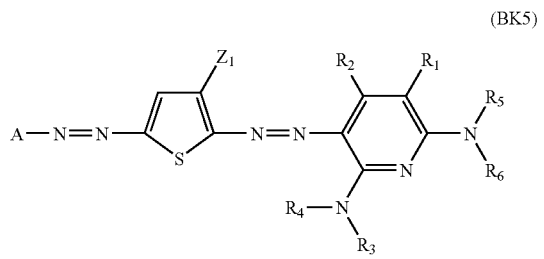

(BK5)

In formula (BK5), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of the substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_1$, $R_2$, $R_5$ and $R_6$ have the same meanings as in formula (BK2). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a heterocyclic group, an acyl group, an alkylsulfonyl group or an arylsulfonyl group, more preferably a hydrogen atom, an aromatic group or a heterocyclic group.

The groups described in regard to formula (BK5) each may further have a substituent. When the groups each further has a substituent, examples of the substituent include the substituents described in regard to formula (BK2), the groups described as examples for G, $R_1$ and $R_2$, and ionic hydrophilic groups.

Now, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of conventional publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described by using the Hammett's substituent constant $\sigma_p$ but it does not mean that the substituent is limited only to those having a known value which can be found in the above-described publications. Needless to say, the substituent includes substituents of which $\sigma_p$ value is not known in publications but when measured based on the Hammett's rule, falls within the range specified. Furthermore, although the azo dyes for the black ink of the present invention include those which are not benzene derivatives, the $\sigma_p$ value is used as a measure for showing the electron effect of the substituent irrespective of the substitution site. In the present invention, the $\sigma_p$ value is used in such a meaning.

Examples of the electron-withdrawing group having a Hammett's substituent constant $\sigma_p$ value of 0.60 or more include a cyano group, a nitro group, an alkylsulfonyl group (e.g., methanesulfonyl) and an arylsulfonyl group (e.g., benzenesulfonyl).

Examples of the electron-withdrawing group having a Hammett's $\sigma_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $\sigma_p$ value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a $\sigma_p$ value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a $\sigma_p$ value of 0.20 or more include, in addition to those described above, a halogen atom.

The preferred combination of substituents in the azo dye represented by formula (BK3) is described below. $R_5$ and $R_6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_5$ and $R_6$ are not hydrogen atoms at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably an aromatic group, a pyridine ring, a pyrazole ring, an imidazole ring, an isothiazole ring, a benzisothiazole ring, a thiadiazole ring, a thiazole ring, a benzothiazole ring or a triazole ring, more preferably an aromatic group, a pyridine ring, an isothiazole ring, a benzisothiazole ring, a thiadiazole ring or a benzothiazole ring, and most preferably an aromatic group, a pyridine ring or a benzothiazole ring.

$B_1$ and $B_2$ each is =CR$_1$— or —CR$_2$=, and $R_1$ and $R_2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (BK1), a compound where at least one of various substituents is the above-described preferred group is preferred, a compound where a larger number of various substituents are the above-described preferred groups is more preferred, and a compound where all substituents are the above-described preferred groups is most preferred.

Specific examples of the azo dye represented by formula (BK1) are set forth below, however, the azo dye for use in the present invention is not limited to those set forth below. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

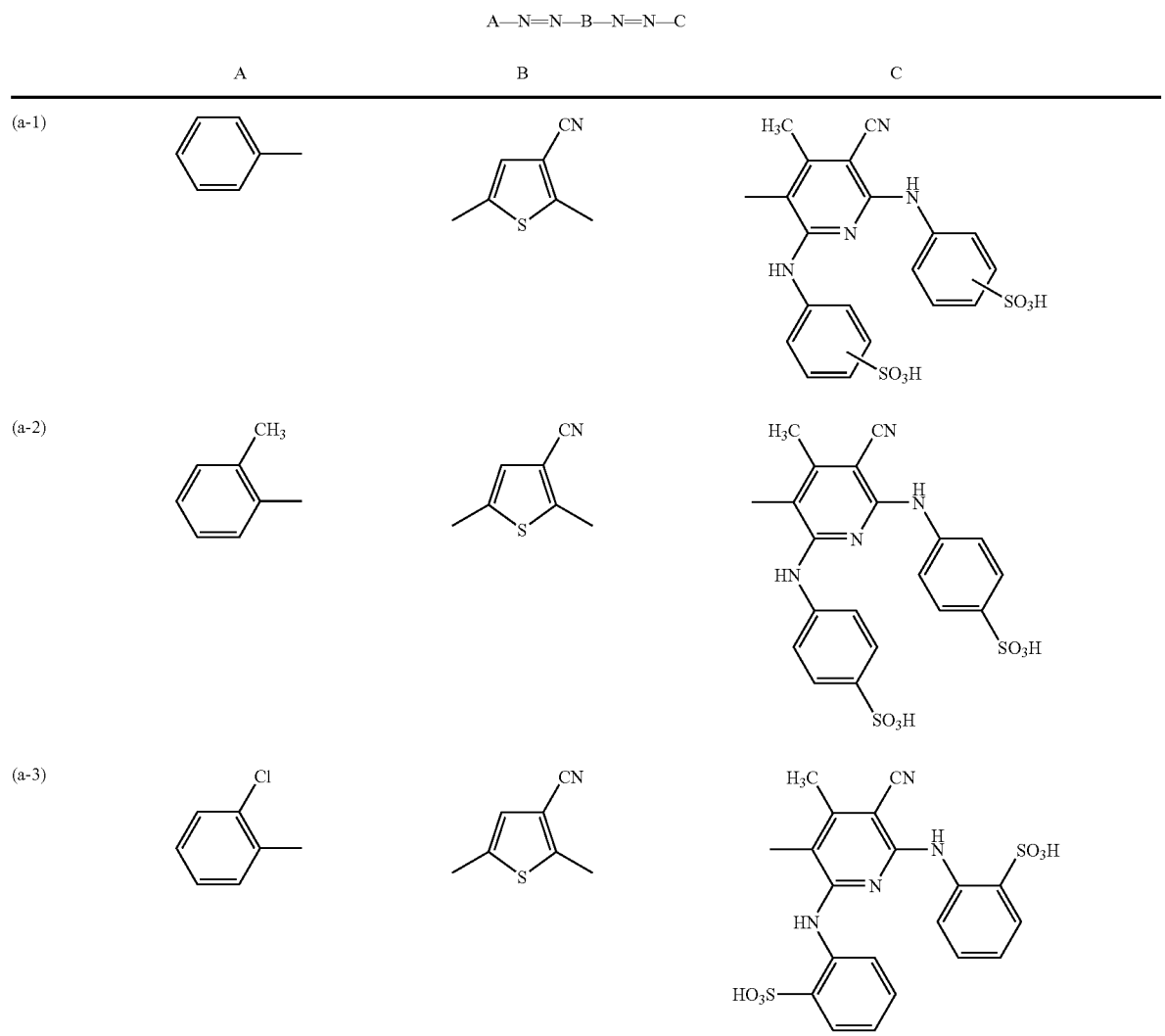

-continued
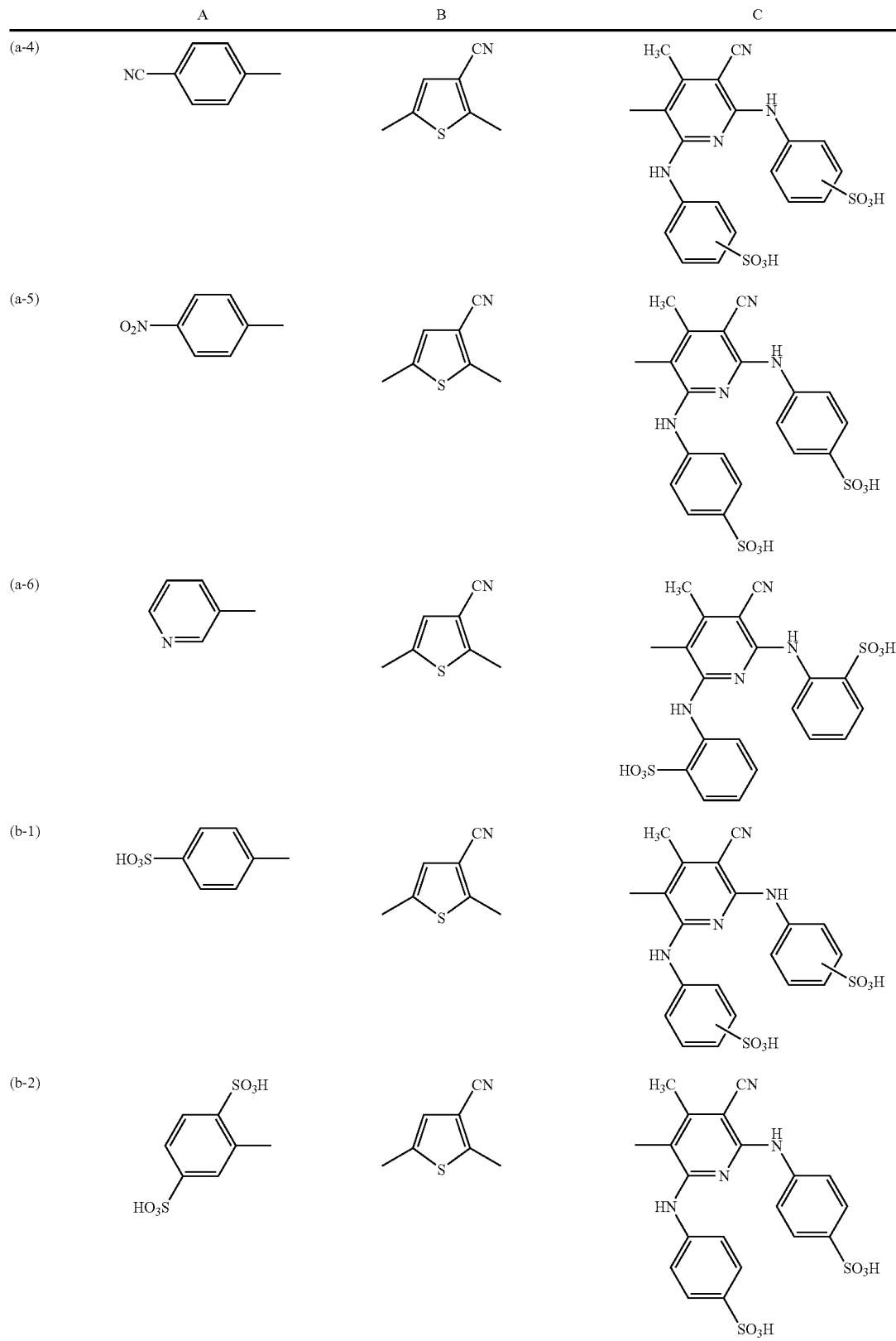

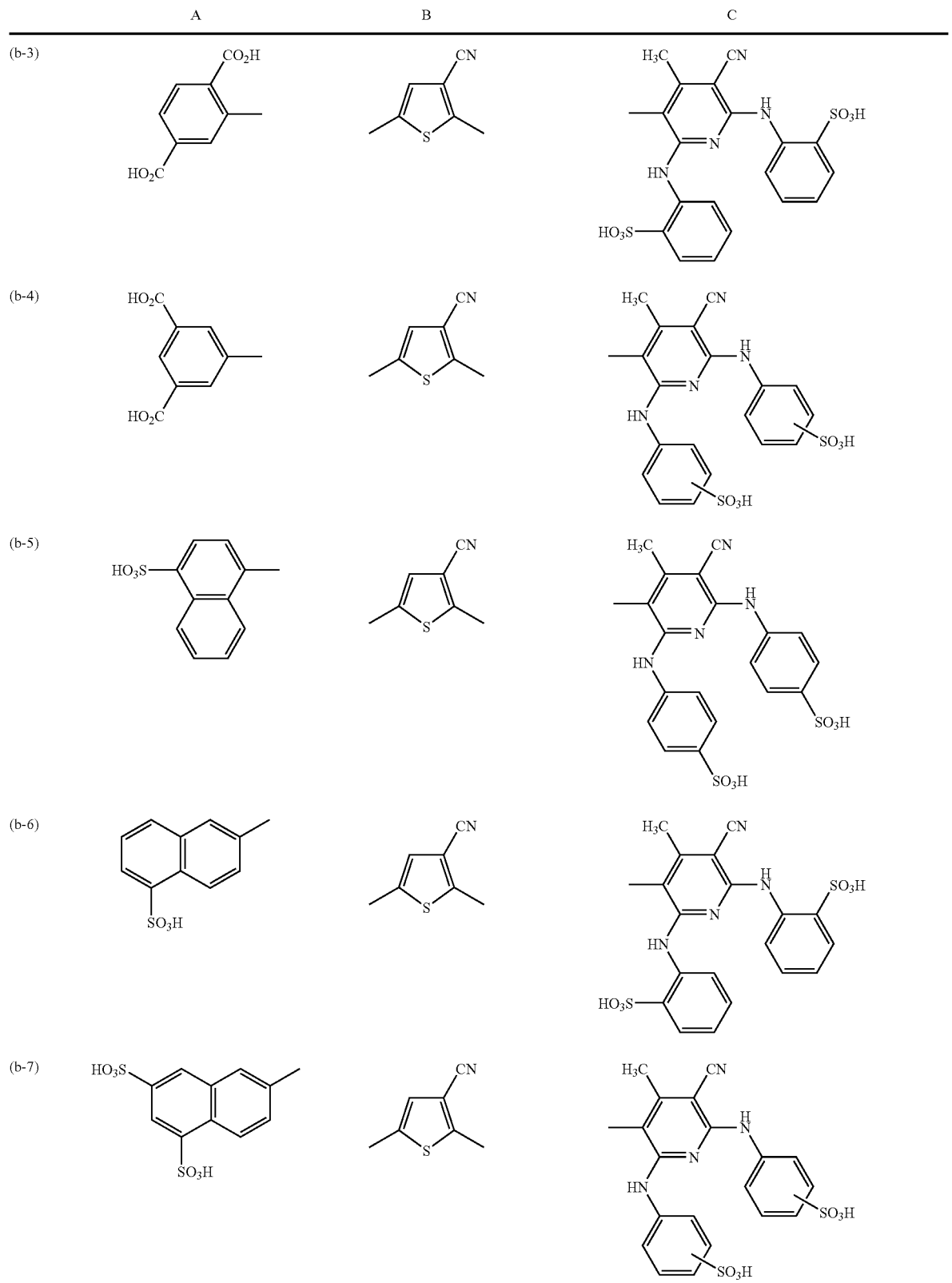

-continued
A—N=N—B—N=N—C
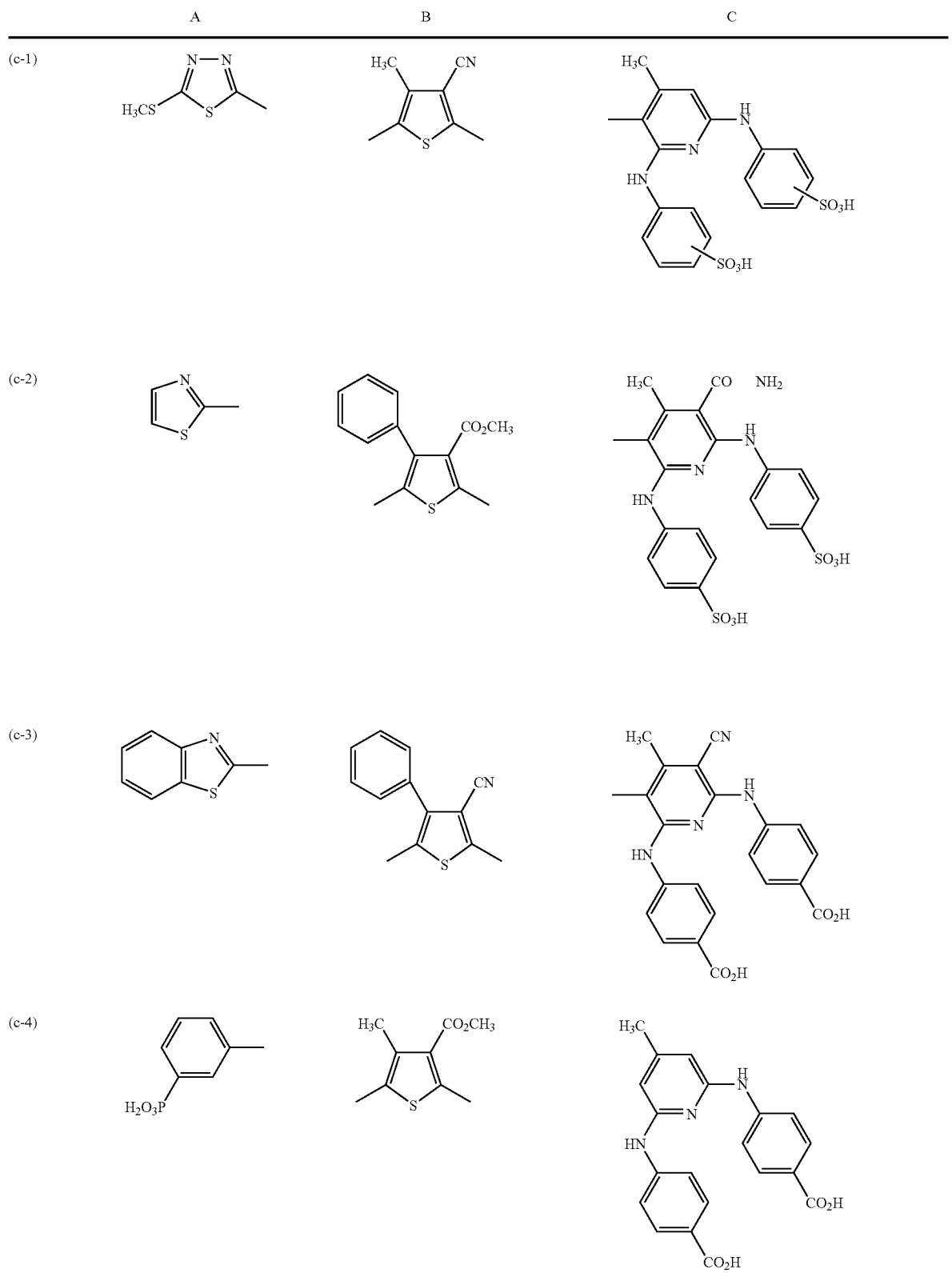

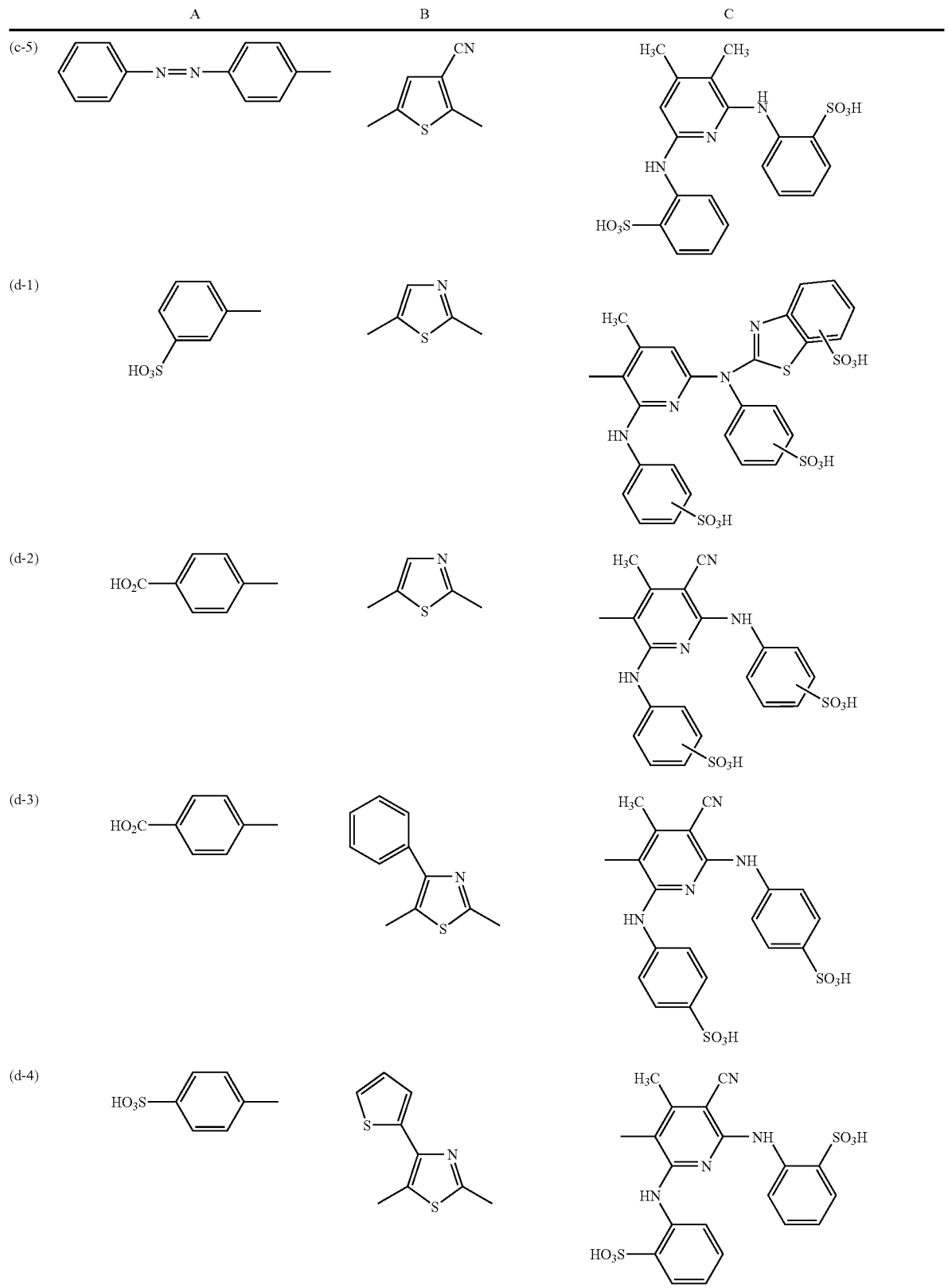

-continued
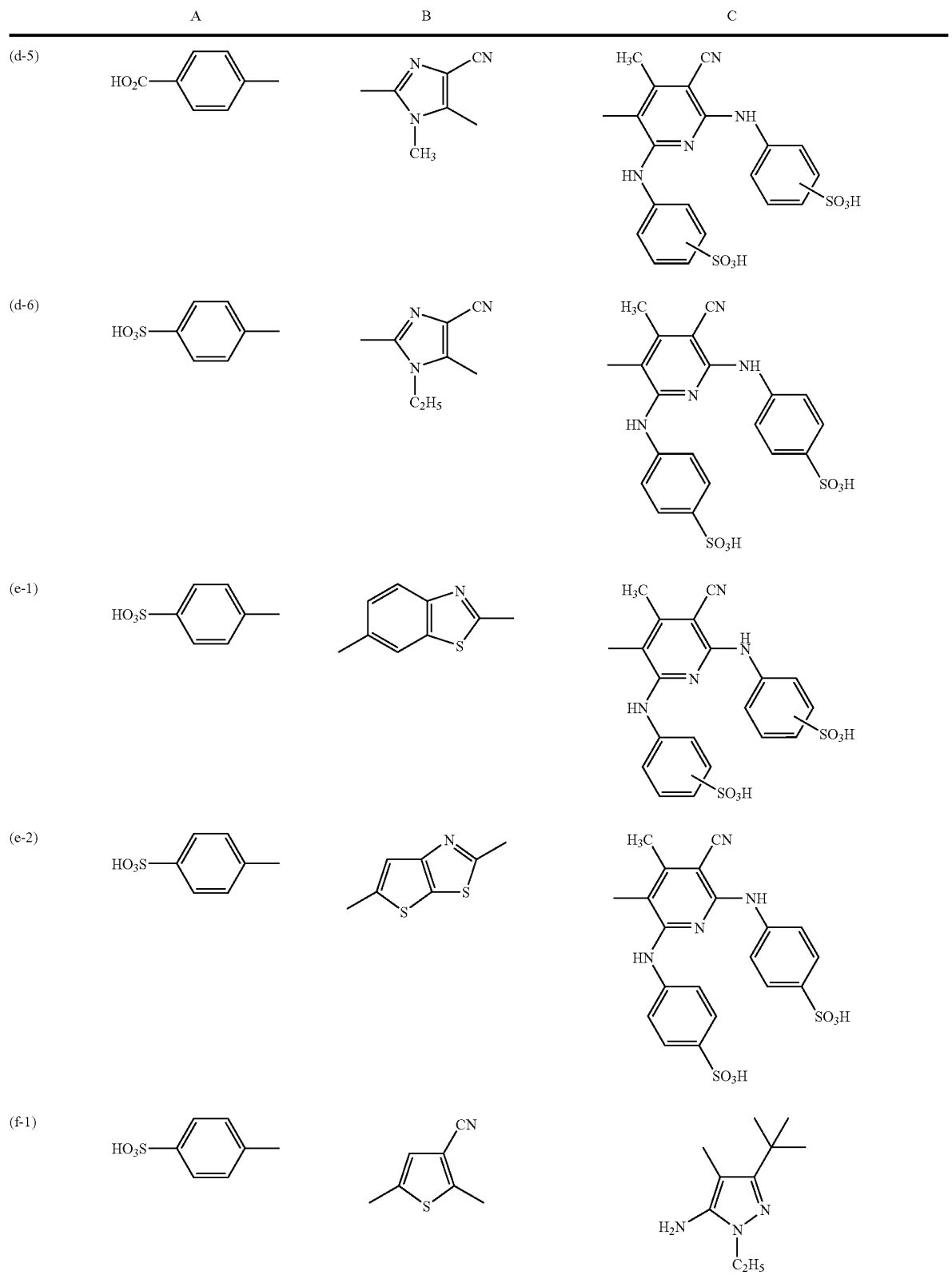

-continued

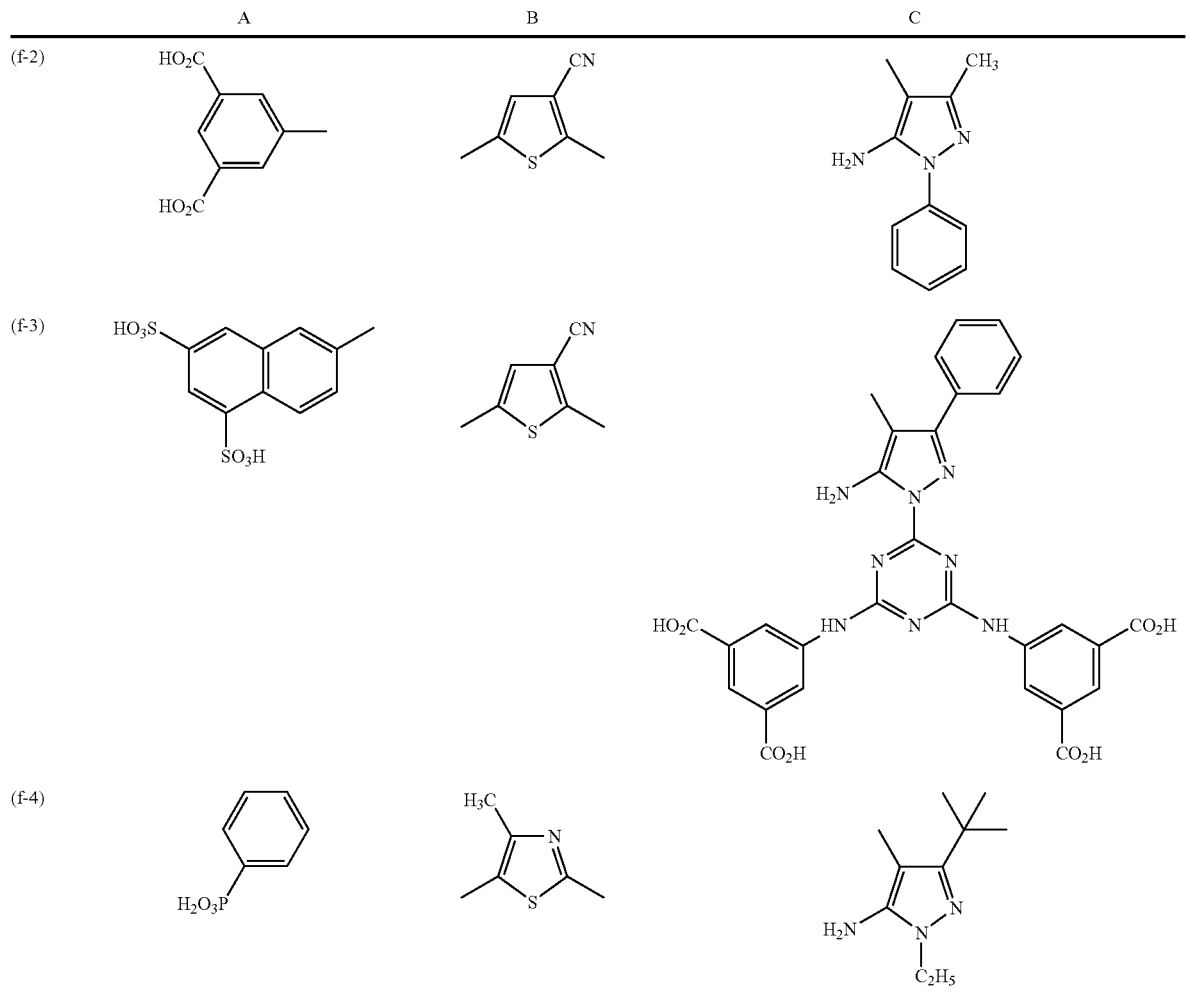

The dyes represented by formulae (BK1), (BK2), (BK3) and (BK5) can be synthesized by a coupling reaction of a diazo component and a coupler. As the main synthesis method, the method described in JP-A-2003-306623 can be used.

In the case where the dye (L) by itself can realize black of high image quality "pure black" (that is, black which is not dependent on the light source at the observation and less susceptible to stress of any one color tone of B, G and R), the dye may be used alone as the dye for black ink. However, in general, a dye for covering the region where the dye (L) has low absorption is usually used in combination. A dye or pigment having main absorption in the yellow region is usually used in combination to realize the preferred black. As the yellow dye, commonly employed direct dyes, acid dyes and the like, representatively azo dyes and azomethine dyes, can be used. As the pigment, an aqueous dispersion of a conventional pigment having a pigment number can be used in combination. In particular, a dye represented by formula (BK1) as the short-wave dye (S) described above is preferably used.

Among the dyes represented by formula (BK1), an azo dye where m=n=0 is firstly preferred as the short-wave dye (S). In such a case, A and C each is preferably a heteroaromatic ring. An azo dye where m=n=1 is next preferred.

In either case, the dye preferably has an oxidation potential (Eox) of more positive than 1.0 V (vs SCE), more preferably more positive than 1.15 V (vs SCE).

In the black ink, at least two long-wave length dyes can also be used in combination.

Furthermore, the black ink can also be produced by using other dyes in combination.

The black ink for inkjet recording method of the present invention contains the dye of formula (BK1) in an amount of 0.2 to 25 wt %, preferably from 0.5 to 15 wt %, based on the entire ink.

For the dye having λmax in the region from 350 to 500 nm, a yellow dye or pigment described later can be also used.

The black dye for use in the present invention is substantially soluble or dispersible in water. In particular, the ink composition containing the black dye of the present invention is preferably a solution-type ink composition using a water-soluble dye. More specifically, the solubility of the dye in water at 20° C. is preferably 2 wt % or more, more preferably 5 wt % or more.

The dyes other than the black dye for use in the present invention are preferably a substantially water-soluble or water-dispersible dye. More specifically, the solubility of the dye in water at 20° C. is preferably 2 wt % or more, more preferably 5 wt % or more.

In the case of producing two or more inks, one ink may be produced as a light-type ink and another may be produced as a thick ink. In the present invention, such inks can be produced. Further, ink compositions which provide almost the same printed density can be produced.

Examples of the dye which can be used other than the black dye include dyes known in the field of art, such as triarylmethane dye, anthraquinone dye, anthrapyridone dye, azomethine dye, azo dye, cyanine dye, merocyanine dye and oxonol dye, and these dyes can be used individually or in combination (preferably in combination of giving a black dye). Among these, azo dyes are preferred.

More specifically, examples of the yellow dye include aryl- or heteryl-azo dyes having a phenol, a naphthol, an aniline, a pyrazolone, a pyridone or an open chain active methylene compound as the coupling component; azomethine dyes having an open chain active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye. Such a dye may be a dye which provides a yellow color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be those which provide a magenta color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo-thioindigo dyes. These dyes may be those which provide a cyan color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the water-soluble dye include a direct dye, an acid dye, a food dye, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

In the ink or ink set of the present invention, other dyes may be used in combination with the above-described dyes so as to adjust the color tone for obtaining a full color image. Examples of the dye which can be used in combination include the dyes described above and the following pigments.

As the pigment which can be used in the present invention, commercially available pigments and known pigments described in various publications can be used. Examples of the publication include *Colour Index*, compiled by The Society of Dyers and Colourists, *Kaitei Shin Han Ganryo Binran (Revised New Handbook of Pigments.)*, compiled by Nippon Ganryo Gijutsu Kyokai (1989), *Saishin Ganryo Oyo Gijutsu (Newest Pigment Application Technology)*, CMC Publishing Co., Ltd. (1986), *Insatsu Ink Gijutsu (Printing Ink Technique)*, CMC Publishing Co., Ltd. (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acid or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As the blue to cyan pigment, phthalocyanine pigments, anthraquinone-type indanthrone pigments. (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment Yellow 93, 94, 95, 128 and 155, and benzimidazolone-type C.I. Pigment Yellow 120, 151, 154, 156 and 180, and among these, those not using a benzidine-base compound as a raw material are more preferred), isoindoline.isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the present invention may be the above-described pigment which is not subjected to any treatment or is subjected to a surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo Co., Ltd.;

(2) *Insatsu Ink Insatsu* (*Printing Ink Printing*), CMC Publishing Co., Ltd. (1984);

(3) *Saishin Ganryo Oyo Gijutsu* (*Newest Pigment Application Technology*), CMC Publishing Co., Ltd. (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. Patents of (4) and capsulated pigments prepared by the method described in JP-As of (5) are effective, because dispersion stability can be obtained without using an excess dispersant in the ink.

In the ink of the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549,486. In case of using the dispersant, a pigment derivative called synergist may also be added so as to accelerate the adsorption of dispersant to the pigment.

The particle size of the pigment which can be used in the present invention is, after the dispersion, preferably from 0.01 to 10 µm, more preferably from 0.05 to 1 µm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Publishing Co., Ltd. (1986).

Other components which can be contained in the ink composition for inkjet recording of the present invention are described below.

The ink composition for inkjet recording of the present invention may contain a surfactant to control the liquid properties of the ink composition, whereby excellent effects can be provided, such as enhancement of the ejection stability of the ink composition, improvement of water resistance of the image and prevention of bleeding of the printed ink composition.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 wt %, preferably from 0.005 to 10 wt %, more preferably from 0.01 to 5 wt %, based on the ink composition.

Examples of the water-soluble organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl propylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). The water-soluble organic solvents can be used in combination of two or more thereof. The water-soluble organic solvents which are soluble in water in an amount of 20% by weight or more at 25° C. are preferably used. Among these, water-soluble organic solvents having a boiling point of 150° C. or more are preferred in the present invention.

In the case where the above-described dye is an oil-soluble dye, the ink composition can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N7dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenyl, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid, diphenylphosphoric acid).

The high boiling point organic solvents may be used individually or as a mixture of several kinds thereof (for example, tricresyl phosphate and dibutyl phthalate, trioctyl phosphate and di(2-ethylhexyl) sebacate, or dibutyl phthalate and poly(N-tert-butylacrylamide)).

Examples of the high boiling point organic solvent for use in the present invention, other than the above-described compounds, and/or the synthesis method of the high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in an amount of from 0.01 to 3.0 times, preferably from 0.01 to 1.0 time in terms of the weight ratio to the oil-soluble dye.

In the present invention, the oil-soluble dye or high boiling point organic solvent is used by emulsion-dispersing it in an aqueous medium. Depending on the case, a low boiling point organic solvent may also be used at the emulsion-dispersion in view of emulsifiability. The low boiling point organic solvent is an organic solvent having a boiling point of about 30 to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, an additive described later, such as surfactant, wetting agent, dye stabilizer, emulsification stabilizer, antiseptic or fungicide, can be added, if desired.

In a conventional emulsification method, an oil phase is added to an aqueous phase, however, a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after the emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Also, natural water-soluble polymers such as polysaccharides, casein and gelatin are also preferably used. Furthermore, for the stabilization of the dye dispersion, a polymer which does not substantially dissolve in an aqueous medium, such as vinyl polymer, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. The polymer preferably contains —$SO_3^-$ or —$COO^-$. In the case of using such a polymer which does not substantially dissolve in an aqueous medium, the polymer is preferably used in an amount of 20 wt % or less, more preferably 10 wt % or less, based on the high boiling point organic solvent.

In preparing an aqueous ink composition by dispersing the oil-soluble dye and high boiling point organic solvent according to emulsion-dispersion, control of the particle size is particularly important. In order to improve the color purity or density of an image formed by the inkjet recording, it is essential to reduce the average particle size. The average particle size is preferably 1 μm or less, more preferably from. 5 to 100 nm in terms of the volume average particle size.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418. For example, the ink composition is diluted with distilled water to have a particle concentration of 0.1 to 1 wt %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and it is obtained by multiplying the diameter of individual particles with the volume of the particle and dividing the sum total of the obtained values by the total volume of the particles in the gathering of particles. The volume average particle size is described in Soichi Muroi, *Kobunshi Latex no Kagaku* (*Chemistry of Polymer Latex*), page 119, Kobunshikankokai Co., Ltd.

Also, it is revealed that the presence of coarse particles greatly affects the printing performance. More specifically, the coarse particle clogs the nozzle of head or even if the nozzle is not clogged, forms a soil to bring about failure or twist in the ejection of ink, whereby the printing performance is seriously affected. In order to prevent these troubles, it is important to reduce the number of particles having a particle size of 5 μm or more to 10 or less and the number of particles having a particle size of 1 μm or more to 1,000 or less, in 1 μl of ink prepared.

For removing the coarse particles, a known method such as centrifugal separation or microfiltration can be used. The separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, however, a high-pressure homogenizer is particularly preferably used.

The mechanism of the high-pressure homogenizer is described in detail in U.S. Pat. No. 4,533,254 and JP-A-6-47264. Examples of the commercially available apparatus include Gaulin Homogenizer (manufactured by A.P. V Gaulin Inc.), Microfluidizer (manufactured by Microfluidex Inc.) and Altimizer (produced by Sugino Machine Ltd.).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using such ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus, adding additive such as wetting agent and surfactant, and then again passing the dispersion through a high-pressure homogenizer before the time of filling the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. The removal of the low boiling point organic solvent is preferably performed as soon as possible immediately after the emulsification.

In the ink composition for inkjet recording according to the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor and pH adjusting agent, can be appropriately selected and used in an appropriate amount.

The drying inhibitor for use in the present invention is preferably a water-soluble organic solvent having a vapor pressure lower than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. The drying inhibitors may be used individually or in combination of two or more thereof. The drying inhibitor is preferably contained in an amount of 10 to 50 wt % in the ink.

Examples of the permeation accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator in the ink. The permeation accelerator is preferably used in an amount of causing no bleeding of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compounds and benzoxazole-base compounds.

As the antioxidant which can be used in the present invention for improving the preservability of image, various organic or metal complex discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic compounds. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and specific examples thereof described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 wt % in the ink.

The fungicide is described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropylammonium nitrite, pentaerythritol-tetranitrate, dicyclohexylammonium nitrite and benzotriazole. The rust inhibitor is preferably used in an amount of 0.02 to 5.00 wt % in the ink.

The pH adjusting agent for use in the present invention can be suitably used for adjusting the pH and imparting dispersion stability. The pH of the ink is preferably adjusted to 8 to 11 at 25° C. When the pH is less than 8, the solubility of dye decreases to readily cause clogging of a nozzle, whereas when it exceeds 11, the water resistance is liable to deteriorate. Examples of the pH adjusting agent include organic bases and inorganic alkalis for basic compounds, and organic acids and inorganic acids for acidic compounds.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include acetic acid, propionic acid, trifluoroacetic acid and an alkylsulfonic acid. Examples of the inorganic acid include hydrochloric acid, sulfuric acid and phosphoric acid.

In the present invention, apart from the betaine compound including surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used.

The surface tension of the ink for use in the present invention is, irrespective of dynamic surface tension or static surface tension, preferably from 20 to 50 mN/m, more preferably from 20 to 40 mN/m, at 25° C. When the surface tension exceeds 50 mN/m, ejection stability and printing quality, for example, bleeding due to color mixing or occurrence of feathering, are seriously deteriorated, whereas when the surface tension of the ink is less than 20 mN/m, printing failure may occur due to, for example, attachment of ink to the surface at the ejection.

The ink of the present invention preferably has a viscosity at 25° C. of 1 to 20 mPa·s, more preferably from 2 to 15 mPa·s, still more preferably from 2 to 10 mPa·s. When the viscosity exceeds 20 mPa·s, the fixing rate of the recorded image decreases and the ejection performance also decreases, whereas when it is less than 1 mPa·s, the bleeding occurs in the recorded image to decrease the grade.

The viscosity can be appropriately adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*) -*Zairyo no Kaihatsu Doko•Tenbo Chosa*- (*Chemicals for Inkjet Printer (Enlarged*

Edition of 98) -*Survey on Tendency• Prospect of Development of Materials*-), pp. 162–174, CMC Publishing Co., Ltd. (1997).

In preparing the ink of the present invention, in the case of a water-soluble ink, the dye is preferably first dissolved in water and thereafter, various solvents and additives are added, dissolved and mixed to provide a uniform ink solution.

For dissolving the dye, various methods such as stirring, ultrasonic irradiation and shaking can be used. Among these, stirring is preferred. In performing the stirring, various systems known in the field of art can be used, such as flow stirring and stirring utilizing the shearing force by means of a reversal agitator or a dissolver. Also, a stirring method utilizing the shearing force with the bottom surface of a container, such as magnetic stirrer, can be advantageously used.

The recording paper and recording film as reflective media for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then paper-making the mixture by using various machines such as Fourdrinier paper machine and cylinder paper machine. Further, synthetic paper or plastic film may be used. The thickness of the support is preferably from 10 to 250 μm and the basis weight is preferably from 10 to 250 g/m².

An ink-receiving layer and a backcoat layer may be directly provided on the support to produce an image-receiving material, or after providing a size press or an anchor coat layer by using starch, polyvinyl alcohol or the like, an ink-receiving layer and a backcoat layer may be provided to produce an image-receiving material. The support may be further subjected to a planarizing treatment by a calendering device such as machine calender, TG calender and soft calender.

In the present invention, the support is preferably paper both surfaces of which are laminated with polyolefin (for example, polyethylene, polystyrene, polybutene or a copolymer thereof) or polyethylene terephthalate, or a plastic film. In the polyolefin, a white pigment (for example, titanium oxide or zinc oxide) or a tinting dye (for example, cobalt blue, ultramarine or neodymium oxide) is preferably added.

The ink-receiving layer provided on the support contains a porous material or an aqueous binder. Also, the ink-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method or a silicic acid hydrate obtained by a wet production method, but a silicic acid hydrate is preferred. The pigments may be used in combination of two or more thereof.

Examples of the aqueous binder contained in the ink-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water-dispersible polymers such as styrene butadiene latex and acryl emulsion. The aqueous binders may be used individually or in combination of two or more thereof. Among these, polyvinyl alcohol and silanol-modified polyvinyl alcohol are preferred in the present invention in view of adhesion to the pigment and peeling resistance of the ink-receiving layer.

The ink-receiving layer may contain a mordant, a water-proofing agent, a light fastness enhancer, a surfactant, a hardening agent and other additives in addition to the pigment and the aqueous binder.

The mordant added to the ink-receiving layer is preferably immobilized and for such a purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in JP-A-1-161236 is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among the cationic resins, polyamidopolyamine epichlorohydrin is preferred. The content of the cationic resin is preferably from 1 to 15 wt %, more preferably from 3 to 10 wt %, based on the entire solid content of the ink-receiving layer.

Examples of the light fastness enhancer include zinc sulfate, zinc oxide, hindered amine-base antioxidants, and benzotriazole-base ultraviolet absorbents such as benzophenone. Among these, zinc sulfate is preferred.

The surfactant functions as a coating aid, an adherence improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222) can be used.

Other examples of the additive added to the ink-receiving layer include a pigment dispersant, a thickener, a defoaming agent, a dye, a fluorescent brightening agent, an antiseptic, a pH adjusting agent and a matting agent. The ink-receiving layer may be composed of one layer or two layers.

In the recording paper or film, a backcoat layer may also be provided. Examples of the component which can be added to the layer include a white pigment, an aqueous binder and other components.

Examples of the white pigment contained in the backcoat layer include inorganic white pigments such as precipitated calcium carbonate light, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge controlling system of ejecting the ink by utilizing the electrostatic induction force, a drop-on-demand system (pressure pulse system) utilizing an oscillation pressure of a piezoelectric element, an acoustic inkjet system wherein electric signals are converted into acoustic beams, and the ink is irradiated with the beam to eject the ink using the radiation pressure, and a thermal inkjet (bubble jet) system of heating the ink to form a bubble and ejecting the ink utilizing the generated pressure.

The inkjet recording system includes a system of ejecting a large number of small-volume ink droplets of a so-called photo ink having a low concentration, a system of improving the image quality by using a plurality of inks having substantially the same color hue but different in the concentration, and a system using a colorless transparent ink.

The inkjet recording ink of the present invention can also be used for the uses other than the inkjet recording, such as a material for display image, an image-forming material for interior decoration and an image-forming material for outdoor decoration.

Examples of the material for display image include various materials such as poster, wall paper, ornamental articles (e.g., decorative figurine, doll), handbill for commercial advertisement, wrapping paper, wrapping material, paper bag, vinyl bag, package material, billboard, image drawn on or attached to the side surface of transportation facilities (e.g., automobile, bus, electric car), and clothing with a logo. In the case of using the ink of the present invention as a material for forming a display image, the image includes not only a narrow definition of image but also all patterns by an ink, which can be acknowledged by a human, such as abstract design, letter and geometrical pattern.

Examples of the material for interior decoration include various materials such as wallpaper, ornamental articles (e.g., decorative figurine, doll), luminaire member, furniture member and design member of floor or ceiling. In the case of using the ink of the present invention as a material for forming an image, the image includes not only a narrow definition of image but also all patterns by an ink, which can be acknowledged by a human, such as abstract design, letter and geometrical pattern.

Examples of the material for outdoor decoration include various materials such as wall material, roofing material, billboard, gardening material, outdoor ornamental articles (e.g., decorative figurine, doll) and outdoor luminaire member. In the case of using the ink of the present invention as a material for forming an image, the image includes not only a narrow definition of image but also all patterns by an ink, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

The present invention is described below by referring to Examples, however, the present invention is not limited thereto.

EXAMPLE 1

Deionized water was added to the following components to make 1 liter and the mixture was stirred for 1 hour under heating at 30 to 40° C. and then filtered under reduced pressure through a microfilter having an average pore size of 0.25 μm to prepare Light Magenta Ink Solution LM-101.

| [Formulation of Light Magenta Ink LM-101] | |
| --- | --- |
| (Solid Contents) | |
| Magenta Dye (MD-1) | 7.5 g/liter |
| Urea | 37 g/liter |
| (Liquid Components) | |
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Also, Magenta Ink Solution M-101 was prepared by increasing Magenta Dye (MD-1) to 23 g in the formulation above.

[Formulation of Magenta Ink M-101]

(Solid Contents)

| | |
|---|---|
| Magenta Dye (MD-1) | 23 g/liter |
| Urea | 37 g/liter |

(Liquid Components)

| | |
|---|---|
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Inks LM-102 to LM-108 and Inks M-102 to M-108 each having the same composition as LM-101 or M-101 except for adding the additive shown in the Table below to LM-101 or M-101 were produced. The concentration of inorganic ions contained in each ink was analyzed by an ion chromatograph and the total concentration thereof in terms of wt % concentration is shown in the following table.

| | | Inorganic Ion Concentration in Ink (wt %) | |
|---|---|---|---|
| | Additive | Light Magenta | Magenta |
| LM-101, M-101 (Comparative Example) | none | 0.3 | 0.8 |
| LM-102, M-102 (Comparative Example) | none | 1.2 | 3.4 |
| LM-103, M-103 (Comparative Example) | 10 g/liter of POEP-1 to LM-101, M-101 | 0.4 | 1.0 |
| LM-104, M-104 (Comparative Example) | 10 g/liter of X1-1 to LM-101, M-101 | 2.1 | 5.5 |
| LM-105, M-105 (Invention) | 10 g/liter of X1-1 to LM-101, M-101 | 0.3 | 0.8 |
| LM-106, M-106 (Invention) | 10 g/liter of X1-1 to LM-101, M-101 | 0.2 | 0.5 |
| LM-107, M-107 (Invention) | 10 g/liter of X1-14 to LM-101, M-101 | 0.3 | 0.8 |
| LM-108, M-108 (Invention) | 10 g/liter of X1-14 to LM-101, M-101 | 0.5 | 1.4 |

POEP-1: Polyoxyethylene nonylphenyl ether (PEO chain: 30 on average)

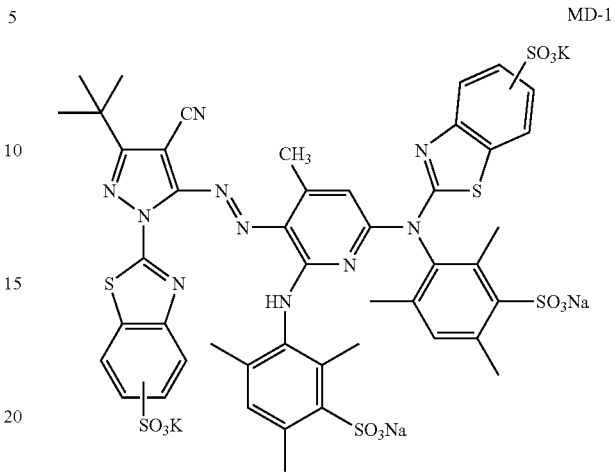

MD-1

In the table, the dye and betaine used in LM-102, M-102, LM-104 and M-104 were not purified by desalting.

In LM-106 and M-106, an ink stock solution containing the dye and betaine was prepared and after purification by desalting, used for the preparation of the ink solution.

In all other inks, the dye and betaine were used for the preparation of the ink solution after purification by desalting.

The desalting level was changed between LM-107/M-107 and LM-108/M-108.

Each of the inks was filled in a magenta ink-light magenta ink cartridge of Inkjet Printer PM-950C manufactured by Seiko Epson Corporation and by using the inks of PM-950C for other colors, a magenta monochromatic image was printed. The image was printed on Inkjet Photo Gloss Paper "GASAI" produced by Fuji Photo Film Co., Ltd. used as the image-receiving sheet and the fastness of image under high humidity conditions was evaluated.

(Evaluation Test)

In the evaluation of bleeding of the image under high humidity conditions, a printing pattern was prepared. The printing pattern included four magenta square patterns each having a size of 3 cm×3 cm, arrayed to form a two-row and two-column table shape with a 1-mm white clearance between the respective square patterns. After the printing pattern was stored under conditions of 25° C. and 90% RH for 72 hours, bleeding of the magenta dye in the white clearance was observed. The increase of magenta density in the white clearance to the magenta density immediately after printing was measured by a magenta filter of Status A, and a case wherein the increase of magenta density was less than 0.01 was rated A, a case wherein the increase of magenta density was from 0.01 to 0.05 was rated B, a case wherein the increase of magenta density was more than 0.05 was rated C, and a case wherein the magenta bled throughout the image was rated D.

The results obtained are shown in the table below.

| | M Bleeding |
|---|---|
| Genuine ink of EPSON (PM-950C) | B |
| LM-101, M-101 (Comparative Example) | D |

-continued

|  | M Bleeding |
|---|---|
| LM-102, M-102 (Comparative Example) | C |
| LM-103, M-103 (Comparative Example) | C |
| LM-104, M-104 (Comparative Example) | B |
| LM-105, M-105 (Invention) | A |
| LM-106, M-106 (Invention) | A |
| LM-107, M-107 (Invention) | A |
| LM-108, M-108 (Invention) | A |

As seen from the results in the table above, the systems using the ink set of the present invention are superior to all Comparative Examples in view of M bleeding.

Also, a humidity resistance test for 1 week was performed by prolonging the test period. As a result, the bleeding visually observed was slightly increased in the case of LM-108 and M-108 as compared with LM-107 and M-107.

EXAMPLE 2

Deionized water was added to the following components to make 1 liter and the mixture was stirred for 1 hour under heating at 30 to 40° C. and then filtered under reduced pressure through a microfilter having an average pore size of 0.25 μm to prepare Yellow Ink Solution (Y-101).

| [Formulation of Yellow Ink Y-101] | |
|---|---|
| (Solid Contents) | |
| Yellow Dye (YD-1) | 35 g/liter |
| Urea | 10 g/liter |
| (Liquid Components) | |
| Triethylene glycol monobutyl ether (TGB) | 100 g/liter |
| Glycerin (GR) | 115 g/liter |
| Diethylene glycol (DEG) | 70 g/liter |
| 2-Pyrrolidone | 35 g/liter |
| Triethanolamine (TEA | 8 g/liter |
| Surfynol STG (SW) | 10 g/liter |

Inks Y-102 to Y-108 each having the same composition as Y-101 except for adding the additive in the Table shown below to Y-101 were produced. The concentration of inorganic ions contained in each ink was analyzed by an ion chromatograph and the total concentration thereof in terms of wt % is shown in the following table.

|  | Additive | Inorganic Ion Concentration in Ink (wt %) |
|---|---|---|
| Y-101 (Comparative Example) | none | 0.5 |
| Y-102 (Comparative Example) | none | 2.6 |
| Y-103 (Comparative Example) | 10 g/liter of POEP-1 to Y-101 | 0.6 |
| Y-104 (Comparative Example) | 10 g/liter of X1-1 to Y-101 | 3.7 |
| Y-105 (Invention) | 10 g/liter of X1-1 to Y-101 | 0.6 |
| Y-106 (Invention) | 10 g/liter of X1-1 to Y-101 | 0.2 |
| Y-107 (Invention) | 10 g/liter of X2-2 to Y-101 | 0.5 |
| Y-108 (Invention) | 10 g/liter of X2-2 to Y-101 | 1.6 |

POEP-1: Polyoxyethylene nonylphenyl ether (PEO chain: 30 on average)

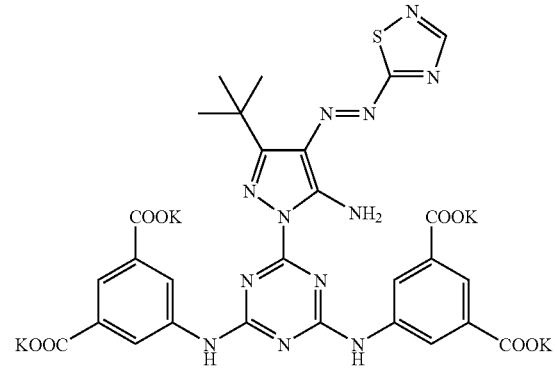

YD-1

In the table, the dye and betaine used in Y-102 and Y-104 were not purified by desalting.

In Y-106, an ink stock solution containing the dye and betaine was prepared and after purification by desalting, used for the preparation of the ink solution.

In all other inks, the dye and betaine were used for the preparation of the ink solution after purification by desalting.

The desalting level was changed between Y-107 and Y-108.

These inks each was filled in a yellow ink cartridge of Inkjet Printer PM950C manufactured by Seiko Epson Corporation and by using the inks of PM-950C for other colors, a yellow monochromatic image was printed. The image was printed on Inkjet Photo Gloss Paper EX produced by Fuji Photo Film Co., Ltd. used as the image-receiving sheet and the fastness of image under high humidity conditions was evaluated.

(Evaluation Test)

In the evaluation of bleeding of the image under high humidity conditions, a printing pattern was prepared. The printing pattern included four green square patterns each having a size of 3 cm×3 cm, arrayed to form a two-row and two-column table shape with a 1-mm white clearance between the respective square patterns. After the printing pattern was stored under conditions of 25° C. and 90% RH for 72 hours, the bleeding of yellow dye in the white clearance was observed. The increase of yellow density in the white clearance to the yellow density immediately after printing was measured by a B filter of Status A, and a case wherein the increase of yellow density was less than 0.01 was rated A, a case wherein the increase of yellow density was from 0.01 to 0.05 was rated B, a case wherein the increase of yellow density was more than 0.05 was rated C, and a case wherein the yellow bled throughout the image was rated D.

The results obtained are shown in the table below.

|  | Y Bleeding |
|---|---|
| Genuine ink of EPSON (PM-950C) | B |
| Y-101 (Comparative Example) | D |
| Y-102 (Comparative Example) | C |
| Y-103 (Comparative Example) | C |

-continued

|  | Y Bleeding |
|---|---|
| Y-104 (Comparative Example) | B |
| Y-105 (Invention) | A |
| Y-106 (Invention) | A |
| Y-107 (Invention) | A |
| Y-108 (Invention) | A |

As seen from the results in the table above, the systems using the ink set of the present invention are superior to all Comparative Examples in view of Y bleeding.

Also, a humidity resistance test for 1 week was performed by prolonging the test period. As a result, the bleeding visually observed was slightly increased in the case of Y-108 as compared with Y-107.

An ink set was produced with Inks LM-106, M-106 and Y-106 described in Examples 1 and 2 and using the ink set, a conventional photographic image was printed.

In the image printed by using the ink set, the effect of the present invention could be also confirmed.

Furthermore, even when the ink and ink set of the present invention were used in a thermal inkjet printer, the same results were obtained.

According to the present invention, an inkjet ink, a production method of inkjet ink, an ink set and an inkjet recording method, each of which prevents the occurrence of bleeding of an image even under high humidity conditions, can be obtained.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A method for producing an inkjet ink comprising desalting and purifying a betaine compound and then preparing an ink containing the betaine compound.

2. A method for producing an inkjet ink comprising desalting and purifying an ink stock solution containing a betaine compound and then preparing an ink containing the ink stock solution.

3. An inkjet ink produced by the method as claimed in claim 1.

4. An inkjet ink produced by the method as claimed in claim 2.

5. An inkjet ink comprising a dye, water, a water-soluble organic solvent and a betaine compound, wherein the total weight of inorganic ions in the ink is 2 wt % or less based on the ink, which is produced by the method as claimed in claim 1.

6. An inkjet ink comprising a dye, water, a water-soluble organic solvent and a betaine compound, wherein the total weight of inorganic ions in the ink is 2 wt % or less based on the ink, which is produced by the method as claimed in claim 2.

7. The inkjet ink as claimed in claim 3, wherein the betaine compound is a compound having both a cationic site and an anionic site in the molecule thereof.

8. The inkjet ink as claimed in claim 7, wherein the cationic site is at least one member selected from an aminic nitrogen atom, a nitrogen atom of a heteroaromatic ring, a boron atom having 4 bonds to carbon and a phosphoric atom and the anionic site is at least one member selected from a hydroxyl group, a thio group, a sulfonamido group, a sulfo group, a carboxyl group, an imido group, a phosphoric acid group and a phosphonic acid group.

9. The inkjet ink as claimed in claim 3, wherein the dye is a dye having an oxidation potential more positive then 1.0 V (vs SCE).

10. The inkjet ink as claimed in claim 3, wherein the dye is a dye having at least two heterocyclic groups.

11. The inkjet ink as claimed in claim 10, wherein at least one of the heterocyclic groups is a 5-membered or 6-membered heterocyclic group containing at least one hetero atom selected from the group consisting of a nitrogen atom, an oxygen atom and a sulfur atom.

12. The inkjet ink as claimed in claim 11, wherein the heterocyclic group contains at least one heterocyclic ring selected from the group consisting of pyridine, thiophene, thiazole, benzothiazole, benzoxazole and furan.

13. The inkjet ink as claimed in claim 3, wherein the dye is a phthalocyanine dye having at least one group selected from the group consisting of —SO—, $SO_2$—, —CO—, —$CO_2$—.

14. An inkjet ink set comprising the inkjet ink as claimed in claim 3.

15. An inkjet recording method comprising recording an image by an inkjet printer using the ink as claimed in claim 3.

* * * * *